(12) United States Patent
Napolitano et al.

(10) Patent No.: US 10,956,006 B2
(45) Date of Patent: Mar. 23, 2021

(54) INTELLIGENT AUTOMATED ASSISTANT IN A MEDIA ENVIRONMENT

(71) Applicant: Apple Inc., Cupertino, CA (US)

(72) Inventors: Lia T. Napolitano, San Francisco, CA (US); Grace H. Hwang, San Francisco, CA (US); Henrique D. Penha, San Francisco, CA (US); Jeremiah D. Shaw, San Jose, CA (US); Jorge S. Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/394,965

(22) Filed: Apr. 25, 2019

(65) Prior Publication Data

US 2019/0310765 A1     Oct. 10, 2019

Related U.S. Application Data

(63) Continuation of application No. 15/627,869, filed on Jun. 20, 2017, now Pat. No. 10,379,715, which is a (Continued)

(51) Int. Cl.
*G06F 3/0484* (2013.01)
*G06F 3/16* (2006.01)
(Continued)

(52) U.S. Cl.
CPC ........ *G06F 3/04842* (2013.01); *G06F 3/0482* (2013.01); *G06F 3/0488* (2013.01); (Continued)

(58) Field of Classification Search
CPC ...... G06F 3/04842; G06F 3/165; G06F 3/167; H04N 21/4126; H04N 21/42204
See application file for complete search history.

(56) References Cited

U.S. PATENT DOCUMENTS 6,078,886 A     6/2000 Dragosh et al.
6,504,990 B1    1/2003 Abecassis et al.
(Continued)

FOREIGN PATENT DOCUMENTS

CN     104584010 A     4/2015
CN     104869342 A     8/2015
(Continued)

OTHER PUBLICATIONS

Summons to Attend Oral Proceedings, dated Jun. 3, 2019 (Year: 2019).*

(Continued)

*Primary Examiner* — Eric J. Bycer
(74) *Attorney, Agent, or Firm* — Dentons US LLP

(57) ABSTRACT

Systems and processes are disclosed for operating a digital assistant in a media environment. In an exemplary embodiment, a user can interact with a digital assistant of a media device while content is displayed by the media device. In one approach, a plurality of exemplary natural language requests can be displayed in response to detecting a user input of a first input type. The plurality of exemplary natural language requests can be contextually-related to the displayed content. In another approach, a user request can be received in response to detecting a user input of a second input type. A task that at least partially satisfies the user request can be performed. The performed task can depend on the nature of the user request and the content being displayed by the media device. In particular, the user request can be satisfied while reducing disruption to user consumption of media content.

30 Claims, 37 Drawing Sheets

Related U.S. Application Data continuation of application No. 14/963,094, filed on Dec. 8, 2015, now Pat. No. 10,331,312.

(60) Provisional application No. 62/215,676, filed on Sep. 8, 2015.

(51) Int. Cl.

| | | |
|---|---|---|
| *G06F 3/0482* | (2013.01) | |
| *G06F 3/0488* | (2013.01) | |
| *G06F 16/332* | (2019.01) | |
| *G06F 16/9032* | (2019.01) | |
| *G06F 16/45* | (2019.01) | |
| *G06F 16/483* | (2019.01) | |
| *G06F 16/48* | (2019.01) | |
| *G06F 16/487* | (2019.01) | |
| *G06F 16/438* | (2019.01) | |
| *H04N 21/41* | (2011.01) | |
| *H04N 21/422* | (2011.01) | |
| *H04N 21/482* | (2011.01) | |
| *G06F 40/40* | (2020.01) | |
| *H04N 21/47* | (2011.01) | |
| *G10L 15/22* | (2006.01) | |
| *G10L 21/0208* | (2013.01) | |
| *G10L 15/00* | (2013.01) | |
| *G10L 15/26* | (2006.01) | |

(52) U.S. Cl.
CPC .............. *G06F 3/165* (2013.01); *G06F 3/167* (2013.01); *G06F 16/3329* (2019.01); *G06F 16/438* (2019.01); *G06F 16/45* (2019.01); *G06F 16/48* (2019.01); *G06F 16/483* (2019.01); *G06F 16/487* (2019.01); *G06F 16/489* (2019.01); *G06F 16/90332* (2019.01); *G06F 40/40* (2020.01); *H04N 21/4126* (2013.01); *H04N 21/41265* (2020.08); *H04N 21/42203* (2013.01); *H04N 21/42204* (2013.01); *H04N 21/47* (2013.01); *H04N 21/4828* (2013.01); *G10L 15/00* (2013.01); *G10L 15/22* (2013.01); *G10L 15/26* (2013.01); *G10L 21/0208* (2013.01); *G10L 2015/221* (2013.01); *G10L 2015/223* (2013.01); *H04N 21/42206* (2013.01); *H04N 21/42224* (2013.01)

(56) References Cited

U.S. PATENT DOCUMENTS

| | | | |
|---|---|---|---|
| 6,622,148 B1 | 9/2003 | Noble et al. | |
| 6,765,557 B1* | 7/2004 | Segal | G06F 3/0488 345/173 |
| 2002/0010589 A1 | 1/2002 | Nashida et al. | |
| 2002/0052746 A1 | 5/2002 | Handelman et al. | |
| 2002/0120455 A1 | 8/2002 | Nakata | |
| 2003/0078784 A1 | 4/2003 | Jordan et al. | |
| 2003/0167171 A1 | 9/2003 | Calderone et al. | |
| 2005/0232583 A1 | 10/2005 | Kubota | |
| 2006/0031765 A1 | 2/2006 | Roderick et al. | |
| 2006/0041926 A1 | 2/2006 | Istvan et al. | |
| 2006/0075429 A1 | 4/2006 | Istvan et al. | |
| 2006/0122834 A1 | 6/2006 | Bennett | |
| 2007/0288898 A1 | 12/2007 | Isberg | |
| 2008/0248797 A1 | 10/2008 | Freeman et al. | |
| 2009/0228277 A1 | 9/2009 | Bonforte et al. | |
| 2009/0228281 A1 | 9/2009 | Singleton et al. | |
| 2010/0037187 A1 | 2/2010 | Kondziela | |
| 2010/0057443 A1 | 3/2010 | Di Cristo et al. | |
| 2010/0082567 A1* | 4/2010 | Rosenblatt | G06F 16/40 707/705 |
| 2010/0153114 A1 | 6/2010 | Shih et al. | |
| 2010/0312547 A1 | 12/2010 | Van Os et al. | |
| 2010/0333163 A1 | 12/2010 | Daly | |
| 2011/0047266 A1 | 2/2011 | Yu et al. | |
| 2011/0066436 A1 | 3/2011 | Bezar | |
| 2012/0062473 A1 | 3/2012 | Xiao et al. | |
| 2012/0110456 A1 | 5/2012 | Larco et al. | |
| 2012/0262296 A1 | 10/2012 | Bezar | |
| 2012/0316875 A1 | 12/2012 | Nyquist et al. | |
| 2013/0033643 A1 | 2/2013 | Kim et al. | |
| 2013/0041665 A1 | 2/2013 | Jang et al. | |
| 2013/0176244 A1 | 7/2013 | Yamamoto et al. | |
| 2013/0291015 A1 | 10/2013 | Pan | |
| 2014/0040274 A1 | 2/2014 | Aravamudan et al. | |
| 2014/0053210 A1 | 2/2014 | Cheong et al. | |
| 2014/0081633 A1* | 3/2014 | Badaskar | G10L 15/26 704/235 |
| 2014/0122059 A1 | 5/2014 | Patel et al. | |
| 2014/0181865 A1 | 6/2014 | Koganei | |
| 2014/0195244 A1 | 7/2014 | Cha et al. | |
| 2014/0218372 A1 | 8/2014 | Missig et al. | |
| 2014/0244263 A1 | 8/2014 | Pontual et al. | |
| 2014/0304605 A1 | 10/2014 | Ohmura et al. | |
| 2014/0317502 A1 | 10/2014 | Brown et al. | |
| 2015/0100983 A1 | 4/2015 | Pan | |
| 2015/0185964 A1 | 7/2015 | Stout | |
| 2015/0189362 A1 | 7/2015 | Lee et al. | |
| 2015/0228281 A1 | 8/2015 | Raniere | |
| 2015/0254057 A1 | 9/2015 | Klein et al. | |
| 2016/0014476 A1 | 1/2016 | Caliendo, Jr. et al. | |
| 2017/0055895 A1 | 3/2017 | Des Jardins et al. | |
| 2017/0068423 A1 | 3/2017 | Napolitano et al. | |
| 2017/0285915 A1 | 10/2017 | Napolitano et al. | |
| 2018/0091847 A1 | 3/2018 | Wu et al. | |

FOREIGN PATENT DOCUMENTS

| | | | | |
|---|---|---|---|---|
| EP | 2555536 A1 | 2/2013 | | |
| EP | 2801890 A1 | 11/2014 | | |
| EP | 2940556 A1 | 11/2015 | | |
| JP | 9-325796 A | 12/1997 | | |
| JP | 10-333693 A | 12/1998 | | |
| JP | 2002-41276 A | 2/2000 | | |
| JP | 2013-37688 A | 2/2013 | | |
| JP | 2013-200423 A | 10/2013 | | |
| JP | 2014-72586 A | 4/2014 | | |
| JP | 2014142566 A | 8/2014 | | |
| JP | 2015060423 A | 3/2015 | | |
| KR | 20120084472 A | 7/2012 | | |
| KR | 10-2014-0033574 A | 3/2014 | | |
| WO | 2010/141802 A1 | 12/2010 | | |
| WO | WO-2011028842 A2 * | 3/2011 | | G06N 5/04 |
| WO | 2011/088053 A2 | 7/2011 | | |
| WO | 2013/022135 A1 | 2/2013 | | |
| WO | 2013/022223 A2 | 2/2013 | | |
| WO | 2014/028797 A1 | 2/2014 | | |

OTHER PUBLICATIONS

Summons to Attend Oral Proceedings, dated May 28, 2019 (Year: 2019).*
Notice of Acceptance received for Australian Patent Application No. 2018260958, dated Apr. 22, 2020, 3 pages.
Minutes of the Oral Proceedings received for European Patent Application No. 16766674.2, dated Dec. 2, 2019, 7 pages.
Notice of Allowance received for Japanese Patent Application No. 2017-116994, dated Nov. 18, 2019, 3 pages (1 page of English Translation and 2 pages of Official Copy).
Search Report and Opinion received for Danish Patent Application No. PA201970273, dated Dec. 20, 2019, 9 pages.
Aaaaplay, "Sony Media Remote for iOS and Android", Available Online at: https://www.youtube.com/watch?v=W8QoeQhIGok, Feb. 4, 2012, 3 pages.
DetroitBORG, "Apple Remote App (iPhone & iPod Touch): Tutorial and Demo", Available Online at: https://www.youtube.com/watch?v=M_jzeEevKql, Oct. 13, 2010, 4 pages.

(56) References Cited

OTHER PUBLICATIONS

Siou Serge, "How to Control Apple TV 3rd Generation Using Remote app", Available Online at: https://www.youtube.com/watch?v=PhyKftZ0S9M, May 12, 2014, 3 pages.
Yang Astor, "Control Android TV via Mobile Phone App RKRemoteControl", Available Online at: https://www.youtube.com/watch?v=zpmUeOX_xro, Mar. 31, 2015, 4 pages.
Office Action received for Japanese Patent Application No. 2017-116994, dated Sep. 30, 2019, 3 pages (1 page of English Translation and 2 pages of Official Copy).
Result of Consultation received for European Patent Application No. 16766674.2, dated Oct. 17, 2019, 3 pages.
Advisory Action received for U.S. Appl. No. 14/963,094, dated Nov. 28, 2018, 3 pages.
Ashingtondctech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
Corrected Notice of Allowance received for U.S. Appl. No. 14/963,094, dated May 7, 2019, 6 pages.
Corrected Notice of Allowance received for U.S. Appl. No. 15/627,869, dated Apr. 11, 2019, 7 pages.
Decision to Grant received for Danish Patent Application No. PA201670575, dated May 23, 2017, 2 pages.
Extended European Search Report received for European Patent Application No. 17178232.9, dated Jan. 23, 2018, 8 pages.
Final Office Action received for U.S. Appl. No. 14/963,094, dated Jul. 21, 2017, 42 pages.
Final Office Action received for U.S. Appl. No. 14/963,094, dated Sep. 20, 2018, 34 pages.
Intention to Grant received for Danish Patent Application No. PA201670575, dated Mar. 29, 2017, 2 pages.
International Preliminary Report on Patentability received for PCT Patent Application No. PCT/US2016/047184, dated Mar. 22, 2018, 14 pages.
International Search Report and Written Opinion Received for PCT Patent Application No. PCT/US2016/047184, dated Jan. 17, 2017, 22 pages.
Internet Services and Social Net, "How to Search for Similar Websites", Retrieved from < https://www.youtube.com/watch?v=nLf2uirpt5s > see from 0:17 to 1:06, Jul. 4, 2013, 1 page.
Invitation to Pay Additional Fee Received for PCT Patent Application No. PCT/US2016/047184, dated Dec. 6, 2016, 9 pages.
Morrison, Jonathan, "iPhone 5 Siri Demo", Online Available at <https://www.youtube.com/watch?v=_wHWwG5lhWc>, Sep. 21, 2012, 3 pages.
Non-Final Office Action received for U.S. Appl. No. 14/963,094, dated Jan. 5, 2017, 52 pages.
Non-Final Office Action received for U.S. Appl. No. 14/963,094, dated Mar. 8, 2018, 39 pages.
Non-Final Office Action received for U.S. Appl. No. 15/627,869, dated Mar. 8, 2018, 50 pages.
Non-Final Office Action received for U.S. Appl. No. 15/627,869, dated Oct. 18, 2018, 28 pages.
Notice of Acceptance received for Australian Patent Application No. 2017204359, dated Jul. 25, 2018, 3 pages.
Notice of Allowance received for Australian Patent Application No. 2016247040, dated Nov. 4, 2017, 3 pages.
Notice of Allowance received for Danish Patent Application No. PA201570826, dated Aug. 29, 2016, 2 pages.
Notice of Allowance received for U.S. Appl. No. 14/963,094, dated Jan. 31, 2019, 9 pages.
Notice of Allowance received for U.S. Appl. No. 15/627,869, dated Mar. 21, 2019, 15 pages.
Office Action received for Australian Patent Application No. 2016247040, dated Dec. 1, 2016, 4 pages.
Office Action received for Australian Patent Application No. 2016247040, dated Sep. 20, 2017, 3 pages.
Office Action received for Australian Patent Application No. 2017204359, dated Jul. 3, 2018, 3 pages.
Office Action received for Australian Patent Application No. 2017204359, dated Jul. 25, 2017, 4 pages.
Office Action received for Danish Patent Application No. PA201570826, dated Apr. 6, 2016, 8 pages.
Office Action received for Danish Patent Application No. PA201570826, dated Jun. 3, 2016, 3 pages.
Office Action received for Danish Patent Application No. PA201570826, dated Jun. 21, 2016, 2 pages.
Office Action received for Danish Patent Application No. PA201670575, dated Jan. 6, 2017, 9 pages.
Office Action received for Danish Patent Application No. PA201770287, dated Mar. 19, 2019, 5 pages.
Office Action received for Danish Patent Application No. PA201770287, dated Nov. 20, 2018, 6 pages.
Office Action received for European Patent Application No. 16766674.2, dated Jan. 24, 2018, 5 pages.
Office Action received for European Patent Application No. 17178232.9, dated Oct. 31, 2018, 4 pages.
Office Action received for Japanese Patent Application No. 2016-569709, dated Feb. 23, 2018, 7 pages (3 pages of English Translation and 4 pages of Official Copy).
Office Action received for Japanese Patent Application No. 2016-569709, dated Nov. 13, 2017, 12 pages (6 pages of English Translation and 6 pages of Official Copy).
Office Action received for Japanese Patent Application No. 2017-116994, dated Apr. 20, 2018, 8 pages.
Office Action received for Japanese Patent Application No. 2017-116994, dated Nov. 13, 2017, 15 pages.
Office Action received for Japanese Patent Application No. 2017-116994, dated Oct. 23, 2018, 4 pages.
Office Action received for Korean Patent Application No. 10-2017-7007440, dated Apr. 30, 2018, 12 pages).
Office Action received for Korean Patent Application No. 10-2017-7007440, dated Aug. 1, 2017, 7 pages.
Office Action received for Korean Patent Application No. 10-2017-7007440, dated Oct. 22, 2018, 5 pages.
Office Action received for Korean Patent Application No. 10-2017-7023656, dated Feb. 23, 2018, 16 pages.
Office Action received for Korean Patent Application No. 10-2017-7023656, dated Oct. 22, 2018, 12 pages.
Search Report and Opinion received for Danish Patent Application No. PA201770287, dated Jul. 12, 2017, 9 pages.
Search Report and Opinion received for Danish Patent Application No. PA201770287, dated May 2, 2018, 5 pages.
Office Action received for Korean Patent Application No. 10-2017-7007440, dated Jun. 18, 2019, 9 pages (4 pages of English Translation and 5 pages of Official copy).
Office Action received for Korean Patent Application No. 10-2017-7023656, dated Jun. 18, 2019, 7 pages (3 pages of English translation and 4 pages of Official Copy).
Decision to Refuse received for European Patent Application No. 16766674.2, dated Jan. 17, 2020, 16 pages.
Decision to Refuse received for European Patent Application No. 17178232.9, dated Jan. 17, 2020, 11 pages.
Office Action received for Australian Patent Application No. 2018260958, dated Jul. 20, 2019, 3 pages.
Brief Communication regarding Oral Proceedings received for European Patent Application No. 16766674.2, dated Oct. 23, 2019, 8 pages.
Brief Communication regarding Oral Proceedings received for European Patent Application No. 17178232.9, dated Oct. 25, 2019, 9 pages.
Office Action received for Chinese Patent Application No. 201680003291.7, dated Sep. 29, 2019, 25 pages (7 pages of English Translation and 18 pages of Official Copy).
Office Action received for Japanese Patent Application No. 2018-120017, dated Sep. 27, 2019, 7 pages (4 pages of English Translation and 3 pages of Official Copy).
Office Action received for Korean Patent Application No. 10-2017-7007440, dated Oct. 18, 2019, 9 pages (4 pages of English translation and 5 pages of Official copy).

(56) References Cited

OTHER PUBLICATIONS

Office Action received for Korean Patent Application No. 10-2017-7023656, dated Oct. 18, 2019, 10 pages (5 pages of English Translation and 5 pages of Official Copy).
Office Action received for Chinese Patent Application No. 201710551469.8, dated Mar. 24, 2020, 23 pages (10 pages of English Translation and 13 pages of Official Copy).
Office Action received for Japanese Patent Application No. 2018-120017, dated May 25, 2020, 4 pages (2 pages of English Translation and 2 pages of Official Copy).
Office Action received for Korean Patent Application No. 10-2020-7001841, dated Jun. 19, 2020, 6 pages (2 pages of English Translation and 4 pages of Official Copy).
Office Action received for Danish Patent Application No. PA201970273, dated Jun. 8, 2020, 5 pages.
Notice of Allowance received for Japanese Patent Application No. 2018-120017, dated Sep. 14, 2020, 4 pages (1 page of English Translation and 3 pages of Official Copy).
Office Action received for Chinese Patent Application No. 201680003291.7, dated Sep. 1, 2020, 21 pages (6 pages of English Translation and 15 pages of Official Copy).

\* cited by examiner

INTELLIGENT AUTOMATED ASSISTANT IN A MEDIA ENVIRONMENT

CROSS-REFERENCE TO RELATED APPLICATIONS

This application is a continuation of U.S. patent application Ser. No. 15/627,869, filed on Jun. 20, 2017, which is a continuation of U.S. patent application Ser. No. 14/963,094, filed on Dec. 8, 2015, which claims priority from U.S. Provisional Ser. No. 62/215,676, filed on Sep. 8, 2015, entitled "Intelligent Automated Assistant in a Media Environment," which are hereby incorporated by reference in their entireties for all purposes.

This application relates to the following applications: U.S. Non-Provisional patent application Ser. No. 14/963,089, "Intelligent Automated Assistant for Media Search and Playback," filed Dec. 8, 2015, U.S. Non-Provisional patent application Ser. No. 14/498,503, "Intelligent Automated Assistant for TV User Interactions," filed Sep. 26, 2014, and U.S. Non-Provisional patent application Ser. No. 14/498,391, "Real-time Digital Assistant Knowledge Updates," filed Sep. 26, 2014, which are hereby incorporated by reference in their entirety for all purposes.

FIELD

This relates generally to intelligent automated assistants and, more specifically, to intelligent automated assistants operating in a media environment.

BACKGROUND

Intelligent automated assistants (or digital assistants) can provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device, and, in some examples, a relevant output can be returned to the user in natural language form.

Integrating digital assistants in a media environment (e.g., televisions, television set-top boxes, cable boxes, gaming devices, streaming media devices, digital video recorders, etc.) can be desirable to assist users with tasks related to media consumption. For example, a digital assistant can be utilized to assist with finding desirable media content to consume. However, user interactions with a digital assistant may include audio and visual output, which can disrupt the consumption of media content. It can thus be challenging to integrate digital assistants in a media environment in a manner such that sufficient assistance is provided to the user while disruptions to the consumption of media content are minimized.

SUMMARY

Systems and processes are disclosed for operating a digital assistant in a media environment. In some exemplary processes, user input can be detected while displaying content. The process can determine whether the user input corresponds to a first input type. In accordance with a determination that the user input corresponds to a first input type, a plurality of exemplary natural language requests can be displayed. The plurality of exemplary natural language requests can be contextually-related to the displayed content.

In some embodiments, in accordance with a determination that the user input does not correspond to a first input type, the process can determine whether the user input corresponds to a second input type. In accordance with a determination that the user input corresponds to a second input type, audio data can be sampled. The process can determine whether the audio data contains a user request. In accordance with a determination that the audio data contains a user request, a task that at least partially satisfies the user request can be performed. In some examples, the task can include obtaining results that at least partially satisfy the user request and displaying a second user interface with a portion of the results. A portion of the content can continue to be displayed while the second user interface is displayed, and a display area of the second user interface can be smaller than a display area of the portion of the content.

In some embodiments, a third user input can be detected while displaying the second user interface. In response to detecting the third user input, display of the second user interface can be replaced with display of a third user interface with the portion of the results. The third user interface can occupy at least a majority of a display area of a display unit. In addition, second results that at least partially satisfy the user request can be obtained. The second results can be different from the results. The third user interface can include at least a portion of the second results.

In some embodiments, a fourth user input can be detected while displaying the third user interface. The fourth user input can indicate a direction. In response to detecting the fourth user input, a focus of the third user interface can be switched from a first item in the third user interface to a second item in the third user interface. The second item can be positioned in the indicated direction relative to the first item.

In some embodiments, a fifth user input can be detected while displaying the third user interface. In response to detecting the fifth user input, a search field can be displayed. Additionally, a virtual keyboard interface can be displayed, where input received via the virtual keyboard interface can cause text entry in the search field. Further, in some embodiments, a selectable affordance can be caused to appear on a display of a second electronic device, where selection of the affordance enables text input to be received by the electronic device via a keyboard of the second electronic device.

In some embodiments, a sixth user input can be detected while displaying the third user interface. In response to detecting the sixth user input, second audio data containing a second user request can be sampled. The process can determine whether the second user request is a request to refine the results of the user request. In accordance with a determination that the second user request is a request to refine the results of the user request, a subset of the results can be displayed via the third user interface. In accordance with a determination that the second user request is not a request to refine the results of the user request, third results that at least partially satisfy the second user request can be obtained. A portion of the third results can be displayed via the third user interface.

In some embodiments, the sampled audio data can include a user utterance, and a user intent corresponding to the user utterance can be determined. The process can determine whether the user intent comprises a request to adjust a state or a setting of an application. In accordance with a determination that the user intent comprises a request to adjust a state or a setting of an application, the state or the setting of the application can be adjusted to satisfy the user intent.

In some embodiments, in accordance with a determination that the user intent does not comprise a request to adjust a state or a setting of an application on the electronic device, the process can determine whether the user intent is one of a plurality of predetermined request types. In accordance with a determination that the user intent is one of a plurality of predetermined request types, text-only results that at least partially satisfy the user intent can be displayed.

In some embodiments, in accordance with a determination that the user intent is not one of a plurality of predetermined request types, the process can determine whether the displayed content comprises media content. In accordance with a determination that the displayed content comprises media content, the process can further determine whether the media content can be paused. In accordance with a determination that the media content can be paused, the media content is paused, and results that at least partially satisfy the user intent can be displayed via the third user interface. The third user interface can occupy at least a majority of a display area of a display unit. In accordance with a determination that the media content cannot be paused, the results can be displayed via the second user interface while the media content is displayed. A display area occupied by the second user interface can be smaller than a display area occupied by the media content. Further, in some embodiments, in accordance with a determination that the displayed content does not comprise media content, the results can be displayed via the third user interface.

DETAILED DESCRIPTION

Figure 1:
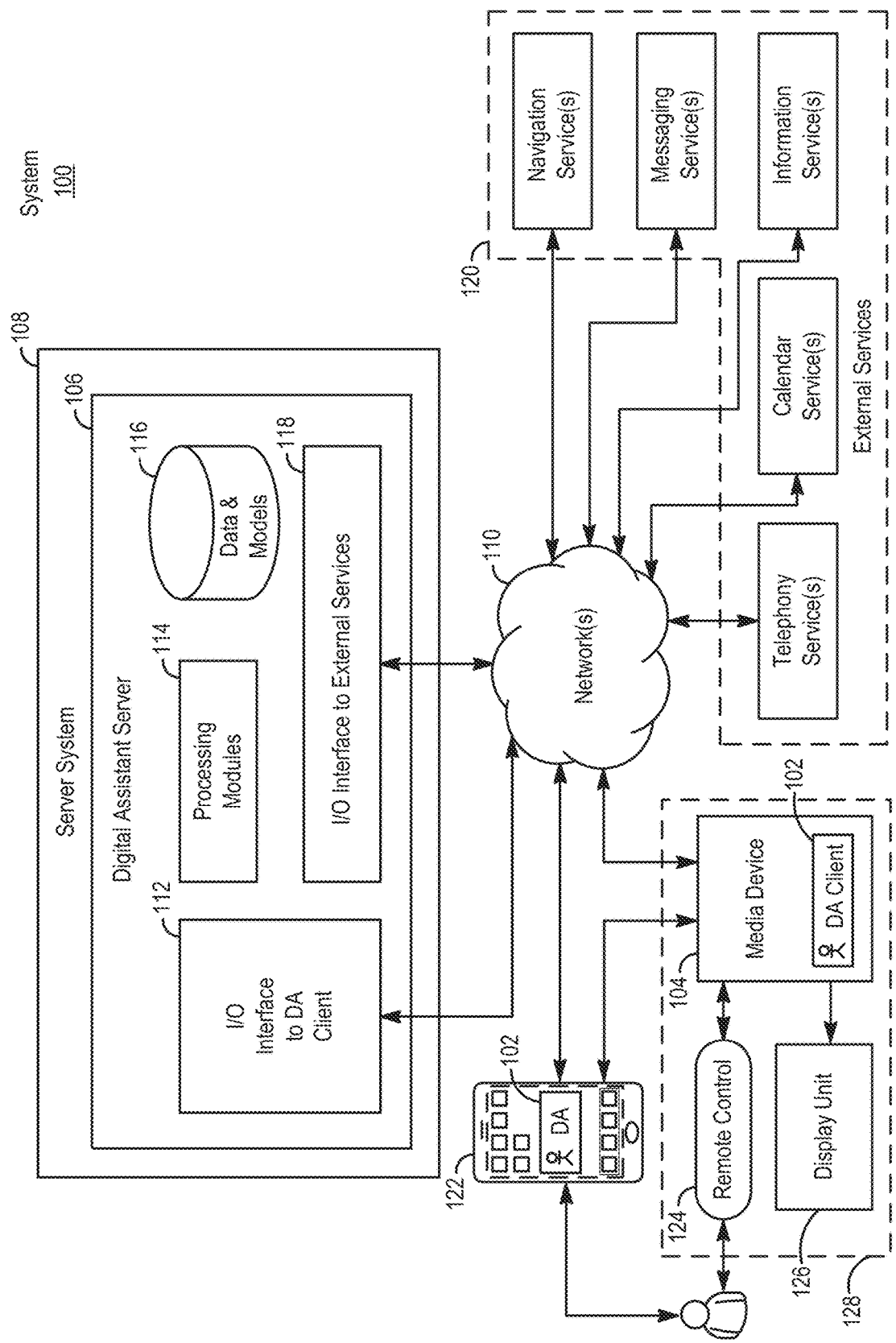
FIG. 1 is a block diagram illustrating a system and environment for implementing a digital assistant according to various examples.

In the following description of examples, reference is made to the accompanying drawings in which it is shown by way of illustration specific examples that can be practiced. It is to be understood that other examples can be used and structural changes can be made without departing from the scope of the various examples.

This relates to systems and process for operating a digital assistant in a media environment. In one example process, user input can be detected while displaying content. The process can determine whether the user input corresponds to a first input type. In accordance with a determination that the user input corresponds to a first input type, a plurality of exemplary natural language requests can be displayed. The plurality of exemplary natural language requests can be contextually-related to the displayed content. The contextually-related exemplary natural language request can be desirable to conveniently inform a user of the capabilities of the digital assistant that are most relevant to the user's current use condition on the media device. This can encourage the user to utilize the services of the digital assistant and can also improve the user's interactive experience with the digital assistant.

In some embodiments, in accordance with a determination that the user input does not correspond to a first input type, the process can determine whether the user input corresponds to a second input type. In accordance with a determination that the user input corresponds to a second input type, audio data can be sampled. The process can determine whether the audio data contains a user request. In accordance with a determination that the audio data contains a user request, a task that at least partially satisfies the user request can be performed.

In some embodiments, the task performed can depend on the nature of the user request and the content that is displayed while the user input of a second input type is detected. If the user request is a request to adjust a state or a setting of an application on the electronic device (e.g., turning on subtitles for displayed media content), the task can include adjusting the state or setting of the application. If the user request is one of a plurality of predetermined request types associated with text-only output (e.g., a request for the current time), the task can include displaying text that satisfies the user request. If the displayed content includes media content and the user request requires results to be obtained and displayed, the process can determine whether the media content can be paused. If it is determined that the media content can be paused, the media content is paused and results that satisfy that user request can be displayed on an expanded user interface (e.g., third user interface 626, shown in FIG. 6H). If it is determined that the media content cannot be paused, results that satisfy that user request can be displayed on a condensed user interface (e.g., second user interface 618, shown in FIG. 6G) while the media content continues to be displayed. A display area of the second user interface can be smaller than a display area of the media content. Further, if the displayed content does not include media content, results that satisfy that user request can be displayed on the expanded user interface. By adjusting the output format according to the displayed content and the type of user request, the digital assistant can intelligently balance providing comprehensive assistance while minimizing disruption to the user's consumption of media content. This can result in improved user experience.

1. System and Environment

FIG. 1 illustrates exemplary system 100 for operating a digital assistant according to various examples. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, application programming interfaces (APIs), or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "What time is it in Paris?" The digital assistant can retrieve the requested information and respond, "It's 4:00 PM in Paris." The user can also request the performance of a task, for example, "Find movies starring Reese Witherspoon." In response, the digital assistant can perform the requested search query and display relevant movie titles for the user to select from. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing text responses and taking programmed actions, the digital assistant can also provide responses in other visual or audio forms, e.g., as verbal, alerts, music, images, videos, animations, etc. Moreover, as discussed herein, an exemplary digital assistant can control playback of media content (e.g., on a television set-top box) and cause media content or other information to be displayed on a display unit (e.g., a television). The display unit can be referred to as a display.

As shown in FIG. 1, in some examples, a digital assistant can be implemented according to a client-server model. The digital assistant can include client-side portion 102 (hereafter "DA client 102") executed on media device 104 and server-side portion 106 (hereafter "DA server 106") executed on server system 108. Further, in some examples, the client-side portion can also be executed on user device 122. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102, each residing on a respective device (e.g., media device 104 and user device 122).

Media device 104 can be any suitable electronic device that is configured to manage and control media content. For example, media device 104 can include television set-top box, such as a cable box device, satellite box device, video player device, video streaming device, digital video recorder, gaming system, DVD player, Blu-ray Disc™ Player, a combination of such devices, or the like. As shown in FIG. 1, media device 104 can be part of media system 128. In addition to media device 104, media system 128 can include remote control 124 and display unit 126. Media device 104 can display media content on display unit 126. Display unit 126 can be any type of display, such as a television display, monitor, projector, or the like. In some examples, media device 104 can connect to an audio system (e.g., audio receiver), and speakers (not shown) that can be integrated with or separate from display unit 126. In other examples, display unit 126 and media device 104 can be incorporated together in a single device, such as a smart television with advanced processing and network connectivity capabilities. In such examples, the functions of media device 104 can be executed as an application on the combined device.

In some examples, media device 104 can function as a media control center for multiple types and sources of media content. For example, media device 104 can facilitate user access to live television (e.g., over-the-air, satellite, or cable TV). As such, media device 104 can include cable tuners, satellite tuners, or the like. In some examples, media device 104 can also record TV programs for later time-shifted viewing. In other examples, media device 104 can provide access to one or more streaming media services, such as cable-delivered on-demand TV shows, videos, and music as well as internet-delivered TV shows, videos, and music (e.g., from various free, paid, and subscription-based streaming services). In still other examples, media device 104 can facilitate playback or display of media content from any other source, such as displaying photos from a mobile user device, playing videos from a coupled storage device, playing music from a coupled music player, or the like. Media device 104 can also include various other combinations of the media control features discussed herein, as desired. A detailed description of media device 104 is provided below with reference to FIG. 2.

User device 122 can be any personal electronic device, such as a mobile phone (e.g., smartphone), tablet computer, portable media player, desktop computer, laptop computer, PDA, wearable electronic device (e.g., digital glasses, wristband, wristwatch, brooch, armband, etc.), or the like. A detailed description of user device 122 is provided below with reference to FIG. 3.

In some examples, a user can interact with media device 104 through user device 122, remote control 124, or interface elements integrated with media device 104 (e.g., buttons, a microphone, a camera, a joystick, etc.). For example, speech input including media-related queries or commands for the digital assistant can be received at user device 122 and/or remote control 124, and the speech input can be used to cause media-related tasks to be executed on media device 104. Likewise, tactile commands for controlling media on media device 104 can be received at user device 122 and/or remote control 124 (as well as from other devices not shown). The various functions of media device 104 can thus be controlled in a variety of ways, giving users multiple options for controlling media content from multiple devices.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth™, Wi-Fi, voice over Internet Protocol (VoIP), Wi-MAX, or any other suitable communication protocol.

DA server 106 can include client-facing input/output (I/O) interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 can perform task execution based on inferred user intent. In some examples, DA server 106 can communicate with external services 120, such as telephony services, calendar services, information services, messaging services, navigation services, television programming services, streaming media services, media search services, and the like, through network(s) 110 for task completion or information acquisition. I/O interface to external services 118 can facilitate such communications.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device or a media device. In addition, the divisions of functionalities between the client and server portions of the digital assistant can vary in different implementations. For instance, in some examples, the DA client executed on user device 122 or media device 104 can be a thin client that provides only user-facing input and output processing functions, and delegates all other functionalities of the digital assistant to a backend server.

2. Media System

Figure 2:
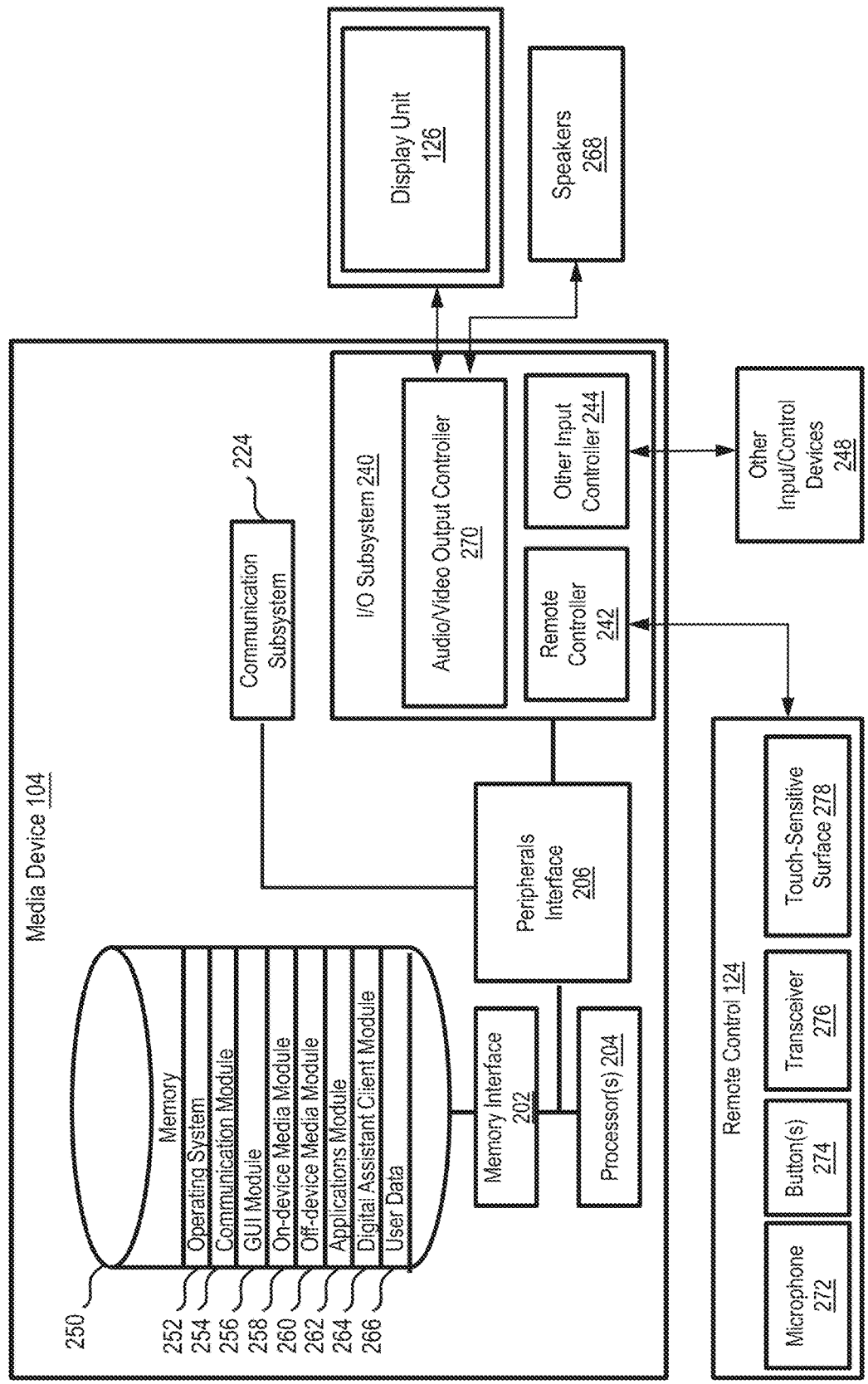
FIG. 2 is a block diagram illustrating a media system according to various examples.

FIG. 2 illustrates a block diagram of media system 128 according to various examples. Media system 128 can include media device 104 that is communicatively coupled to display unit 126, remote control 124, and speakers 268. Media device 104 can receive user input via remote control 124. Media content from media device 104 can be displayed on display unit 126.

In the present example, as shown in FIG. 2, media device 104 can include memory interface 202, one or more processors 204, and a peripherals interface 206. The various components in media device 104 can be coupled together by one or more communication buses or signal lines. Media device 104 can further include various subsystems and peripheral devices that are coupled to the peripherals interface 206. The subsystems and peripheral devices can gather information and/or facilitate various functionalities of media device 104.

For example, media device 104 can include a communication subsystem 224. Communication functions can be facilitated through one or more wired and/or wireless communication subsystems 224, which can include various communication ports, radio frequency receivers and transmitters, and/or optical (e.g., infrared) receivers and transmitters.

In some examples, media device 104 can further include an I/O subsystem 240 coupled to peripherals interface 206. I/O subsystem 240 can include an audio/video output controller 270. Audio/video output controller 270 can be coupled to display unit 126 and speakers 268 or can otherwise provide audio and video output (e.g., via audio/video ports, wireless transmission, etc.). I/O subsystem 240 can further include remote controller 242. Remote controller 242 can be communicatively coupled to remote control 124 (e.g., via a wired connection, Bluetooth™, Wi-Fi, etc.).

Remote control 124 can include microphone 272 for capturing audio data (e.g., speech input from a user), button(s) 274 for capturing tactile input, and transceiver 276 for facilitating communication with media device 104 via remote controller 242. Further, remote control 124 can include a touch-sensitive surface 278, sensor, or set of sensors that accepts input from the user based on haptic and/or tactile contact. Touch-sensitive surface 278 and remote controller 242 can detect contact (and any movement or breaking of the contact) on touch-sensitive surface 278 and convert the detected contact (e.g., gestures, contact motions, etc.) into interaction with user-interface objects (e.g., one or more soft keys, icons, web pages, or images) that are displayed on display unit 126. In some examples, remote control 124 can also include other input mechanisms, such as a keyboard, joystick, or the like. In some examples, remote control 124 can further include output mechanisms, such as lights, a display, a speaker, or the like. Input received at remote control 124 (e.g., user speech, button presses, contact motions, etc.) can be communicated to media device 104 via remote control 124. I/O subsystem 240 can also include other input controller(s) 244. Other input controller(s) 244 can be coupled to other input/control devices 248, such as one or more buttons, rocker switches, a thumbwheel, an infrared port, a USB port, and/or a pointer device, such as a stylus.

In some examples, media device 104 can further include a memory interface 202 coupled to memory 250. Memory 250 can include any electronic, magnetic, optical, electromagnetic, infrared, or semiconductor system, apparatus, or device; a portable computer diskette (magnetic); a random access memory (RAM) (magnetic); a read-only memory (ROM) (magnetic); an erasable programmable read-only memory (EPROM) (magnetic); a portable optical disc such as CD, CD-R, CD-RW, DVD, DVD-R, or DVD-RW; or flash memory such as compact flash cards, secured digital cards, USB memory devices, memory sticks, and the like. In some examples, a non-transitory computer-readable storage medium of memory 250 can be used to store instructions (e.g., for performing portions or all of the various processes described herein) for use by or in connection with an instruction execution system, apparatus, or device, such as a computer-based system, processor-containing system, or other system that can fetch the instructions from the instruction execution system, apparatus, or device, and can execute the instructions. In other examples, the instructions (e.g., for performing portions or all of the various processes described herein) can be stored on a non-transitory computer-readable storage medium of server system 108, or can be divided between the non-transitory computer-readable storage medium of memory 250 and the non-transitory computer-readable storage medium of server system 108. In the context of this document, a "non-transitory computer-readable storage medium" can be any non-transitory medium that can contain or store the program for use by or in connection with the instruction execution system, apparatus, or device.

In some examples, memory 250 can store an operating system 252, a communication module 254, a graphical user interface (GUI) module 256, an on-device media module 258, an off-device media module 260, and an applications module 262. Operating system 252 can include instructions for handling basic system services and for performing hardware-dependent tasks. Communication module 254 can facilitate communicating with one or more additional devices, one or more computers, and/or one or more servers. Graphical user interface module 256 can facilitate graphical user interface processing. On-device media module 258 can facilitate storage and playback of media content stored locally on media device 104. Off-device media module 260 can facilitate streaming playback or download of media content obtained from an external source (e.g., on a remote server, on user device 122, etc.). Further, off-device media module 260 can facilitate receiving broadcast and cable content (e.g., channel tuning). Applications module 262 can facilitate various functionalities of media-related applications, such as web browsing, media processing, gaming, and/or other processes and functions.

As described herein, memory 250 can also store client-side digital assistant instructions (e.g., in a digital assistant client module 264) and various user data 266 (e.g., user-specific vocabulary data, preference data, and/or other data such as the user's media search history, media watch list, recently watched list, favorite media items, etc.) to, for example, provide the client-side functionalities of the digital assistant. User data 266 can also be used in performing speech recognition in support of the digital assistant or for any other application.

In various examples, digital assistant client module 264 can be capable of accepting voice input (e.g., speech input), text input, touch input, and/or gestural input through various user interfaces (e.g., I/O subsystem 240 or the like) of media device 104. Digital assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, digital assistant client module 264 can communicate with the digital assistant server (e.g., DA server 106) using communication subsystem 224.

In some examples, digital assistant client module 264 can utilize the various subsystems and peripheral devices to gather additional information related to media device 104 and from the surrounding environment of media device 104 to establish a context associated with a user, the current user interaction, and/or the current user input. Such context can also include information from other devices, such as from user device 122. In some examples, digital assistant client module 264 can provide the contextual information or a subset thereof with the user input to the digital assistant server to help infer the user's intent. The digital assistant can also use the contextual information to determine how to prepare and deliver outputs to the user. The contextual information can further be used by media device 104 or server system 108 to support accurate speech recognition.

In some examples, the contextual information that accompanies the user input can include sensor information, such as lighting, ambient noise, ambient temperature, distance to another object, and the like. The contextual information can further include information associated with the physical state of media device 104 (e.g., device location, device temperature, power level, etc.) or the software state of media device 104 (e.g., running processes, installed applications, past and present network activities, background services, error logs, resources usage, etc.). The contextual information can further include information received from the user (e.g., speech input), information requested by the user, and information presented to the user (e.g., information currently or previously displayed by the media device). The contextual information can further include information associated with the state of connected devices or other devices associated with the user (e.g., content displayed on user device 122, playable content on user device 122, etc.). Any of these types of contextual information can be provided to DA server 106 (or used on media device 104 itself) as contextual information associated with a user input.

In some examples, digital assistant client module 264 can selectively provide information (e.g., user data 266) stored on media device 104 in response to requests from DA server 106. Additionally or alternatively, the information can be used on media device 104 itself in executing speech recognition and/or digital assistant functions. Digital assistant client module 264 can also elicit additional input from the user via a natural language dialogue or other user interfaces upon request by DA server 106. Digital assistant client module 264 can pass the additional input to DA server 106 to help DA server 106 in intent inference and/or fulfillment of the user's intent expressed in the user request.

In various examples, memory 250 can include additional instructions or fewer instructions. Furthermore, various functions of media device 104 can be implemented in hardware and/or in firmware, including in one or more signal processing and/or application specific integrated circuits.

3. User Device

Figure 3:
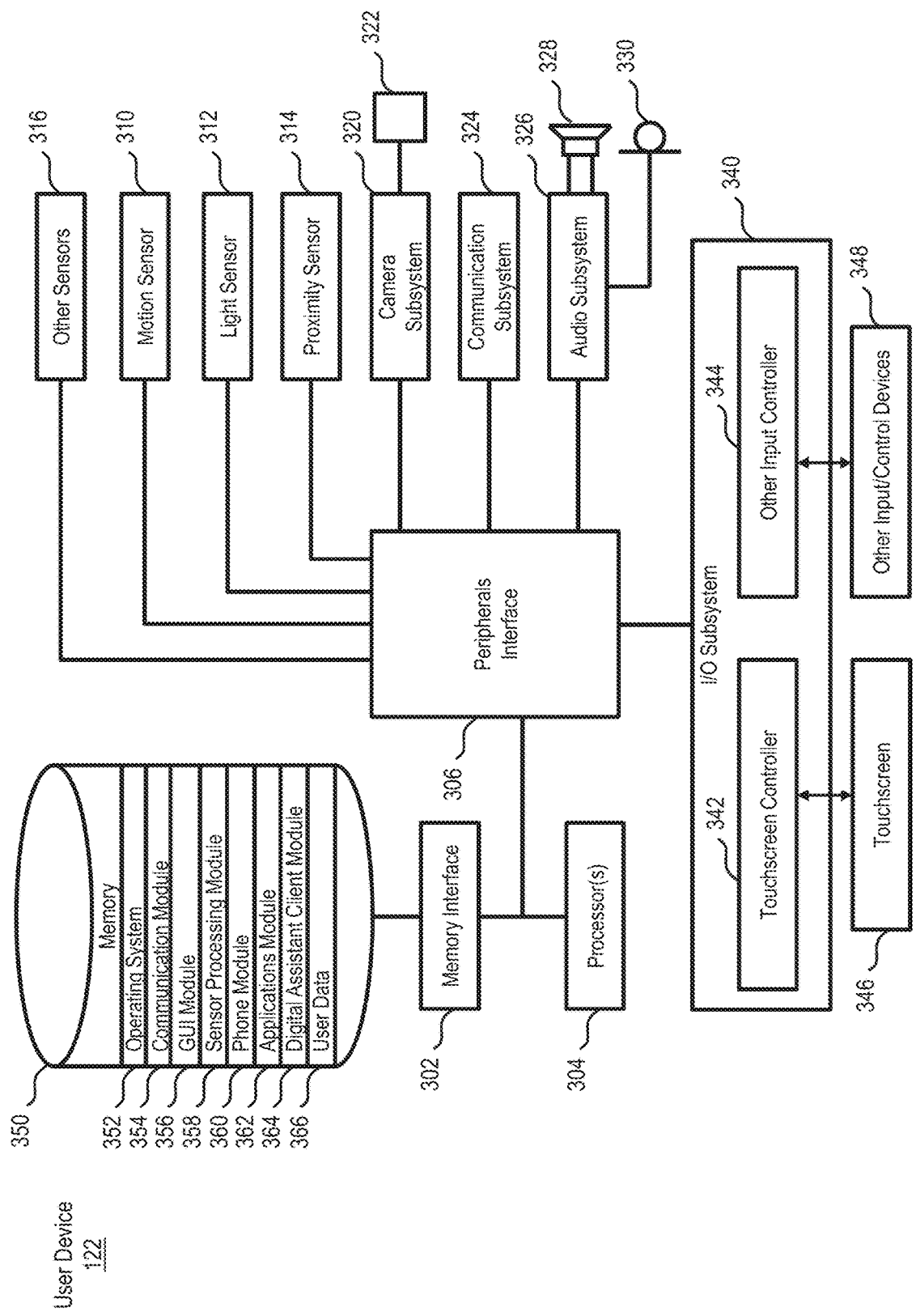
FIG. 3 is a block diagram illustrating a user device according to various examples.

FIG. 3 illustrates a block diagram of exemplary user device 122 according to various examples. As shown, user device 122 can include a memory interface 302, one or more processors 304, and a peripherals interface 306. The various components in user device 122 can be coupled together by one or more communication buses or signal lines. User device 122 can further include various sensors, subsystems, and peripheral devices that are coupled to the peripherals interface 306. The sensors, subsystems, and peripheral devices can gather information and/or facilitate various functionalities of user device 122.

For example, user device 122 can include a motion sensor 310, a light sensor 312, and a proximity sensor 314 coupled to peripherals interface 306 to facilitate orientation, light, and proximity-sensing functions. One or more other sensors 316, such as a positioning system (e.g., a GPS receiver), a temperature sensor, a biometric sensor, a gyroscope, a compass, an accelerometer, and the like, can also be connected to peripherals interface 306, to facilitate related functionalities.

In some examples, a camera subsystem 320 and an optical sensor 322 can be utilized to facilitate camera functions, such as taking photographs and recording video clips. Communication functions can be facilitated through one or more wired and/or wireless communication subsystems 324, which can include various communication ports, radio frequency receivers and transmitters, and/or optical (e.g., infrared) receivers and transmitters. An audio subsystem 326 can be coupled to speakers 328 and microphone 330 to facilitate voice-enabled functions, such as voice recognition, voice replication, digital recording, and telephony functions.

In some examples, user device 122 can further include an I/O subsystem 340 coupled to peripherals interface 306. I/O subsystem 340 can include a touchscreen controller 342 and/or other input controller(s) 344. Touchscreen controller 342 can be coupled to a touchscreen 346. Touchscreen 346 and the touchscreen controller 342 can, for example, detect contact and movement or break thereof using any of a plurality of touch-sensitivity technologies, such as capacitive, resistive, infrared, and surface acoustic wave technologies; proximity sensor arrays; and the like. Other input controller(s) 344 can be coupled to other input/control devices 348, such as one or more buttons, rocker switches, a thumb-wheel, an infrared port, a USB port, and/or a pointer device, such as a stylus.

In some examples, user device 122 can further include a memory interface 302 coupled to memory 350. Memory 350 can include any electronic, magnetic, optical, electromagnetic, infrared, or semiconductor system, apparatus, or device; a portable computer diskette (magnetic); a random access memory (RAM) (magnetic); a read-only memory (ROM) (magnetic); an erasable programmable read-only memory (EPROM) (magnetic); a portable optical disc such as CD, CD-R, CD-RW, DVD, DVD-R, or DVD-RW; or flash memory such as compact flash cards, secured digital cards, USB memory devices, memory sticks, and the like. In some examples, a non-transitory computer-readable storage medium of memory 350 can be used to store instructions (e.g., for performing portions or all of the various processes described herein) for use by or in connection with an instruction execution system, apparatus, or device, such as a computer-based system, processor-containing system, or other system that can fetch the instructions from the instruction execution system, apparatus, or device, and can execute the instructions. In other examples, the instructions (e.g., for performing portions or all of the various processes described herein) can be stored on a non-transitory computer-readable storage medium of server system 108, or can be divided between the non-transitory computer-readable storage medium of memory 350 and the non-transitory computer-readable storage medium of server system 108. In the context of this document, a "non-transitory computer-readable storage medium" can be any non-transitory medium that can contain or store the program for use by or in connection with the instruction execution system, apparatus, or device.

In some examples, memory 350 can store an operating system 352, a communication module 354, a graphical user interface (GUI) module 356, a sensor processing module 358, a phone module 360, and an applications module 362. Operating system 352 can include instructions for handling basic system services and for performing hardware-dependent tasks. Communication module 354 can facilitate communicating with one or more additional devices, one or more computers, and/or one or more servers. Graphical user interface module 356 can facilitate graphical user interface processing. Sensor processing module 358 can facilitate sensor-related processing and functions. Phone module 360 can facilitate phone-related processes and functions. Applications module 362 can facilitate various functionalities of user applications, such as electronic messaging, web browsing, media processing, navigation, imaging, and/or other processes and functions.

As described herein, memory 350 can also store client-side digital assistant instructions (e.g., in a digital assistant client module 364) and various user data 366 (e.g., user-specific vocabulary data, preference data, and/or other data such as the user's electronic address book, to-do lists, shopping lists, television program favorites, etc.) to, for example, provide the client-side functionalities of the digital assistant. User data 366 can also be used in performing speech recognition in support of the digital assistant or for any other application. Digital assistant client module 364 and user data 366 can be similar or identical to digital assistant client module 264 and user data 266, respectively, as described above with reference to FIG. 2.

In various examples, memory 350 can include additional instructions or fewer instructions. Furthermore, various functions of user device 122 can be implemented in hardware and/or in firmware, including in one or more signal processing and/or application-specific integrated circuits.

In some examples, user device 122 can be configured to control aspects of media device 104. For example, user device 122 can function as a remote control (e.g., remote control 124. User input received via user device 122 can be transmitted (e.g., using communication subsystem) to media device 104 to cause corresponding actions to be performed by media device 104. In addition, user device 122 can be configured to receive instructions from media device 104. For example, media device 104 can hand off tasks to user device 122 to perform and cause objects (e.g., selectable affordances) to be displayed on user device 122.

It should be understood that system 100 and media system 128 are not limited to the components and configuration shown in FIG. 1 and FIG. 2, and user device 122, media device 104, and remote control 124 are likewise not limited to the components and configuration shown in FIG. 2 and FIG. 3. System 100, media system 128, user device 122, media device 104, and remote control 124 can all include fewer or other components in multiple configurations according to various examples.

4. Digital Assistant System

Figure 4A:
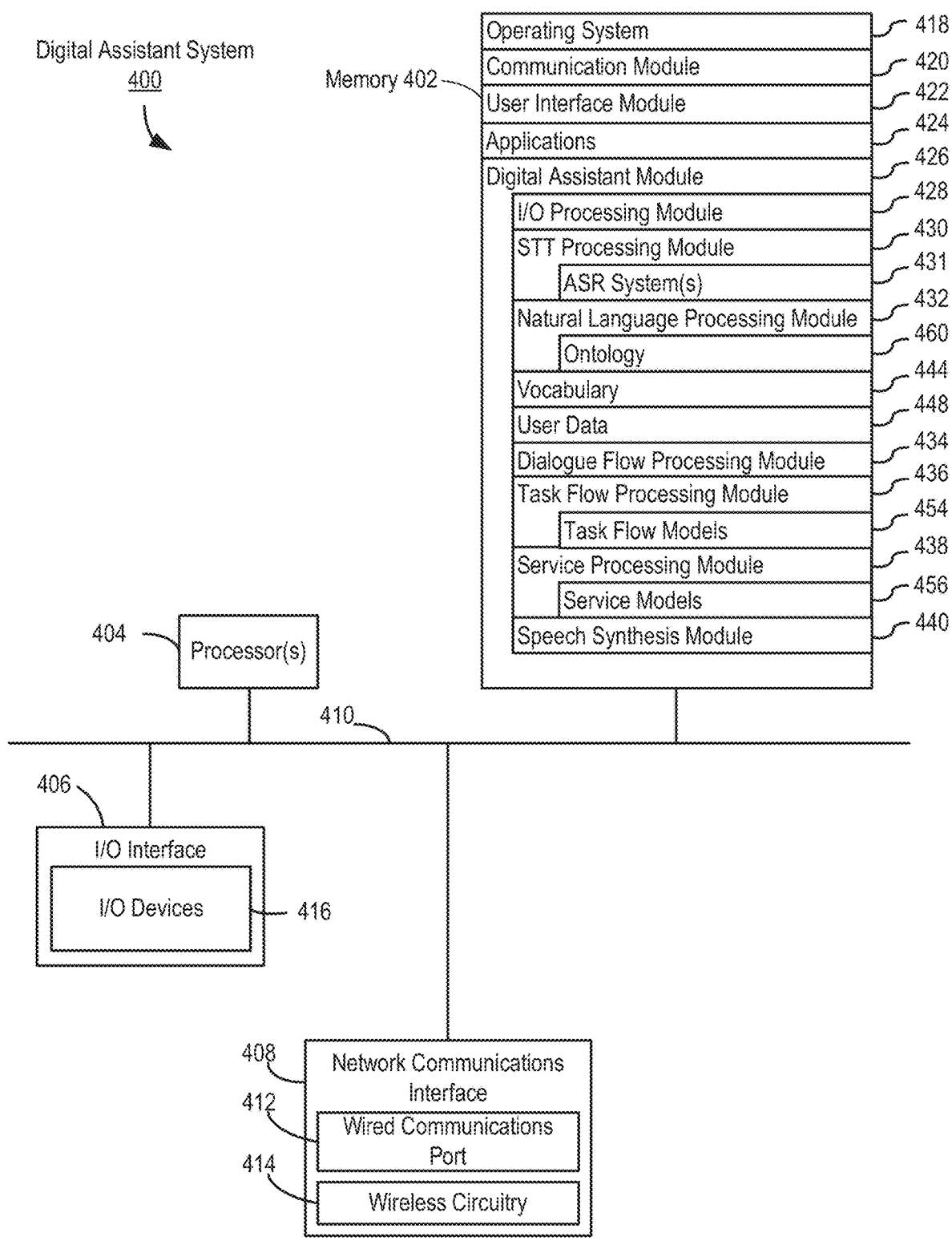
FIG. 4A is a block diagram illustrating a digital assistant system or a server portion thereof according to various examples.

FIG. 4A illustrates a block diagram of digital assistant system 400 in accordance with various examples. In some examples, digital assistant system 400 can be implemented on a standalone computer system. In some examples, digital assistant system 400 can be distributed across multiple computers. In some examples, some of the modules and functions of the digital assistant can be divided into a server portion and a client portion, where the client portion resides on one or more user devices (e.g., devices 104 or 122) and communicates with the server portion (e.g., server system 108) through one or more networks, e.g., as shown in FIG. 1. In some examples, digital assistant system 400 can be an implementation of server system 108 (and/or DA server 106) shown in FIG. 1. It should be noted that digital assistant system 400 is only one example of a digital assistant system, and that digital assistant system 400 can have more or fewer components than shown, may combine two or more components, or may have a different configuration or arrangement of the components. The various components shown in FIG. 4A can be implemented in hardware, software instructions for execution by one or more processors, firmware, including one or more signal processing and/or application-specific integrated circuits, or a combination thereof.

Digital assistant system 400 can include memory 402, one or more processors 404, I/O interface 406, and network communications interface 408. These components can communicate with one another over one or more communication buses or signal lines 410.

In some examples, memory 402 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 406 can couple I/O devices 416 of digital assistant system 400, such as displays, keyboards, touch screens, and microphones, to user interface module 422. I/O interface 406, in conjunction with user interface module 422, can receive user inputs (e.g., voice input, keyboard inputs, touch inputs, etc.) and process them accordingly. In some examples, e.g., when the digital assistant is implemented on a standalone user device, digital assistant system 400 can include any of the components and I/O communication interfaces described with respect to devices 104 or 122 in FIG. 2 or 3, respectively. In some examples, digital assistant system 400 can represent the server portion of a digital assistant implementation, and can interact with the user through a client-side portion residing on a client device (e.g., devices 104 or 122).

In some examples, the network communications interface 408 can include wired communication port(s) 412 and/or wireless transmission and reception circuitry 414. The wired communication port(s) can receive and send communication signals via one or more wired interfaces, e.g., Ethernet, Universal Serial Bus (USB), FIREWIRE, etc. The wireless circuitry 414 can receive and send RF signals and/or optical signals from/to communications networks and other communications devices. The wireless communications can use any of a plurality of communications standards, protocols, and technologies, such as GSM, EDGE, CDMA, TDMA, Bluetooth™, Wi-Fi, VoIP, Wi-MAX, or any other suitable communication protocol. Network communications interface 408 can enable communication between digital assistant system 400 with networks, such as the Internet, an intranet, and/or a wireless network, such as a cellular telephone network, a wireless local area network (LAN), and/or a metropolitan area network (MAN), and other devices.

In some examples, memory 402, or the computer-readable storage media of memory 402, can store programs, modules, instructions, and data structures including all or a subset of: operating system 418, communication module 420, user interface module 422, one or more applications 424, and digital assistant module 426. In particular, memory 402, or the computer-readable storage media of memory 402, can store instructions for performing process 800, described below. One or more processors 404 can execute these programs, modules, and instructions, and can read/write from/to the data structures.

Operating system 418 (e.g., Darwin™, RTXC, LINUX, UNIX, iOS™, OS X, WINDOWS, or an embedded operating system such as VxWorks™) can include various software components and/or drivers for controlling and managing general system tasks (e.g., memory management, storage device control, power management, etc.) and facilitates communications between various hardware, firmware, and software components.

Communications module 420 can facilitate communications between digital assistant system 400 with other devices over network communications interface 408. For example, communications module 420 can communicate with the communication subsystems (e.g., 224, 324) of electronic devices (e.g., 104, 122). Communications module 420 can also include various components for handling data received by wireless circuitry 414 and/or wired communications port 412.

User interface module 422 can receive commands and/or inputs from a user via I/O interface 406 (e.g., from a keyboard, touchscreen, pointing device, controller, and/or microphone), and generate user interface objects on a display. User interface module 422 can also prepare and deliver outputs (e.g., speech, sound, animation, text, icons, vibrations, haptic feedback, light, etc.) to the user via the I/O interface 406 (e.g., through displays, audio channels, speakers, touch-pads, etc.).

Applications 424 can include programs and/or modules that are configured to be executed by one or more processors 404. For example, if digital assistant system 400 is implemented on a standalone user device, applications 424 can include user applications, such as games, a calendar application, a navigation application, or an email application. If digital assistant system 400 is implemented on a server, applications 424 can include resource management applications, diagnostic applications, or scheduling applications, for example.

Memory 402 can also store digital assistant module 426 (or the server portion of a digital assistant). In some examples, digital assistant module 426 can include the following sub-modules, or a subset or superset thereof: I/O processing module 428, speech-to-text (STT) processing module 430, natural language processing module 432, dialogue flow processing module 434, task flow processing module 436, service processing module 438, and speech synthesis module 440. Each of these modules can have access to one or more of the following systems or data and models of the digital assistant module 426, or a subset or superset thereof: ontology 460, vocabulary index 444, user data 448, task flow models 454, service models 456, and automatic speech recognition (ASR) systems 431.

In some examples, using the processing modules, data, and models implemented in digital assistant module 426, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 4B:
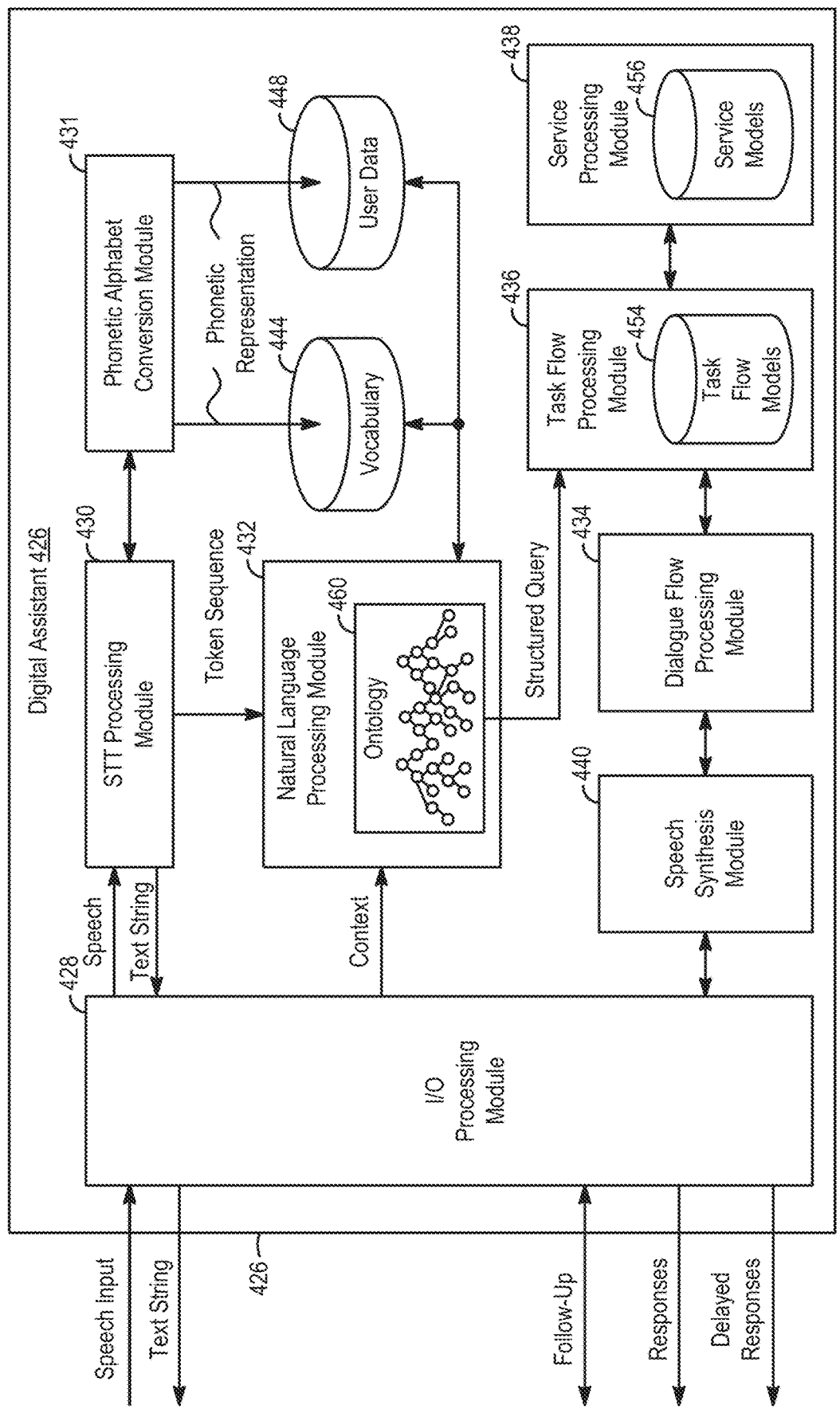
FIG. 4B illustrates the functions of the digital assistant shown in FIG. 4A according to various examples.

In some examples, as shown in FIG. 4B, I/O processing module 428 can interact with the user through I/O devices 416 in FIG. 4A or with an electronic device (e.g., devices 104 or 122) through network communications interface 408 in FIG. 4A to obtain user input (e.g., a speech input) and to provide responses (e.g., as speech outputs) to the user input. I/O processing module 428 can optionally obtain contextual information associated with the user input from the electronic device, along with or shortly after the receipt of the user input. The contextual information can include user-specific data, vocabulary, and/or preferences relevant to the user input. In some examples, the contextual information also includes software and hardware states of the electronic device at the time the user request is received, and/or information related to the surrounding environment of the user at the time that the user request was received. In some examples, I/O processing module 428 can also send follow-up questions to, and receive answers from, the user regarding the user request. When a user request is received by I/O processing module 428 and the user request can include speech input, I/O processing module 428 can forward the speech input to STT processing module 430 (or speech recognizer) for speech-to-text conversions.

STT processing module 430 can include one or more ASR systems (e.g., ASR systems 431). The one or more ASR systems can process the speech input that is received through I/O processing module 428 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the electronic device (e.g., device 104 or 122) to produce the recognition result. Once STT processing module 430 produces recognition results containing a text string (e.g., words, sequence of words, or sequence of tokens), the recognition result can be passed to natural language processing module 432 for intent deduction.

In some examples, one or more language models of the one or more ASR systems can be configured to be biased toward media-related results. In one example, the one or more language models can be trained using a corpus of media-related text. In another example, the ASR system can be configured to favor media-related recognition results. In some examples, the one or more ASR systems can include static and dynamic language models. Static language models can be trained using general corpuses of text, while dynamic language models can be trained using user-specific text. For example, text corresponding to previous speech input received from users can be used to generate dynamic language models. In some examples, the one or more ASR systems can be configured to generate recognition results that are based on static language models and/or dynamic language models. Further, in some examples, the one or more ASR systems can be configured to favor recognition results that correspond to previous speech input that is more recently received.

Additional details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 430 can include and/or access a vocabulary of recognizable words via phonetic alphabet conversion module 431. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪroʊ/ and /z,25/. Further, vocabulary words can be associated with custom candidate pronunciations that are based on previous speech inputs from the user. Such custom candidate pronunciations can be stored in STT processing module 430 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /z,25/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 430 can be used to determine the phonemes corresponding to the speech input (e.g., using an acoustic model), and can then attempt to determine words that match the phonemes (e.g., using a language model). For example, if STT processing module 430 can first identify the sequence of phonemes /tə'meɪroʊ/ corresponding to a portion of the speech input, it can then determine, based on vocabulary index 444, that this sequence corresponds to the word "tomato."

In some examples, STT processing module 430 can use approximate matching techniques to determine words in an utterance. Thus, for example, the STT processing module 430 can determine that the sequence of phonemes /tə'meɪroʊ/ corresponds to the word "tomato," even if that particular sequence of phonemes is not one of the candidate sequence of phonemes for that word.

Natural language processing module 432 ("natural language processor") of the digital assistant can take the sequence of words or tokens ("token sequence") generated by STT processing module 430, and attempt to associate the token sequence with one or more "actionable intents" recognized by the digital assistant. An "actionable intent" can represent a task that can be performed by the digital assistant, and can have an associated task flow implemented in task flow models 454. The associated task flow can be a series of programmed actions and steps that the digital assistant takes in order to perform the task. The scope of a digital assistant's capabilities can be dependent on the number and variety of task flows that have been implemented and stored in task flow models 454, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 430, natural language processing module 432 can also receive contextual information associated with the user request, e.g., from I/O processing module 428. The natural language processing module 432 can optionally use the contextual information to clarify, supplement, and/or further define the information contained in the token sequence received from STT processing module 430. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 460. Ontology 460 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 460 can define how a parameter represented by the property node pertains to the task represented by the actionable intent node.

Figure 4C:
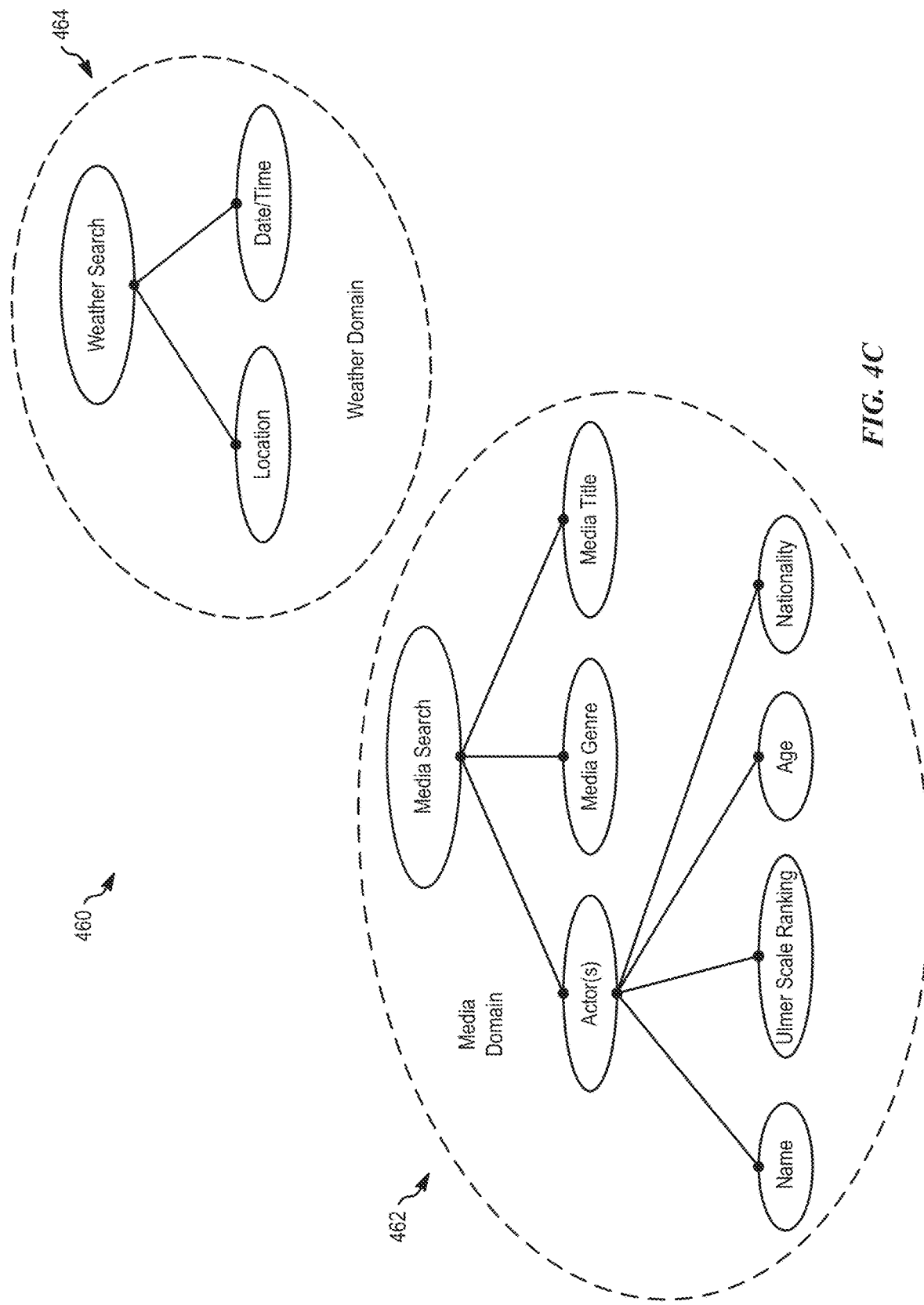
FIG. 4C illustrates a portion of an ontology according to various examples.

In some examples, ontology 460 can be made up of actionable intent nodes and property nodes. Within ontology 460, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 4C, ontology 460 can include a "media" node (i.e., an actionable intent node). Property nodes "actor(s)," "media genre," and "media title," can each be directly linked to the actionable intent node (i.e., the "media search" node). In addition, property nodes "name," "age," "Ulmer scale ranking," and "nationality" can be sub-nodes of the property node "actor."

In another example, as shown in FIG. 4C, ontology 460 can also include a "weather" node (i.e., another actionable intent node). Property nodes "date/time" and "location" can each be linked to the "weather search" node. It should be recognized that in some examples, one or more property nodes can be relevant to two or more actionable intents. In these examples, the one or more property nodes can be linked to the respective nodes corresponding to the two or more actionable intents in ontology 460.

An actionable intent node, along with its linked concept nodes, can be described as a "domain." In the present discussion, each domain can be associated with a respective actionable intent, and can refer to the group of nodes (and the relationships there between) associated with the particular actionable intent. For example, ontology 460 shown in FIG. 4C can include an example of media domain 462 and an example of weather domain 464 within ontology 460.

Media domain 462 can include the actionable intent node "media search" and property nodes "actor(s)," "media genre," and "media title." Weather domain 464 can include the actionable intent node "weather search," and property nodes "location" and "date/time." In some examples, ontology 460 can be made up of many domains. Each domain can share one or more property nodes with one or more other domains.

While FIG. 4C illustrates two example domains within ontology 460, other domains can include, for example, "athletes," "stocks," "directions," "media settings," "sports team," and "time," "tell joke," and so on. An "athletes" domain can be associated with a "search athlete information" actionable intent node, and may further include property nodes such as "athlete name," "athlete team," and "athlete statistics."

In some examples, ontology 460 can include all the domains (and hence actionable intents) that the digital assistant is capable of understanding and acting upon. In some examples, ontology 460 can be modified, such as by adding or removing entire domains or nodes, or by modifying relationships between the nodes within the ontology 460.

In some examples, each node in ontology 460 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 444 in association with the property or actionable intent represented by the node. For example, returning to FIG. 4C, the vocabulary associated with the node for the property of "actor" can include words such as "A-list," "Reese Witherspoon," "Arnold Schwarzenegger," "Brad Pitt," and so on. For another example, the vocabulary associated with the node for the actionable intent of "weather search" can include words and phrases such as "weather," "what's it like in," "forecast," and so on. The vocabulary index 444 can optionally include words and phrases in different languages.

Natural language processing module 432 can receive the token sequence (e.g., a text string) from STT processing module 430, and determine what nodes are implicated by the words in the token sequence. In some examples, if a word or phrase in the token sequence is found to be associated with one or more nodes in ontology 460 (via vocabulary index 444), the word or phrase can "trigger" or "activate" those nodes. Based on the quantity and/or relative importance of the activated nodes, natural language processing module 432 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 448 can include user-specific information, such as user-specific vocabulary, user preferences, user address, user's default and secondary languages, user's contact list, and other short-term or long-term information for each user. In some examples, natural language processing module 432 can use the user-specific information to supplement the information contained in the user input to further define the user intent. For example, for a user request "How's the weather this week," natural language processing module 432 can access user data 448 to determine where the user is located, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 432 identifies an actionable intent (or domain) based on the user request, natural language processing module 432 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Find me other seasons of this TV series." In this case, natural language processing module 432 can correctly identify the actionable intent to be "media search" based on the user input. According to the ontology, a structured query for a "media" domain may include parameters such as {media actor}, {media genre}, {media title}, and the like. In some examples, based on the speech input and the text derived from the speech input using STT processing module 430, natural language processing module 432 can generate a partial structured query for the restaurant reservation domain, where the partial structured query includes the parameters {media genre="television series"}. However, in this example, the user's utterance contains insufficient information to complete the structured query associated with the domain. Therefore, other necessary parameters such as {media title} may not be specified in the structured query based on the information currently available. In some examples, natural language processing module 432 can populate some parameters of the structured query with received contextual information. For example, the TV series "Mad Men" can be currently playing on the media device. Based on this contextual information, natural language processing module 432 can populate the {media title} parameter in the structured query with "Mad Men."

In some examples, natural language processing module 432 can pass the generated structured query (including any completed parameters) to task flow processing module 436 ("task flow processor"). Task flow processing module 436 can be configured to receive the structured query from natural language processing module 432, complete the structured query, if necessary, and perform the actions required to "complete" the user's ultimate request. In some examples, the various procedures necessary to complete these tasks can be provided in task flow models 454. In some examples, task flow models 454 can include procedures for obtaining additional information from the user and task flows for performing actions associated with the actionable intent.

As described above, in order to complete a structured query, task flow processing module 436 may need to initiate additional dialogue with the user in order to obtain additional information, and/or disambiguate potentially ambiguous utterances. When such interactions are necessary, task flow processing module 436 can invoke dialogue flow processing module 434 to engage in a dialogue with the user. In some examples, dialogue flow processing module 434 can determine how (and/or when) to ask the user for the additional information and can receive and process the user responses. The questions can be provided to and answers can be received from the users through I/O processing module 428. In some examples, dialogue flow processing module 434 can present dialogue output to the user via audio and/or visual output, and can receive input from the user via spoken or physical (e.g., clicking) responses. For example, the user may ask "What's the weather like in Paris?" When task flow processing module 436 invokes dialogue flow processing module 434 to determine the "location" information for the structured query associated with the domain "weather search," dialogue flow processing module 434 can generate questions such as "Which Paris?" to pass to the user. Additionally, dialogue flow processing module 434 can cause affordances associated with "Paris, Texas" and "Paris, France" to be presented for user selection. Once a response is received from the user, dialogue flow processing module 434 can then populate the structured query with the missing information, or pass the information to task flow processing module 436 to complete the missing information from the structured query.

Once task flow processing module 436 has completed the structured query for an actionable intent, task flow processing module 436 can proceed to perform the ultimate task associated with the actionable intent. Accordingly, task flow processing module 436 can execute the steps and instructions in task flow model 454 according to the specific parameters contained in the structured query. For example, the task flow model for the actionable intent of "media search" can include steps and instructions for performing a media search query to obtain relevant media items. For example, using a structured query such as: {media search, media genre=TV series, media title=Mad Men}, task flow processing module 436 can perform the steps of: (1) performing a media search query using a media database to obtain relevant media items, (2) ranking the obtained media items according to relevancy and/or popularity, and (3) displaying the media items sorted according to relevancy and/or popularity.

In some examples, task flow processing module 436 can employ the assistance of service processing module 438 ("service processing module") to complete a task requested in the user input or to provide an informational answer requested in the user input. For example, service processing module 438 can act on behalf of task flow processing module 436 to perform a media search, retrieve weather information, invoke or interact with applications installed on other user devices, and invoke or interact with third-party services (e.g., a social networking website, media review websites, media subscription services, etc.). In some examples, the protocols and API required by each service can be specified by a respective service model among service models 456. Service processing module 438 can access the appropriate service model for a service and generate requests for the service in accordance with the protocols and APIs required by the service according to the service model.

For example, a third-party media search service can submit a service model specifying the necessary parameters for performing a media search and the APIs for communicating the values of the necessary parameters to the media search service. When requested by task flow processing module 436, service processing module 438 can establish a network connection with the media search service and send the necessary parameters of the media search (e.g., media actor, media genre, media title) to the online reservation interface in a format according to the API of the media search service.

In some examples, natural language processing module 432, dialogue flow processing module 434, and task flow processing module 436 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 440 (e.g., speech synthesizer) where it can be processed to synthesize the dialogue response in speech form. In yet other examples, the generated response can be data content relevant to satisfying a user request in the speech input.

Speech synthesis module 440 can be configured to synthesize speech outputs for presentation to the user. Speech synthesis module 440 synthesizes speech outputs based on text provided by the digital assistant. For example, the generated dialogue response can be in the form of a text string. Speech synthesis module 440 can convert the text string to an audible speech output. Speech synthesis module 440 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 440 can be configured to synthesize individual words based on phonemic strings corresponding to the words. For example, a phonemic string can be associated with a word in the generated dialogue response. The phonemic string can be stored in metadata associated with the word. Speech synthesis module 440 can be configured to directly process the phonemic string in the metadata to synthesize the word in speech form.

In some examples, instead of (or in addition to) using speech synthesis module 440, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Process for Interacting with a Digital Assistant in a Media Environment

FIGS. 5A-I illustrate process 500 for operating a digital assistant of a media system according to various examples. Process 500 can be performed using one or more electronic devices implementing a digital assistant. For example, process 500 can be performed using one or more of system 100, media system 128, media device 104, user device 122, or digital assistant system 400, described above. FIGS. 6A-6N and 6P-6Q depict screen shots displayed by a media device on a display unit at various stages of process 500, according to various examples. Process 500 is described below with simultaneous reference to FIGS. 5A-I and 6A-Q. It should be appreciated that some operations in process 500 can be combined, the order of some operations can be changed, and some operations can be omitted.

At block 502 of process 500, content can be displayed on a display unit (e.g., display unit 126). In the present example shown in FIG. 6A, the displayed content can include media content 602 (e.g., movies, videos, television shows, video games, etc.) that is playing on a media device (e.g., media device 104). In other examples, the displayed content can include other content associated with the media device, such as content associated with an application running on the media device or a user interface for interacting with a digital assistant of the media device. In particular, the displayed content can include a main menu user interface or a user interface with objects or results previously requested by a user (e.g., second user interface 618 or third user interface 626).

At block 504 of process 500, a user input can be detected. The user input can be detected while the content of block 502 is being displayed. In some examples, the user input can be detected on a remote control (e.g., remote control 124) of the media device. In particular, the user input can be a user interaction with the remote control, such as the pressing of a button (e.g., button 274) or the contacting of a touch-sensitive surface (e.g., touch-sensitive surface 278) of the remote control. In some examples, the user input can be detected via a second electronic device (e.g., device 122) that is configured to interact with the media device. In response to detecting the user input, one or more of blocks 506-592 can be performed.

At block 506 of process 500, a determination can be made as to whether the user input corresponds to a first input type. The first input type can be a predefined input to the media device. In one example, the first input type can include pressing a particular button of the remote control and releasing the button within a predetermined duration of pressing the button (e.g., a short press). The media device can determine whether the user input matches the first input type. In accordance with a determination that the user input corresponds to a first input type, one or more of blocks 508-514 can be performed.

Figure 6A:
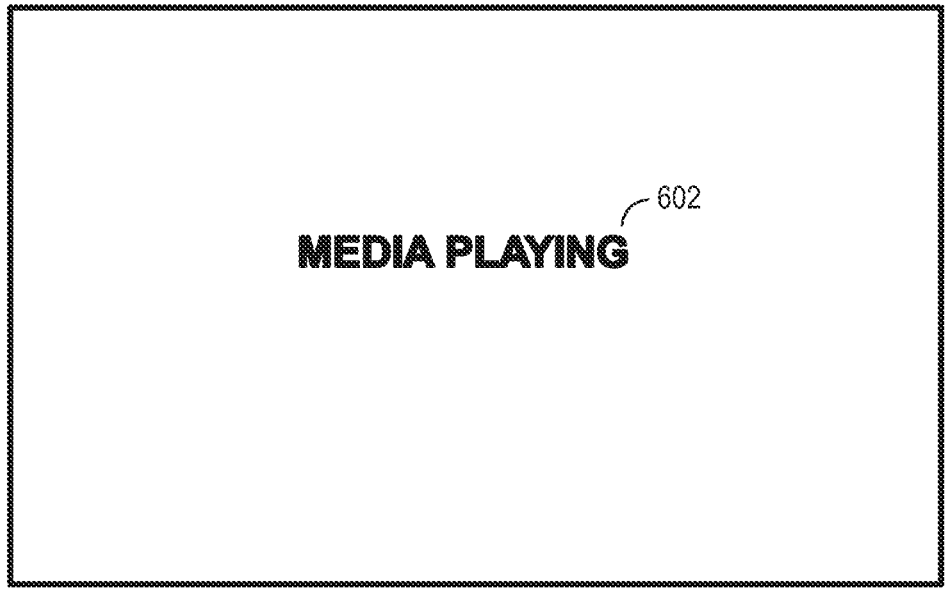
FIGS. 6A-6N and 6P-6Q illustrate screen shots displayed by a media device on a display unit at various stages of the process shown in FIGS. 5A-I according to various examples.
Figure 6B:
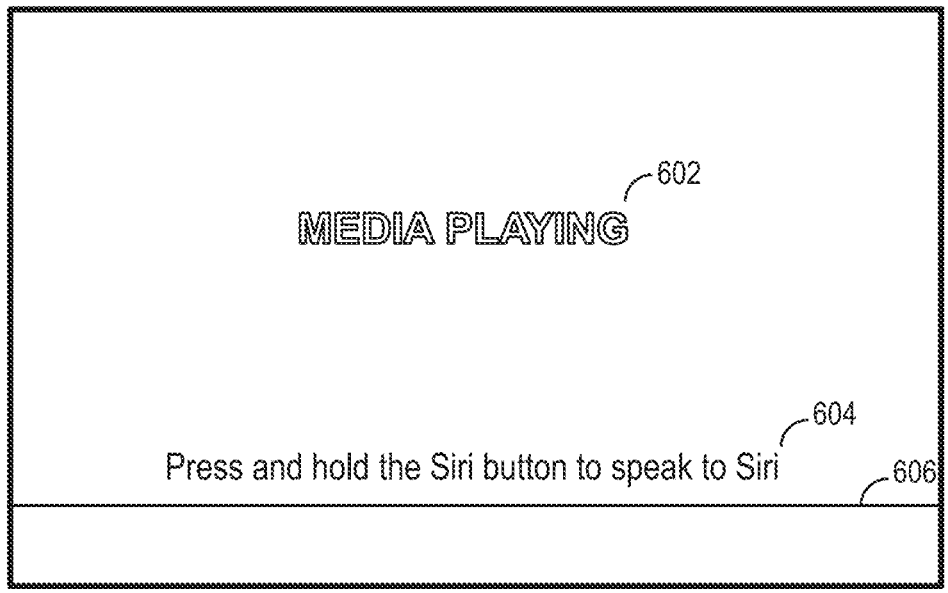
FIG. 6O is intentionally omitted to avoid any confusion between the capital letter O and the numeral 0 (zero).

At block 508 of process 500 and with reference to FIG. 6B, textual instructions 604 for invoking and interacting with the digital assistant can be displayed. Specifically, instructions 604 can describe the user input required to invoke and interact with the digital assistant. For example, instructions 604 can explain how to perform the second input type described below at block 516.

At block 510 of process 500 and as shown in FIG. 6B, passive visual indicator 606 can be displayed on the display unit. Passive visual indicator 606 can indicate that the digital assistant has yet to be invoked. In particular, the microphone (e.g., microphone 272) of the media device may not be activated in response to detecting the user input. Passive visual indicator 606 can thus serve as a visual signal that the digital assistant is not processing audio input. In the present example, visual indicator 606 can be a passive flat waveform that does not respond to a user's speech. Further, passive visual indicator 606 can include neutral colors (e.g., black, grey, etc.) to indicate its passive status. It should be recognized that other visual patterns or images can be contemplated for the passive visual indicator. Passive visual indicator 606 can be displayed simultaneously with instructions

604. Further, passive visual indicator 606 can be continuously displayed while performing one or more of blocks 512-514.

Figure 6C:
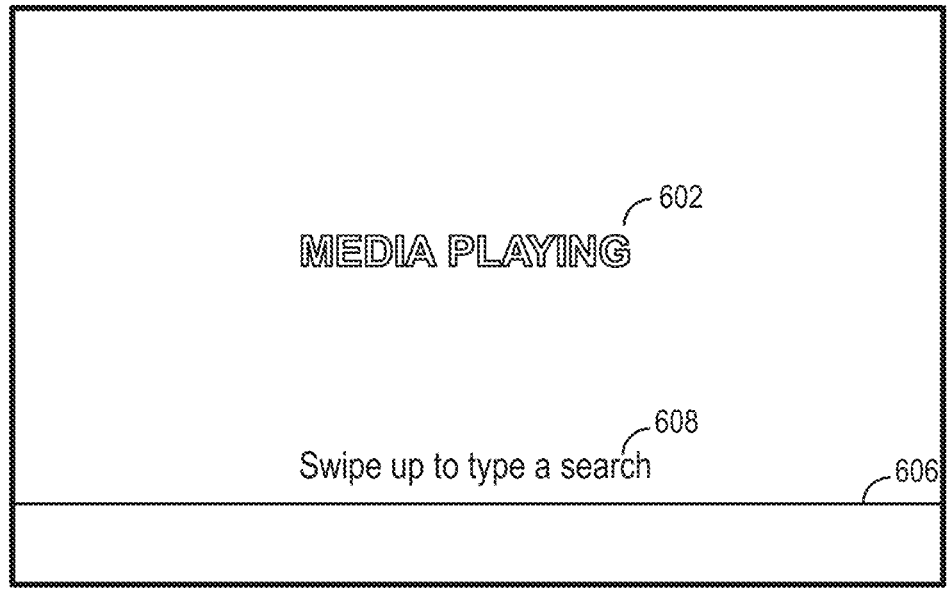

At block 512 of process 500 and with reference to FIG. 6C, instructions 608 for performing a typed search can be displayed on the display unit. Specifically, instructions 608 can describe the user input required to display a virtual keyboard interface that can be used to perform a typed search. In some examples, instructions 604 for invoking and interacting with the digital assistant and instructions 608 for performing a typed search can be displayed in sequence and at different times. For example, the display of instruction 608 may replace the display of instruction 604 or vice versa. In the present example, instructions 604, 608 are in text form. It should be recognized that in other examples, instruction 604, 608 can be in graphical form (e.g., pictures, symbols, animations, etc.).

Figure 6D:
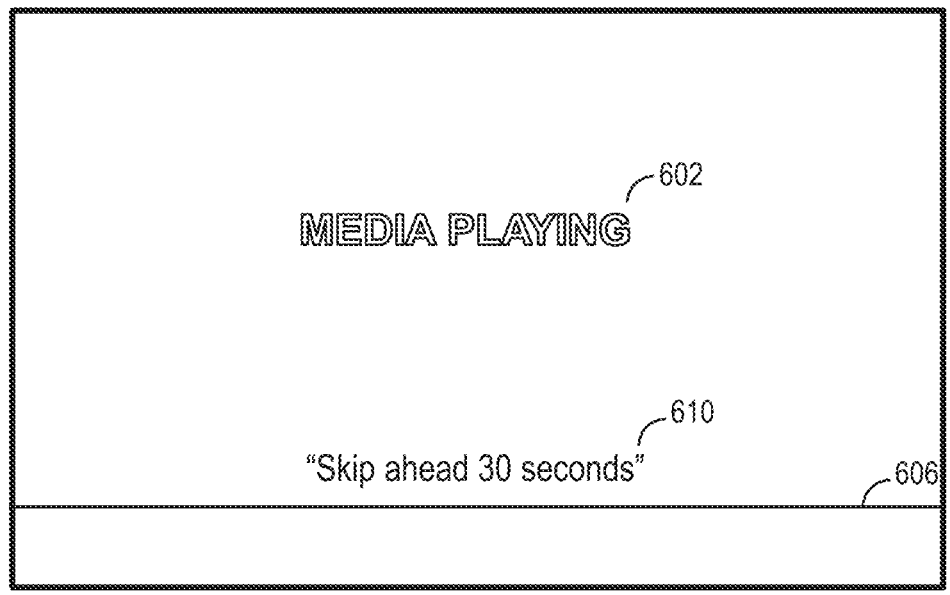
Figure 6E:
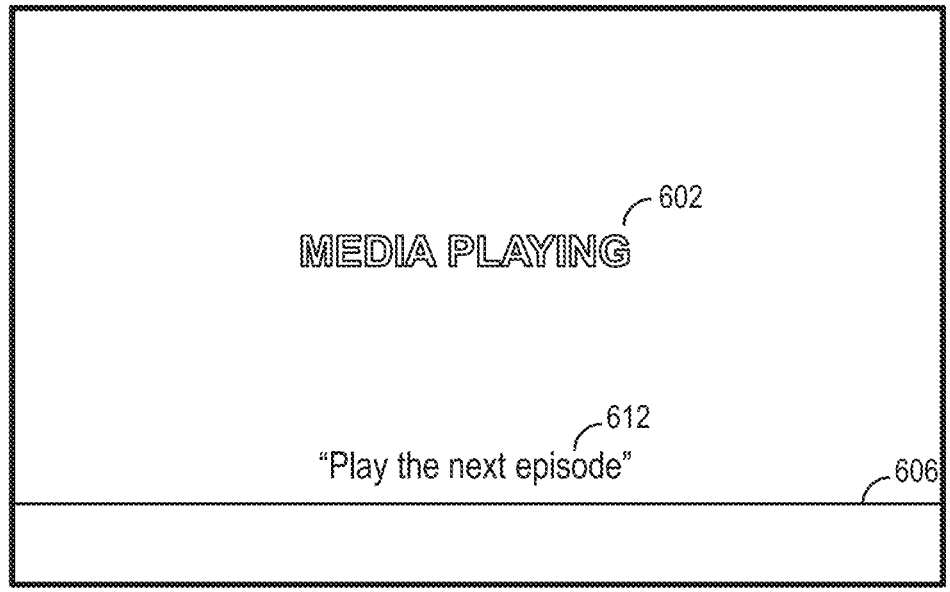

At block 514 of process 500, one or more exemplary natural language requests can be displayed on the display unit. For example, FIGS. 6D-E depict two different exemplary natural language requests 610, 612 displayed on the display unit. In some examples, the exemplary natural language requests can be displayed via a first user interface on the display unit. The first user interface can be overlaid on the displayed content. The exemplary natural language requests can provide guidance to the user for interacting with the digital assistant. Further, the exemplary natural language requests can inform the user of the various capabilities of the digital assistant. In response to receiving a user utterance corresponding to one of the exemplary natural language requests, the digital assistant can cause a respective action to be performed. For example, in response to the digital assistant of the media device being invoked (e.g., by user input of a second input type at block 504) and provided with the user utterance of "Skip ahead 30 seconds" (e.g., at block 518), the digital assistant can cause the media content playing on the media device to jump forward by 30 seconds.

The displayed exemplary natural language requests can be contextually-related to the content being displayed (e.g., media content 602). For example, a set of exemplary natural language requests can be stored on the media device or on a separate server. Each exemplary natural language request in the set of exemplary natural language requests can be associated with one or more contextual attributes (e.g., media content being played, home page, iTunes™ media store, actors, movies, weather, sports, stocks, etc.). In some examples, block 514 can include identifying exemplary natural language requests from the set of exemplary natural language requests having contextual attributes corresponding to the displayed content on the display unit. The identified exemplary natural language requests can then be displayed on the display unit. Thus, different exemplary natural language requests can be displayed for different displayed content on the display unit. Displaying contextually-related exemplary natural language requests can serve to conveniently inform the user of the capabilities of the digital assistant that are most relevant to the user's current use condition on the media device. This can improve overall user experience.

In the present example shown in FIGS. 6D-E, exemplary natural language requests 610, 612 can each be contextually-related to media content 602 on the display unit. In particular, exemplary natural language requests 610, 612 can be requests for modifying or controlling one or more settings associated with the media content playing on the media device. Such exemplary natural language requests can include requests for turning on/off closed captioning, turning on subtitles in a particular language, rewinding/skipping ahead, pausing play of the media content, restarting play of the media content, slowing down or speeding up play of the media content, increasing/decreasing the volume (e.g., audio gain) of the media content, and the like. Further, other exemplary natural language requests that are contextually-related to media content 602 can include requests for adding the media item corresponding to media content 602 to the user's watch list, showing information related to media content 602 (e.g., actor information, plot summaries, release date, etc.), showing other media items or content related to the media content 602 (e.g., same series, same season, same actor/director, same genre, etc.), and the like.

In examples where the displayed content includes content associated with an application of the media device, contextually-related exemplary natural language requests can include requests to modify one or more settings or states of the application. In particular, the exemplary natural language requests can include a request to open or close the application or to manipulate one or more features of the application.

In some examples, the displayed content can include a user interface for searching, browsing, or selecting items (e.g., second user interface 618 or third user interface 626). In particular, the displayed user interface can include one or more media items. Further, the focus of the user interface can be on a media item of the one or more media items (e.g., media item 623 highlighted by cursor 624 in FIG. 6G). In these examples, the contextually-related exemplary natural language requests can include requests for information or for other media items pertaining to one or more media items in the displayed user interface. In particular, the exemplary natural language requests can include requests related to the media item that is the focus of the user interface. In these examples, exemplary natural language requests can include requests such as "What's this about?", "What's this rated?", "Who's in this?", "When does the next episode come out?", "Show me more movies like this.", and "Show me movies starring the same actor." In a specific example, information related to a media item or a series of media items, such as the television series Mad Men, can be displayed via the user interface. In this example, the contextually-related exemplary natural language requests can include requests based on one or more attributes (e.g., cast, plot, rating, release date, director, provider, etc.) of the media item or series of media items (e.g., "Other shows with January Jones."). In addition, contextually-related exemplary natural language requests can include requests to play, select, or procure the focused media item or another media item displayed in the user interface (e.g., "Rent this.", "Play this.", "Buy this.", or "Play How to Train Your Dragon 2.") or requests to navigate through the media items in the user interface (e.g., "Go to comedies." or "Jump to horror movies."). Further, in these examples, contextually-related exemplary natural language requests can include requests to search for other media items (e.g., "Find new comedies.", "Show free, great movies.", or "What are some shows starring Nicole Kidman?").

In some examples, the displayed content can include media items organized according to a particular category or topic. In these examples, the contextually-related exemplary natural language requests can include requests related to that particular category or topic. For instance, in an example where the displayed content includes media items organized according to various actors, the contextually-related exemplary natural language requests can include requests for information or media items related to actors (e.g., "What movies star Jennifer Lawrence?", "How old is Scarlett Johansson?", or "What are Brad Pitt's newest movies?"). In another example where the displayed content includes media items organized according to programming channels or content providers (e.g., channel page or TV guide page), the contextually-related exemplary natural language requests can include requests for information or media items related to the programming channels or content providers (e.g., "What's showing in an hour?", "What's on HBO during prime time?", "Tune into ABC.", or "Which channels are showing basketball?"). In yet another example where the displayed content includes media items that were recently selected by the user (e.g., "recently played" list) or were identified as being of interest to the user (e.g., "watch list"), the contextually-related exemplary natural language requests can include requests to watch or continue watching one of the media items (e.g., "Pick up where I left off.", "Continue watching Birdman.", or "Play this again from the beginning.").

In some examples, the displayed content can include a user interface containing results or information corresponding to a particular topic. In particular, the results can be associated with a previous user request (e.g., a request to the digital assistant) and can include information corresponding to a topic such as weather, stock, or sports. In these examples, the contextually-related exemplary natural language requests can include requests to refine the results or requests for additional information pertaining to the particular topic. For instance, in an example where the displayed content includes weather information for a particular location, the contextually-related exemplary natural language requests can include requests to display additional weather information for another location or for a different time frame (e.g., "How about in New York City?", "What does it look like for next week?, "And for Hawaii?", etc.) In another example where the displayed content includes information related to a sports team or athlete, the contextually-related exemplary natural language requests can include requests to provide additional information related to sports team or athletes (e.g., "How tall is Shaquille O'Neal?", "When was Tom Brady born?", "When do the 49ers play next?", "How did Manchester United do in their last game?", "Who plays point guard for the LA Lakers?", etc.). In yet another example where the displayed content includes information related to stocks, the contextually-related exemplary natural language requests can include requests for additional stock-related information (e.g., "What's the opening price of S&P 500?", "How is Apple™ doing?", "What was the close of the Dow Jones™ yesterday?", etc.). Further, in some examples, the displayed content can include a user interface containing media search results associated with a previous user request. In these examples, the contextually-related exemplary natural language requests can include requests for refining the displayed media search results (e.g., "Just the ones from last year," "Only the ones rated G," "Just the free ones," etc.) or requests for performing a different media search (e.g., "Find good action movies," "Show me some Jackie Chan movies," etc.).

In some examples, the displayed content can include the main menu user interface of the media device. The main menu user interface can be, for example, the home screen or the root directory of the media device. In these examples, the contextually-related exemplary natural language requests can include requests representing the various capabilities of the digital assistant. In particular, the digital assistant can have a set of core competencies associated with the media device and the contextually-related exemplary natural language requests can include requests related to each of the core competencies of the digital assistant (e.g., "Show me good movies that are free," "What's the weather?," "Play the next episode of Breaking Bad," or "What's Apple's™ stock price?").

The exemplary natural language requests can be in natural language form. This can serve to inform the user that the digital assistant is capable of understanding natural language requests. Further, in some examples, the exemplary natural language requests can be contextually ambiguous to inform the user that the digital assistant is capable of inferring the proper user intent associated with the user's request based on the displayed content. In particular, as shown in the examples described above, the exemplary natural language requests can include contextually ambiguous terms such as "this" or "ones" or contextually ambiguous phrases such as "Just the free ones." or "What about in New York?" These exemplary natural language requests can inform the user that the digital assistant is capable of determining the proper context associated with such requests based on the displayed content. This encourages the user to rely on the context of the displayed content when interacting with the digital assistant, which can be desirable to promote a more natural interactive experience with the digital assistant.

In some examples, block 514 can be performed after blocks 508-512. In particular, the exemplary natural language requests can be displayed on the display unit at a predetermined amount of time after determining at block 506 that the user input corresponds to a first input type. It should be recognized that in some examples, blocks 508-514 can be performed in any order and that in some examples, two or more of blocks 508-514 can be perform simultaneously.

In some examples, the exemplary natural language requests are displayed in a predetermined sequence and on a rotating basis. Each exemplary natural language request can be displayed separately at different times. In particular, display of a current exemplary natural language request can be replaced with display of a subsequent exemplary natural language request. For example, as shown in FIG. 6D, exemplary natural language request 610 can be displayed at first. After a predetermined amount of time, display of exemplary natural language request 610 ("Skip ahead 30 seconds") can be replaced with display of exemplary natural language request 612 ("Play the next episode") as shown in FIG. 6E. Thus, in this example, exemplary natural language request 610 and exemplary natural language request 612 are displayed one at a time rather than simultaneously.

In some examples, the exemplary natural language requests can be grouped into multiple lists where each list includes one or more exemplary natural language requests. In these examples, block 514 can include displaying the lists of exemplary natural language requests on the display unit. Each list can be displayed in a predetermined sequence and at a different time. Further, the lists can be displayed on a rotating basis.

While performing one or more of blocks 508-514, the displayed content can continue to be displayed on the display unit. For example, as shown in FIGS. 6B-6E media content 602 can continue to be played on the media device and displayed on the display unit while blocks 508-512 are performed. Further, audio associated with the media content can be outputted by the media device while playing the media content. In some examples, the amplitude of the audio is not reduced in response to detecting the user input or in accordance with a determination that the user input corresponds to a first input type. This can be desirable to reduce disruption to the consumption of media content 602 being played. The user can thus continue following media content 602 via the audio output despite elements 604-612 being displayed on the display unit.

In some examples, as represented by the outlined font of media content 602 in FIGS. 6B-D, the brightness of the displayed content can be reduced (e.g., by 20-40%) in response to detecting the user input or in accordance with a determination that the user input corresponds to a first input type. In these examples, the displayed elements 604-612 can be overlaid on the displayed media content 602. Reducing the brightness can serve to highlight displayed elements 604-612. At the same time, media content 602 can still be discernable on the display unit, thereby enabling the user to continue consuming media content 602 while elements 604-612 are displayed.

While performing one of blocks 508-512, the digital assistant can be invoked (e.g., by detecting a user input of a second input type at block 504), and a user utterance corresponding to one of the exemplary natural language requests can be received (e.g., at block 518). The digital assistant can then perform a task in response to the request received (e.g., at block 532). Additional details regarding invoking and interacting with the digital assistant are provided below with reference to FIGS. 5B-I. Further, while performing one of blocks 508-512, a virtual keyboard interface can be invoked (e.g., by detecting a fifth user input at block 558) to perform a typed search. Additional details regarding invoking the virtual keyboard interface and performing a typed search are provided below with reference to FIG. 5G.

Figure 5A:
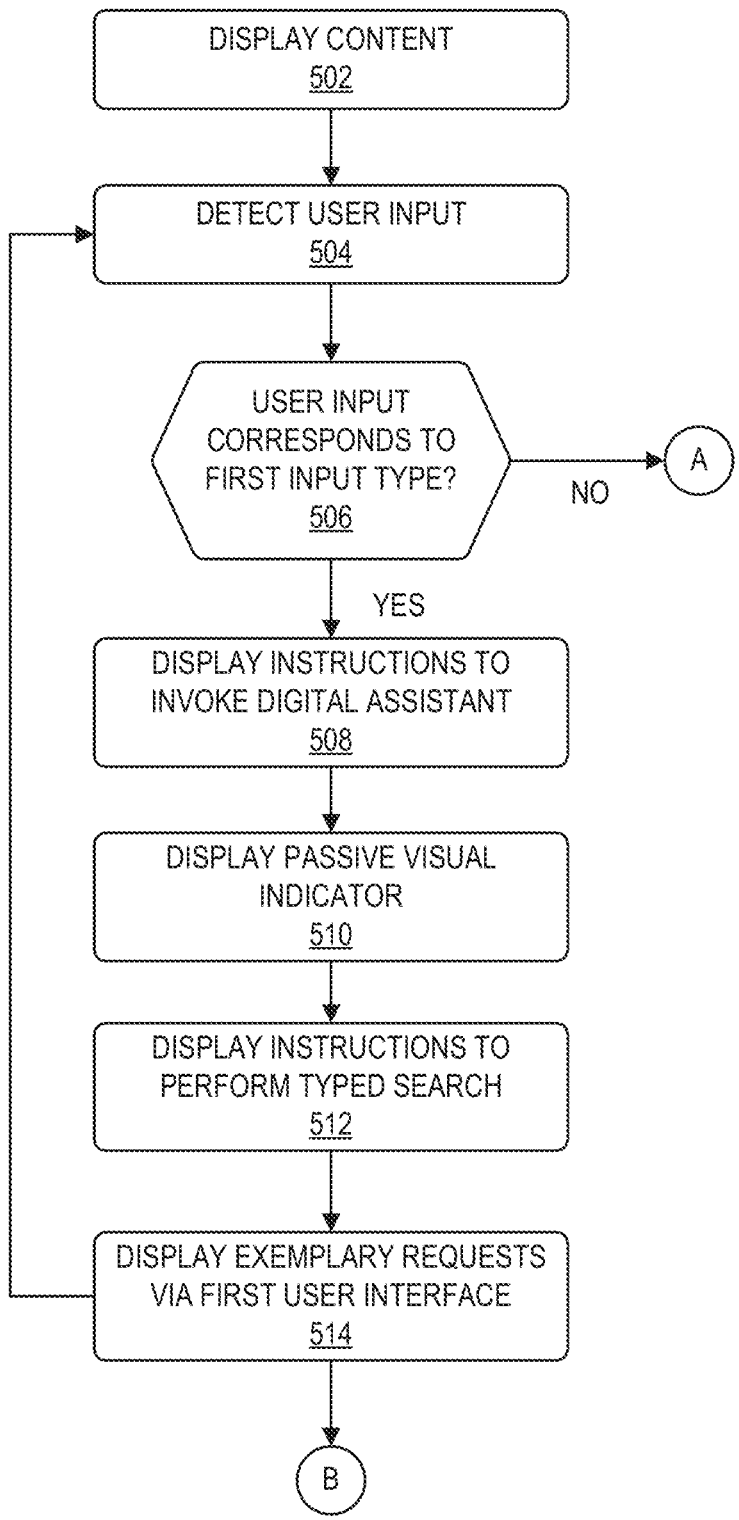
FIGS. 5A-I illustrate a process for operating a digital assistant of a media system according to various examples.
Figure 5B:
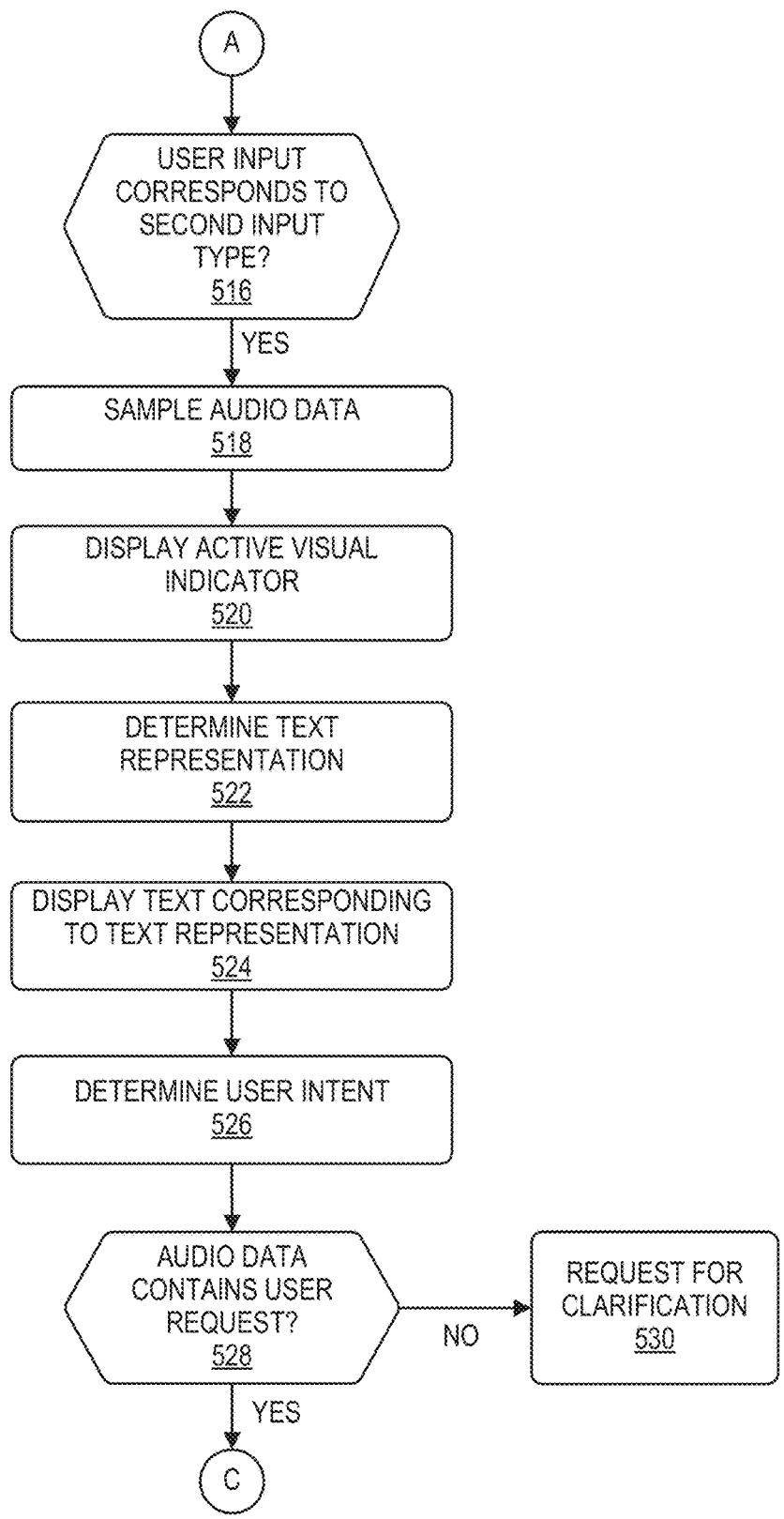

With reference back to block 506, in accordance with a determination that the user input does not correspond to a first input type, one or more of blocks 516-530 of FIG. 5B can be performed. At block 516, a determination can be made as to whether the user input corresponds to a second input type. The second input type can be a predefined input to the media device that is different from the first input type. In some examples, the second input type can include pressing a particular button on the remote control of the media device and holding down the button for greater than a predetermined duration (e.g., a long press). The second input type can be associated with invoking the digital assistant. In some examples, the first input type and the second input type can be implemented using a same button of the remote control (e.g., a button configured to invoke the digital assistant). This can be desirable to intuitively integrate into a single button the invoking of the digital assistant and the providing of instructions for invoking and interacting with the digital assistant. Further, inexperienced users may intuitively implement a short press rather than a long press. Thus, providing instructions in response to detecting a short press can enable the instructions to be mainly directed to the inexperienced users rather than the experienced users. This can improve user experience by causing the instructions to be readily displayed to inexperienced users who most need the guidance, while allowing experienced users the option to bypass the instructions.

In accordance with a determination at block 516 that the user input corresponds to a second input type, one or more of blocks 518-530 can be performed. In some examples, media content 602 can continue to play on the media device while performing one or more of blocks 518-530. In particular, media content 602 can continue to play on the media device and be displayed on the display unit while sampling the audio data at block 518 and while performing the task at block 528.

At block 518 of process 500, audio data can be sampled. In particular, a first microphone (e.g., microphone 272) of the media device can be activated to begin sampling audio data. In some examples, the sampled audio data can include a user utterance from the user. The user utterance can represent a user request directed to the digital assistant. Further, in some examples, the user request can be a request to perform a task. In particular, the user request can be a media search request. For example, with reference to FIG. 6F, the sampled audio data can include the user utterance of "Find romantic comedies starring Reese Witherspoon." In other examples, the user request can be a request to play a media item or to provide specific information (e.g., weather, stock, sports, etc.).

The user utterance in the sampled audio data can be in natural language form. In some examples, the user utterance can represent a user request that is underspecified, where the user utterance does not explicitly define all the information required to satisfy the user request. For example, the user utterance can be "Play the next episode." In this example, the user request does not explicitly define the media series for which to play the next episode. Further, in some examples, the user utterance can include one or more ambiguous terms.

The duration in which the audio data is sampled can be based on the detection of an end-point. In particular, the audio data can be sampled from a start time at which the user input of the second input type is initially detected to an end time at which the end-point is detected. In some examples, the end-point can be based on the user input. In particular, the first microphone can be activated upon initially detecting the user input of the second input type (e.g., pressing a button for longer than a predetermined duration). The first microphone can remain activated to sample audio data while the user input of the second input type continues to be detected. Upon ceasing to detect the user input of the second input type (e.g., the button is released), the first microphone can be deactivated. Thus, in these examples, the end-point is detected upon detecting the end of the user input. Accordingly, the audio data is sampled while detecting the user input of the second input type.

In other examples, detecting the end-point can be based on one or more audio characteristics of the audio data sampled. In particular, one or more audio characteristics of the audio data sampled can be monitored and an end-point can be detected at a predetermined time after determining that one or more audio characteristics do not satisfy one or more predetermined criteria. In yet other examples, the end-point can be detected based on a fixed duration. In particular, the end-point can be detected at a predetermined duration after initially detecting the user input of the second input type.

In some examples, audio associated with the displayed content can be outputted (e.g., using speakers 268) while blocks 504 or 516 are performed. In particular, the audio can be the audio of a media item playing on the media device and displayed on the display unit. The audio can be outputted via an audio signal from the media device. In these examples, the audio associated with the displayed content can be ducked (e.g., the amplitude of the audio reduced) upon determining that the user input corresponds to a second input type and upon sampling the audio data. For example, the audio can be ducked by reducing the gain associated with the audio signal. In other examples, output of the audio associated with the media content can be ceased while sampling the audio data at block 518. For example, the audio can be ceased by blocking or interrupting the audio signal. Ducking or ceasing the output of audio can be desirable to reduce the background noise in the sampled audio data and to increase the relative strength of the speech signal associated with a user utterance. Further, the ducking or ceasing of the audio can serve as an audio cue for the user to begin providing speech input to the digital assistant.

In some examples, background audio data can be sampled while sampling the audio data to perform noise cancellation. In these examples, the remote control or the media device can include a second microphone. The second microphone can be oriented in a direction that is different from the first microphone (e.g., opposite to the first microphone). The second microphone can be activated to sample the background audio data while the audio data is being sampled. In some examples, the background audio data can be used to remove background noise in the audio data. In other examples, the media device can generate an audio signal for outputting audio associated with the displayed content. The generated audio signal can be used to remove background noise from the audio data. Performing noise cancellation of background noise from the audio signal can be particularly suitable for interactions with a digital assistant in media environment. This can be due to the communal nature of consuming media content where utterances from multiple individuals may be commingled in the audio data. By removing the background noise in the audio data, a higher signal to noise ratio in the audio data can be obtained, which can be desirable when processing the audio data for a user request.

Figure 6F:
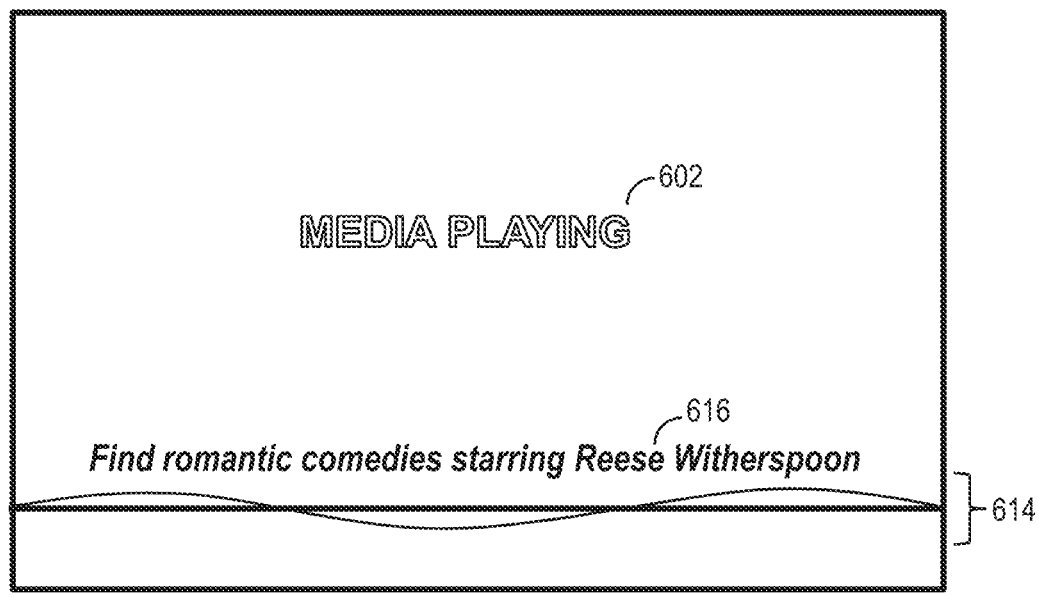

At block 520 of process 500 and with reference to FIG. 6F, active visual indicator 614 can be displayed on the display unit. Active visual indicator 614 can indicate to the user that the digital assistant is invoked and actively listening. In particular, active visual indicator 614 can serve as a visual cue to prompt the user to begin providing speech input to the digital assistant. In some examples, active visual indicator 614 can include colors and/or visual animations to indicate that the digital assistant is invoked. For example, as depicted in FIG. 6F, active visual indicator 614 can include an active waveform that is responsive to one or more characteristics (e.g., amplitude) of audio data received by the digital assistant. For example, active visual indicator 614 can display a waveform with a larger amplitude in response to portions of the audio data that are louder and a waveform with a smaller amplitude in response to portions of the audio data that are softer. Further, in examples where the digital assistant is invoked while displaying passive visual indicator 606 (e.g., FIG. 6E), the display of visual indicator 606 can be replaced with the display of active visual indicator 614. This can provide a natural transition from the instructive user interface shown in FIGS. 6B-E for demonstrating how to invoke and interact with the digital assistant to the active user interface shown in FIG. 6F for actively interacting with the digital assistant.

At block 522 of process 500, a text representation of the user utterance in the sampled audio data can be determined. For example, the text representation can be determined by performing speech-to-text (STT) processing on the sampled audio data. In particular, the sampled audio data can be processed using a STT processing module (e.g., STT processing module 430) to convert the user utterance in the sampled audio data into the text representation. The text representation can be a token string representing a corresponding text string.

In some examples, the STT processing can be biased toward media-related text results. The biasing can be implemented by utilizing a language model that is trained using a corpus of media-related text. Additionally or alternatively, the biasing can be implemented by more heavily weighting candidate text results that are related to media. In this way, candidate text results that are related to media can be ranked higher with the biasing than without the biasing. The biasing can be desirable for increasing the accuracy of STT processing of media-related user utterances (e.g., movie names, movie actors, etc.). For example, certain media-related words or phrases, such as "Jurassic Park," "Arnold Schwarzenegger," and "Shrek," can be infrequently found in typical corpuses of text and thus may not successfully be recognized during STT processing without biasing toward media-related text results.

In some examples, the text representation can be obtained from a separate device (e.g., DA server 106). In particular, the sampled audio data can be transmitted from the media device to the separate device to perform STT processing. In these examples, the media device can indicate to the separate device (e.g., via data transmitted to the separate device with the sampled audio data) that the sampled audio data is associated with a media application. The indicating can bias the STT processing toward media-related text results.

In some examples, the text representation can be based on previous user utterances that were received by the media device prior to sampling the audio data. In particular, candidate text results of the sampled audio data that correspond to one or more portions of previous user utterances can be more heavily weighted. In some examples, the previous user utterances can be used to generate a language model and the generated language model can be used to determine the text representation of the current user utterance in the sampled audio data. The language model can be dynamically updated as additional user utterances are received and processed.

Further, in some examples, the text representation can be based on a time at which the previous user utterances were received prior to sampling the audio data. In particular, candidate text results that correspond to previous user utterances that are more recently received with respect to the sampled audio data can be more heavily weighted than candidate text results that correspond to previous user utterances that are less recently received with respect to the sampled audio data.

At block 524 of process 500, the text representation can be displayed on the display unit. For example, FIG. 6F shows text representation 616, which corresponds to the user utterance in the sampled audio data. In some examples, blocks 522 and 524 can be performed while the audio data is sampled. In particular, text representation 616 of the user utterance can be displayed in a streaming fashion such that text representation 616 is displayed in real-time as the audio data is sampled and as STT processing is performed on the sampled audio data. Displaying text representation 616 can provide confirmation to the user that the digital assistant is correctly processing the user's request.

At block 526 of process 500, a user intent corresponding to the user utterance can be determined. The user intent can be determined by performing natural language processing on the text representation of block 522. In particular, the text representation can be processed using a natural language processing module (e.g., natural language processing module 432) to derive the user intent. For example, with reference to FIG. 6F, it can be determined from text representation 616 corresponding to "Find romantic comedies starring Reese Witherspoon," that the user intent is to request a search for media items having the genre of romantic comedy and the actor of Reese Witherspoon. In some examples, block 526 can further include generating, using the natural language processing module, a structured query that represents the determined user intent. In the present example of "Find romantic comedies starring Reese Witherspoon," a structured query representing a media search query for media items having the genre of romantic comedy and the actor of Reese Witherspoon can be generated.

In some examples, natural language processing for determining the user intent can be biased toward media-related user intents. In particular, the natural language processing module can be trained to identify media-related words and phrases (e.g., media titles, media genres, actors, MPAA film-rating labels, etc.) that trigger media-related nodes in the ontology. For example, the natural language processing module can identify the phrase "Jurassic Park" in the text representation as a movie title and as a result, trigger a "media search" node in the ontology associated with the actionable intent of searching for media items. In some examples, the biasing can be implemented by restricting the nodes in the ontology to a predetermined set of media-related nodes. For example, the set of media-related nodes can be nodes that are associated with the applications of the media device. Further, in some examples, the biasing can be implemented by weighting candidate user intents that are media-related more heavily than candidate user intents that are not media-related.

In some examples, the user intent can be obtained from a separate device (e.g., DA server 106). In particular, the audio data can be transmitted to the separate device to perform natural language processing. In these examples, the media device can indicate to the separate device (e.g., via data transmitted to the separate device with the sampled audio data) that the sampled audio data is associated with a media application. The indicating can bias the natural language processing toward media-related user intents.

At block 528 of process 500, a determination can be made as to whether the sampled audio data contains a user request. The determination can be made from the determined user intent of block 526. The sampled audio data can be determined to contain a user request if the user intent includes a user request to perform a task. Conversely, the sampled audio data can be determined not to contain a user request if the user intent does not include a user request to perform a task. Further, in some examples, the sampled audio data can be determined not to contain a user request if a user intent is unable to be determined from the text representation at block 526 or a text representation is unable to be determined from the sampled audio data at block 522. In accordance with a determination that the audio data does not contain a user request, block 530 can be performed.

At block 530 of process 500, a request for clarification of the user's intent can be displayed on the display unit. In one example, the request for clarification can be a request for the user to repeat the user request. In another example, the request for clarification can be a statement that the digital assistant was unable to understand the user's utterance. In yet another example, an error message can be displayed to indicate that the user's intent could not be determined. Further, in some examples, no response may be provided in accordance with a determination that the audio data does not contain a user request.

Figure 5C:
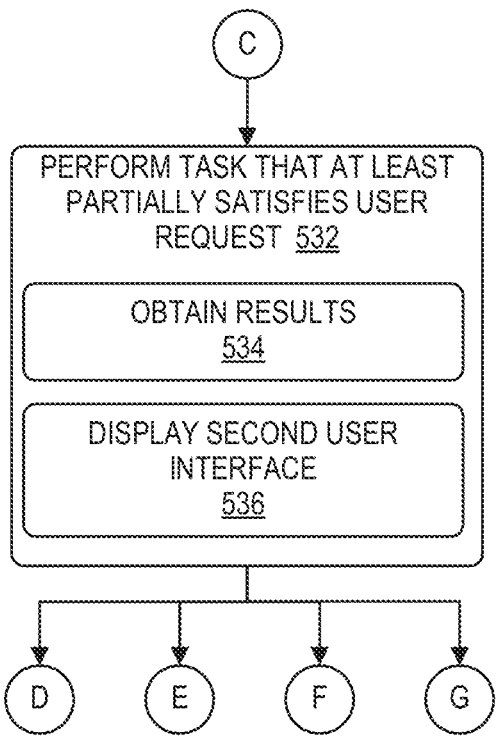

With reference to FIG. 5C, block 532 can be performed in accordance with a determination at block 528 that the sampled audio data contains a user request. At block 532 of process 500, a task that at least partially satisfies the user request can be performed. For example, performing the task at block 526 can include executing one or more tasks defined in the generated structured query of block 526. The one or more tasks can be performed using a task flow processing module of the digital assistant (e.g., task flow processing module 436). In some examples, the task can include changing a state or setting of an application on the media device. More specifically, the task can include, for example, selecting or playing a requested media item, opening or closing a requested application, or navigating through a displayed user interface in the requested manner. In some examples, the task can be performed at block 532 without outputting from the media device speech that is related to the task. Thus, although in these examples, the user can provide requests to the digital assistant in the form of speech, the digital assistant may not provide a response to the user in speech form. Rather, the digital assistant may only respond visually by displaying results on the display unit. This can be desirable to preserve the communal experience of consuming media content.

In other examples, the task can include retrieving and displaying requested information. In particular, performing the task at block 532 can include performing one or more of blocks 534-536. At block 534 of process 500, results that at least partially satisfy the user request can be obtained. The results can be obtained from an external service (e.g., external services 120). In one example, the user request can be a request to perform a media search query, such as "Find romantic comedies starring Reese Witherspoon." In this example, block 534 can include performing the requested media search (e.g., using a media-related database of an external service) to obtain media items having the genre of romantic comedy and the actor of Reese Witherspoon. In other examples, the user request can include requests for other types of information such as weather, sports, and stocks, and the respective information can be obtained at block 534.

Figure 6G:
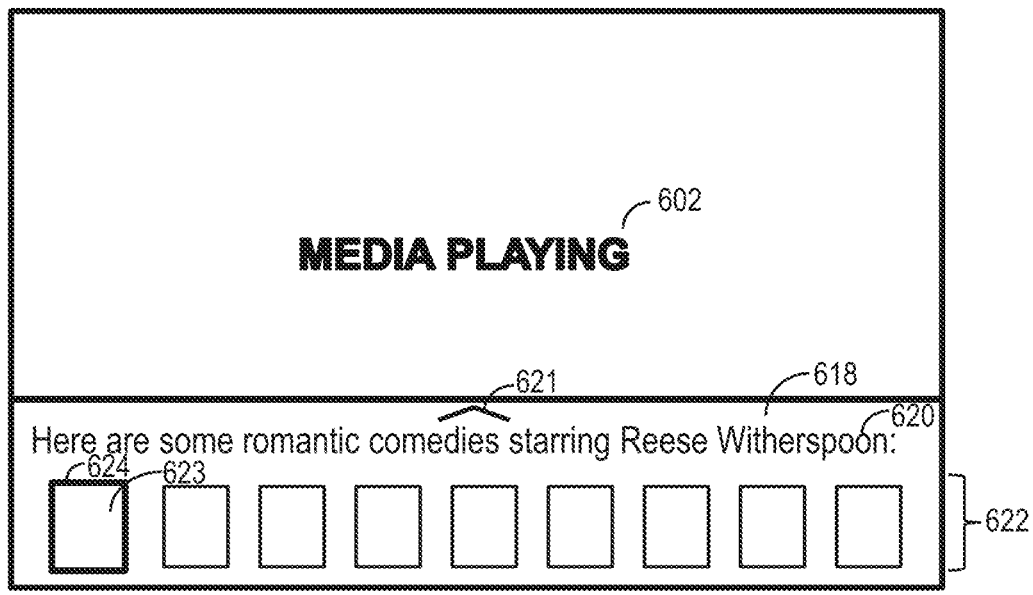

At block 536 of process 500, a second user interface can be displayed on the display unit. The second user interface can include a portion of the results obtained at block 534. For example, as shown in FIG. 6G, second user interface 618 can be displayed on the display unit. Second user interface 618 can include media items 622 that satisfy the user request of "Find me romantic comedies starring Reese Witherspoon." In this example, media items 622 can include media items such as "Legally Blonde," "Legally Blonde 2," "Hot Pursuit," and "This Means War." Second user interface 618 can further include text header 620 that describes the obtained results. Text header 620 can paraphrase a portion of the user request to convey the impression that the user's request has been directly addressed. This provides a more personable and interactive experience between the user and the digital assistant. In the present example shown in FIG. 6G, media items 622 are organized in a single row across second user interface 618. It should be recognized that in other examples, the organization and presentations of media items 622 can vary.

Second user interface 618 can further include cursor 624 for navigating and selecting media items 622 in second user interface 618. The position of the cursor can be indicated by visually highlighting, relative to the other media items, the media item on which the cursor is positioned. For example, in the present example, media item 623 over which cursor 624 is positioned can be larger and more boldly outlined compared to the other media items displayed in second user interface 618.

In some examples, at least a portion of the displayed content can continue to be displayed while the second user interface is displayed. For example, as shown in FIG. 6G, second user interface 618 can be a small pane displayed at the base of the display unit while media content 602 continues to play on the media device and be displayed on the display unit above second user interface 618. Second user interface 618 can be overlaid on media content 602 that is playing. In the present example, the display area of second user interface 618 on the display unit can be smaller than the display area of media content 602 on the display unit. This can be desirable to reduce the intrusiveness of the results displayed by the digital assistant while the user is consuming media content. It should be recognized that in other examples, the display area of the second user interface with respect to that of the displayed content can vary. Further, as indicated by the solid font for "MEDIA PLAYING" in FIG. 6G, the brightness of media content 602 can be reverted back to normal (e.g., the brightness at FIG. 6A prior to detecting the user input) upon displaying second user interface 618. This can serve to indicate to the user that the interaction with the digital assistant has been completed. The user can thus continue to consume media content 602 while viewing the requested results (e.g., media items 622).

In examples where media items obtained from a media search are displayed on the second user interface, the number of displayed media items can be limited. This can be desirable to allow the user to focus on the most relevant results and prevent the user from becoming overwhelmed by the number of results when making a selection. In these examples, block 532 can further include determining whether the number of media items in the obtained results is less than or equal to a predetermined number (e.g., 30, 28, or 25). In accordance with a determination that the number of media items in the obtained results is less than or equal to a predetermined number, all of the media items in the obtained results can be included in the second user interface. In accordance with a determination that the number of media items in the obtained results is greater than a predetermined number, only the predetermined number of media items in the obtained results can be included in the second user interface.

Further, in some examples, only the media items in the obtained results that are most relevant to the media search request can be displayed in the second user interface. In particular, each of the media items in the obtained results can be associated with a relevancy score with respect to the media search request. The media items that are displayed can have the highest relevancy scores among the obtained results. Further, the media items in the second user interface can be arranged according to the relevancy scores. For example, with reference to FIG. 6G, media items with a higher relevancy scores can more likely be positioned proximate to one side of second user interface 618 (e.g., the side proximate to cursor 624) while media items with a lower relevancy score can more likely be positioned proximate to the opposite side of second user interface 618 (e.g., the side distant to cursor 624). Additionally, each media item in obtained results can be associated with a popularity rating. The popularity rating can be based on the ratings of movie critics (e.g., Rotten Tomatoes™ ratings) or based on the number of users who have selected the media item for playback. In some examples, media items 622 can be arranged in second user interface 618 based on the popularity rating. For example, media items with a higher popularity rating can more likely be positioned to one side of second user interface 618 while media items with a lower popularity rating can more likely be positioned proximate to the opposite side of second user interface 618.

As indicated by the different flows (e.g., D, E, F, and G) succeeding block 532 in FIG. 5C, one of blocks 538, 542, 550, or 570 of FIG. 5D, 5E, 5F, or 5I, respectively, can be performed after block 532. Blocks 538, 542, 550, or 570 can be performed while displaying the second user interface at block 536. In some examples, process 500 can alternatively include a determining step after block 536 to determine the appropriate flow (e.g., D, E, F, or G) to perform. In particular, a user input can be detected after block 536 and a determination can be made as to whether the detected user input corresponds to a second user input (e.g., block 538), a third user input (e.g., block 542), a fourth user input (e.g., block 550), or a sixth user input (e.g., block 570). For example, in accordance with a determination that the user input corresponds to the third user input of block 542, one or more of blocks 544-546 can be performed. A similar determining step can also be included after block 546.

Figure 5D:
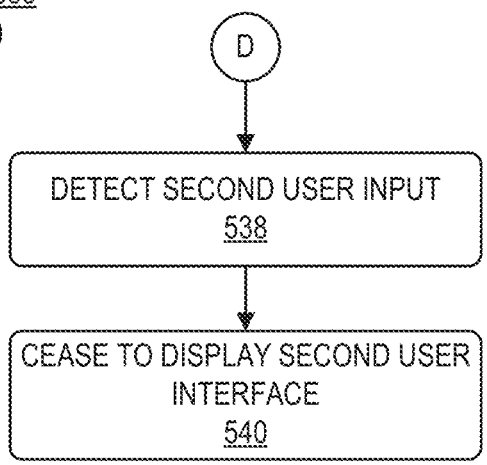

At block 538 of process 500 and with reference to FIG. 5D, a second user input can be detected. As discussed above, the second user input can be detected while the second user interface is displayed on the display unit. The second user input can be detected on a remote control of the media device. For example, the second user input can include a first predetermined motion pattern on a touch-sensitive surface of the remote control. In one example, the first predetermined motion pattern can include a continuous contact motion in a first direction from a first point of contact to a second point of contact on the touch-sensitive surface. When gripping the remote control in the intended manner, the first direction can be a downward direction or a direction toward the user. It should be recognized that other forms of input can be contemplated for the second user input. In response to detecting the second user input, block 540 can be performed.

At block 540 of process 500, the second user interface can be dismissed such that the second user interface is no longer displayed. For example, with reference to FIG. 6G, second user interface 618 can cease to be displayed in response to detecting the second user input. In this example, upon dismissing second user interface 618, media content 602 can be displayed on the full screen of the display unit. For example, upon ceasing to display second user interface 618, media content 602 can be displayed as shown in FIG. 6A.

Figure 5E:
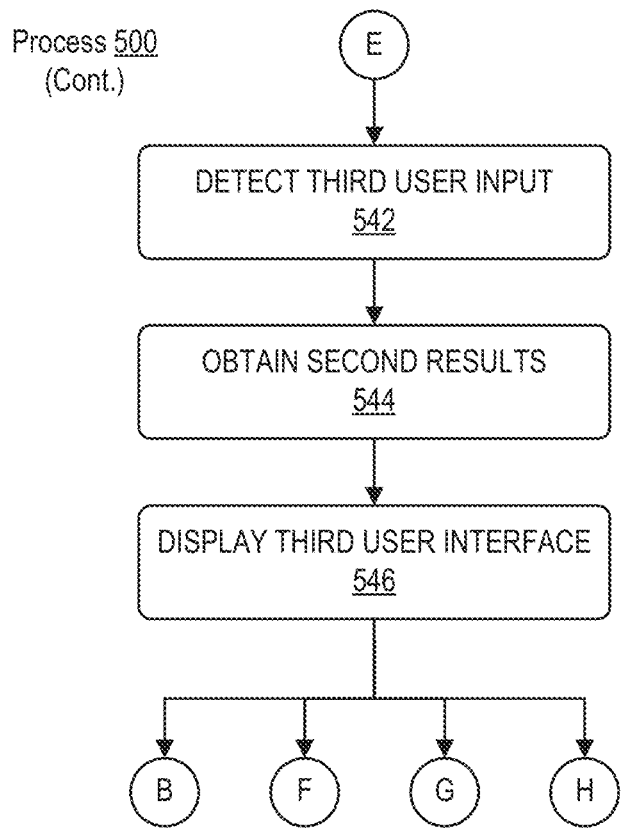

At block 542 of process 500 and with reference to FIG. 5E, a third user input can be detected. The third user input can be detected while the second user interface is displayed on the display unit. The third user input can be detected on a remote control of the media device. For example, the third user input can include a second predetermined motion pattern on a touch-sensitive surface of the remote control. The second predetermined motion pattern can include a continuous contact motion in a second direction from a third point of contact to a fourth point of contact on the touch-sensitive surface. The second direction can be opposite to the first direction. In particular, when gripping the remote control in the intended manner, the second direction can be an upward direction or a direction away from the user. In response to detecting the third user input, one or more of blocks 544-546 can be performed. In some examples, as shown in FIG. 6G, second user interface 618 can include graphic indicator 621 (e.g., an arrow) to indicate to the user that second user interface 618 can be expanded by providing the third user input. Further, graphic indicator 621 can indicate to the user the second direction associated with the second predetermined motion pattern on the touch-sensitive surface for the third user input.

At block 544 of process 500, second results can be obtained. The obtained second results can be similar, but not identical to the results obtained at block 534. In some examples, the obtained second results can at least partially satisfy the user request. For example, the obtained second results can share one or more properties, parameters, or attributes of the results obtained at block 534. In the example shown in FIGS. 6F-G, block 544 can include performing one or more additional media search queries related to the media search query performed at block 534. For example, the one or more additional media search queries can include a search for media items with the genre of romantic comedy or a search for media items starring Reese Witherspoon. The obtained second results can thus include media items that are romantic comedy (e.g., media items 634) and/or media items starring Reese Witherspoon (e.g., media items 636).

In some examples, the obtained second results can be based on a previous user request received prior to detecting the user input at block 504. In particular, the obtained second results can include one or more characteristics or parameters of the previous user request. For example, the previous user request can be "Show me movies released in the last 5 years." In this example, the obtained second results can include media items that are romantic comedies movies starring Reese Witherspoon and released in the last 5 years.

Further, in some examples, block 544 can include obtaining second results that are contextually-related to an item on which the second user interface is focused at the time the third user input is detected. For example, with reference to FIG. 6G, cursor 624 can be positioned at media item 623 in second user interface 618 at the time the third user input is detected. Media item 623 can be, for example, the movie "Legally Blonde." In this example, the obtained second results can share one or more characteristics, attributes, or parameters associated with the media item "Legally Blonde." In particular, the obtained second results can include media items that, like "Legally Blonde," are related to attending law school or to a professional woman in a leading role.

At block 546 of process 500, the third user interface can be displayed on the display unit. In particular, display of the second user interface at block 536 can be replaced with the display of the third user interface at block 546. In some examples, in response to detecting the third user input, the second user interface can be expanded to become the third user interface. The third user interface can occupy at least a majority of a display area of the display unit. The third user interface can include a portion of the obtained results of block 534. Further, the third user interface can include a portion of the obtained second results of block 544.

Figure 6H:
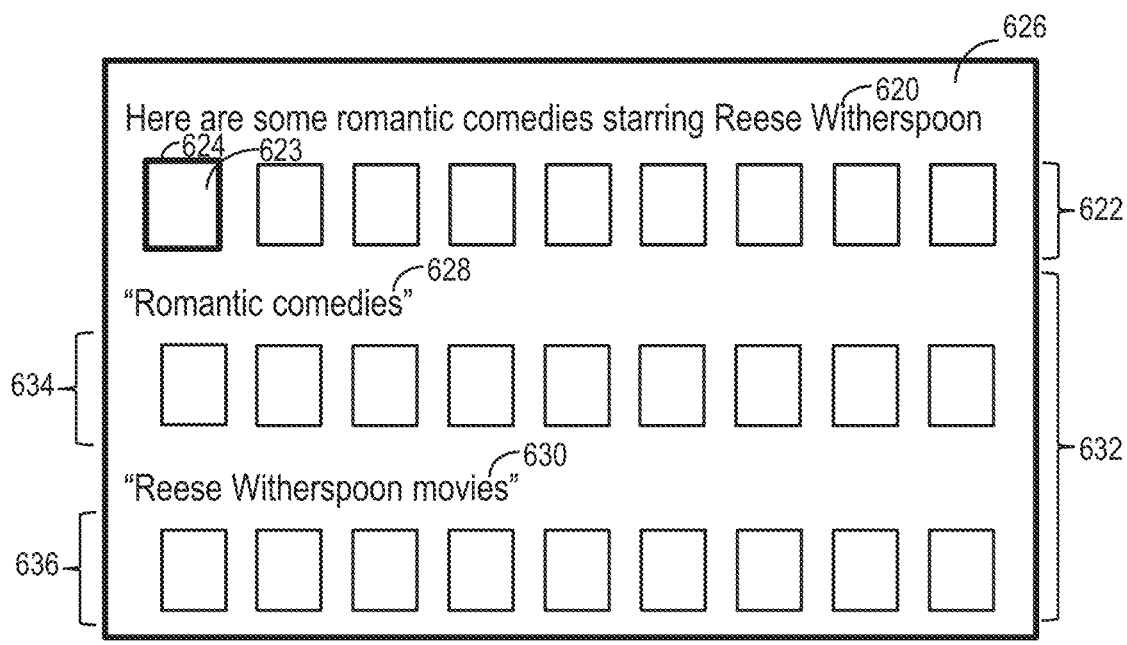

In one example, as shown in FIG. 6H, third user interface 626 can occupy substantially the entire display area of the display unit. In this example, the previous display of media content 602 and second user interface 618 can be replaced by the display of third user interface 626. In response to detecting the third user input, playing of media content can be paused on the media device. This can be desirable to prevent the user from missing any portion of media content 602 while browsing the media items in third user interface 626.

Third user interface 626 can include media items 622 that satisfy the user request of "Find me romantic comedies starring Reese Witherspoon." Further, third user interface 626 can include media items 632 that at least partially satisfiy the same user request. Media items 632 can include multiple sets of media items that each correspond to different characteristics, attributes, or parameters. In this example, media items 632 can include media items 634 that are romantic comedies and media items 636 that star Reese Witherspoon. Each set of media items can be labeled with a text header (e.g., text header 628, 630). The text headers can describe the one or more attributes or parameters associated with the respective set of media items. Further, the text headers can each be an exemplary user utterance, which when provided by the user to the digital assistant, can cause the digital assistant to obtain a similar set of media items. For example, with reference to text header 628, the digital assistant can obtain and display media items that are romantic comedies (e.g., media items 634) in response to receiving the user utterance "Romantic comedies" from the user.

Although in the example shown in FIG. 6H, media items 622 are based on the initial user request of "Find me romantic comedies starring Reese Witherspoon," it should be recognized that in other examples, media items 632 can be based on other factors such as, the media selection history, the media search history, the order in which previous media searches were received, the relationship between media-related attributes, the popularity of media items, and the like.

In examples where the user request is a media search request, the obtained second results can be based on the number of media items in the obtained results of block 534. In particular, in response to detecting the third user input, a determination can be made as to whether the number of media items in the obtained results is less than or equal to a predetermined number. In accordance with a determination that the number of media items in the obtained result is less than or equal to a predetermined number, the obtained second results can include media items that are different from the media items in the second user interface. The obtained second results can at least partially satisfy the media search request performed at block 534. At the same time, the obtained second results can be broader than the obtained results and can be associated with fewer than all of the parameters defined in the media search request performed at block 534. This can be desirable to provide the user with a broader set of results and greater options to select from.

In some examples, in accordance with a determination that the number of media items in the obtained result of block 534 is less than or equal to a predetermined number, a determination can be made as to whether the media search request includes more than one search attribute or parameter. In accordance with a determination that the media search request includes more than one search attribute or parameter, the obtained second results can include media items associated with the more than one search attribute or parameter. Further, the media items in the obtained second result can be organized in the third user interface according to the more than one search attribute or parameter.

In the example shown in FIGS. 6F-H, the media search request "Find me romantic comedies starring Reese Witherspoon," can be determined to include more than one search attribute or parameter (e.g., "Romantic comedies" and "Reese Witherspoon"). In accordance with a determination that the media search request includes more than one search attribute or parameter, the obtained second results can include media items 634 associated with the search parameter "Romantic comedies" and media items 636 associated with the search parameter "Reese Witherspoon movies." As shown in FIG. 6H, media items 634 can be organized under the category of "Romantic comedies," and media items 636 can be organized under the category of "Reese Witherspoon."

In some examples, in accordance with a determination that the number of media items in the obtained results of block 534 is greater than a predetermined number, the third user interface can include a first portion and a second portion of the obtained results. The first portion of the obtained results can include the predetermined number of media items (e.g., with the highest relevancy scores). The second portion of the obtained results can be different from the first portion of the obtained results and can include a greater number of media items than the first portion of the obtained results. Further, it can be determined whether the media items in the obtained results include more than one media type (e.g., movies, television shows, music, applications, games, etc.). In response to determining that the media items in the obtained results include more than one media type, the media items in the second portion of the obtained results can be organized according to media type.

Figure 6I:
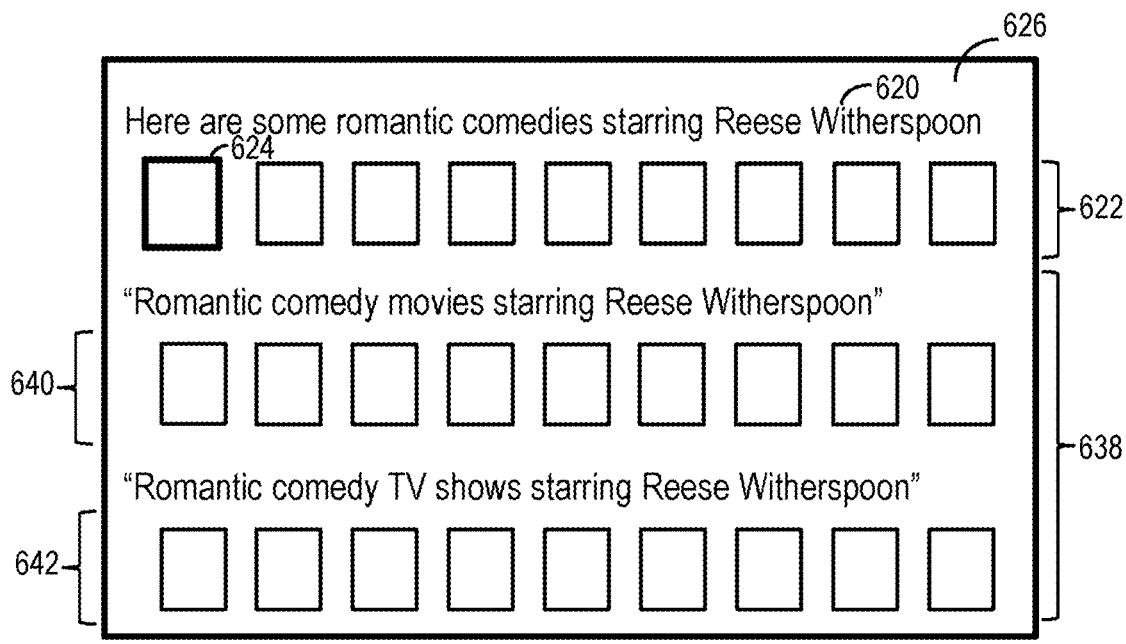

In the example shown in FIG. 6I, the results obtained at block 534 can include media items that are romantic comedies starring Reese Witherspoon. In accordance with a determination that the number of media items in the obtained results is greater than a predetermined number, a first portion of the obtained results (media items 622) and a second portion of the obtained results (media items 638) can be displayed in third user interface 626. In response to determining that the obtained results include more than one media type (e.g., movies and TV shows), media items 638 can be organized according to media type. In particular, media items 640 can be organized under the category of "movies" and media items 642 can be organized under the category of "TV shows." Further, in some examples, each set of media items (e.g., media items 640, 642) corresponding to the respective media types (e.g., movies, TV shows) can be sorted according to the most prevalent genres, actors/directors, or release dates within the respective set of media items. It should be recognized that in other examples, the media items in the second portion of the obtained results can be organized according to media attributes or parameters (rather than media type) in response to determining that the media items in the obtained results are associated with more than one media attribute or parameter.

In some examples, a user input representing a scroll command (e.g., fourth user input described below at block 550) can be detected. In response to receiving the user input representing a scroll command, the expanded user interface (or more specifically, the items in the expanded user interface) can be caused to scroll. While scrolling, a determination can be made as to whether the expanded user interface has scrolled beyond a predetermined position in the expanded user interface. In response to a determination that the expanded user interface has scrolled beyond a predetermined position in the expanded user interface, media items in a third portion of the obtained results can be displayed on the expanded user interface. The media items in the third portion can be organized according to one or more media content providers (e.g., iTunes™, Netflix™, HuluPlus™, HBO, etc.) associated with the media items in the third portion. It should be recognized that in other examples, other media items can be obtained in response to a determination that the expanded user interface has scrolled beyond a predetermined position in the expanded user interface. For example, popular media items or media items related to the obtained results can be obtained.

As indicated by the different flows (e.g., B, F, G, and H) proceeding from block 546 in FIG. 5E, blocks 550, 558, 566, or 570 of FIG. 5F, 5G, 5H, or 5I, respectively, can be performed after block 532. In particular, in some examples, blocks 550, 560, 564, or 570 can be performed while displaying the third user interface at block 546.

Figure 5F:
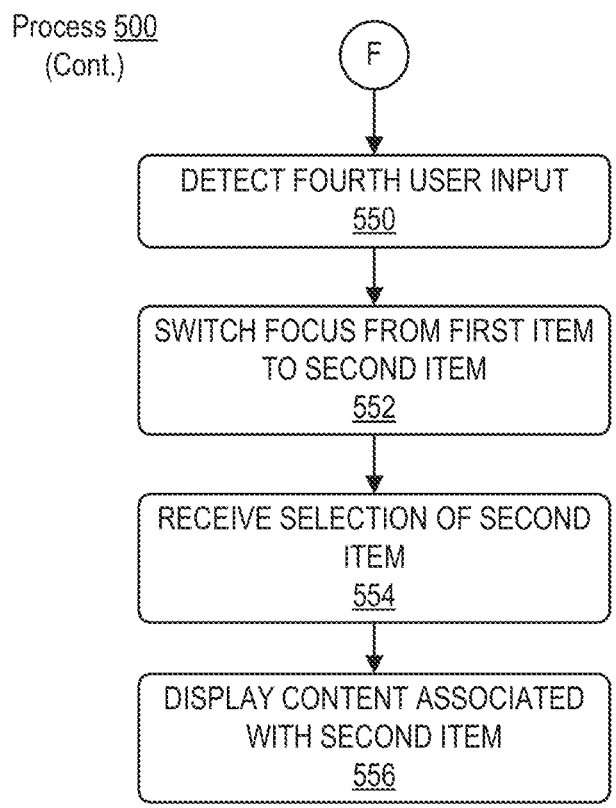

At block 550 of process 500 and with reference to FIG. 5F, a fourth user input can be detected. The fourth user input can be detected while the second user interface (e.g., second user interface 618) or the third user interface (e.g., third user interface 626) is displayed on the display unit. In some examples, the fourth user input can be detected on a remote control of the media device. The fourth user input can indicate a direction (e.g., upward, downward, left, right) on the display unit. For example, the fourth user input can be a contact motion from a first position on a touch-sensitive surface of the remote control to a second position on the touch-sensitive surface that is to the right of the first position. The contact motion can thus correspond to a rightward direction on the display unit. In response to detecting the fourth user input, block 552 can be performed.

Figure 6J:
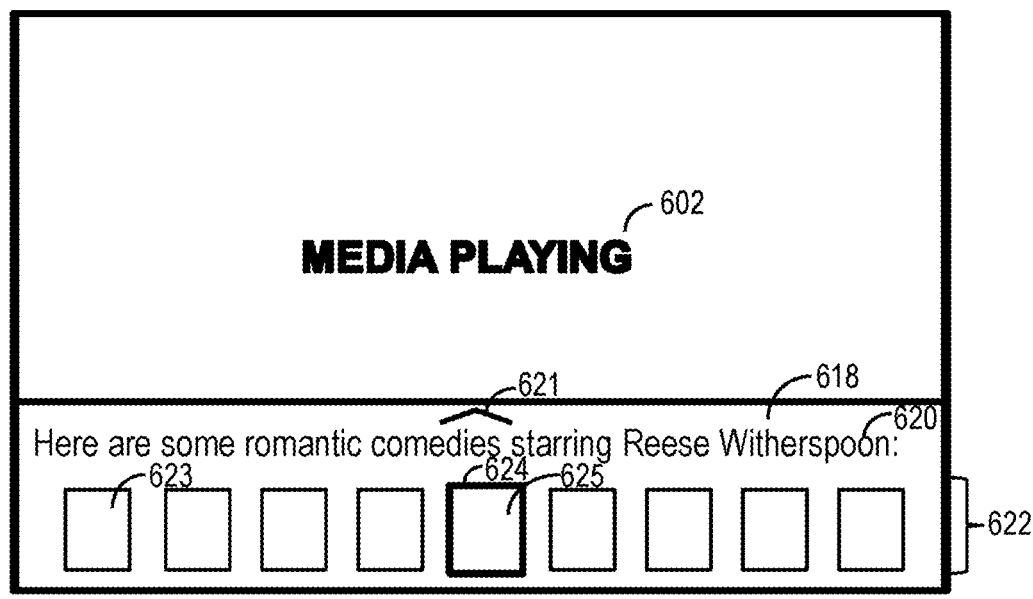
Figure 6K:
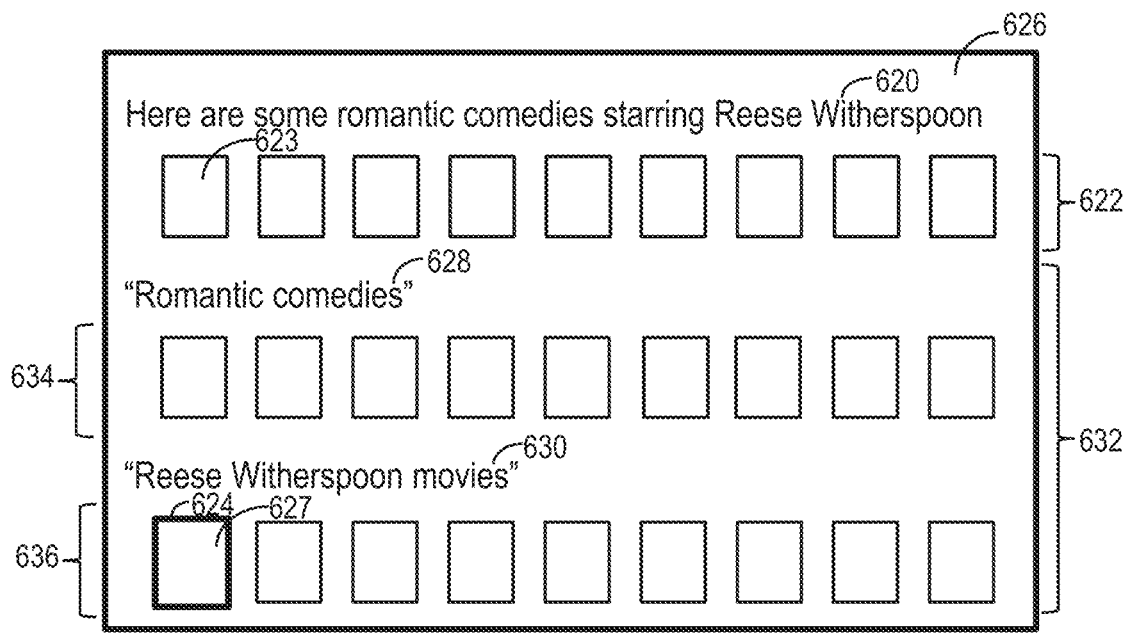

At block 552 of process 500, a focus of the second user interface or the third user interface can be switched from a first item to a second item on the second user interface or the third user interface. The second item can be being positioned in the direction (e.g., the same direction corresponding to the fourth user input) relative to the first item. For example, in FIG. 6G, a focus of second user interface 618 can be on media item 623 with cursor 624 positioned at media item 623. In response to detecting a fourth user input corresponding to a rightward direction on the display unit, the focus of second user interface 618 can be switched from media item 623 in FIG. 6G to media item 625 in FIG. 6J positioned to the right of media item 623. In particular, the position of cursor 624 can be changed from media item 623 to media item 625. In another example, with reference to FIG. 6H, a focus of third user interface 626 can be on media item 623. In response to detecting a fourth user input corresponding to a downward direction on the display unit, the focus of third user interface 626 can be switched from media item 623 in FIG. 6H to media item 627 in FIG. 6K positioned in a downward direction relative to media item 623. In particular, the position of cursor 624 can be changed from media item 623 to media item 627.

At block 554 of process 500, a selection of a media item of one or more media items can be received via the second user interface or the third user interface. For example, with reference to FIG. 6J, a selection of media item 625 can be received via second user interface 618 by detecting a user input corresponding to a user selection while cursor 624 is positioned at media item 625. Similarly, with reference to FIG. 6K, a selection of media item 627 can be received via third user interface 626 by detecting a user input corresponding to a user selection while cursor 624 is positioned at media item 627. In response to receiving a selection of a media item of one or more media items, block 556 can be performed.

At block 556 of process 500, media content associated with the selected media item can be displayed on the display unit. In some examples, the media content can be movies, videos, television shows, animations, or the like that are playing on or streaming through the media device. In some examples, the media content can be video games, electronic books, applications, or programs running on the media device. Further, in some examples, the media content can be information related to the media item. The information can be product information that describes the various characteristics (e.g., plot summary, cast, director, author, release date, rating, duration, etc.) of the selected media item.

Figure 5G:
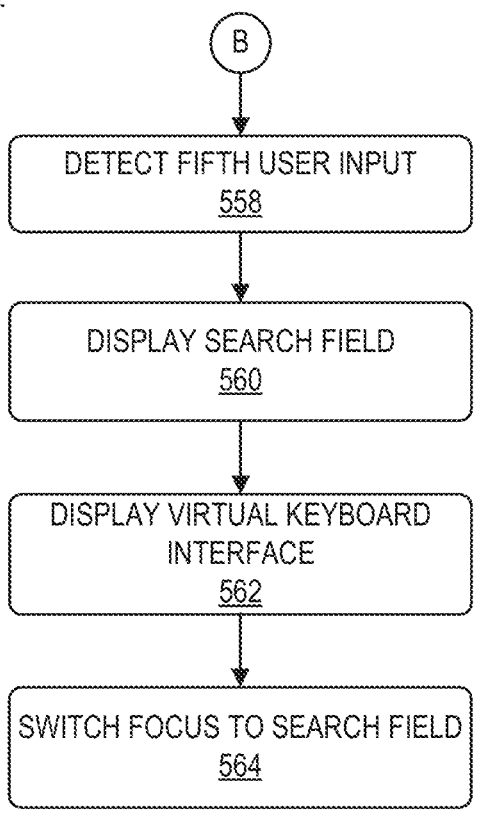

At block 558 of process 500 and with reference to FIG. 5G, a fifth user input can be detected. In some examples, the fifth user input can be detected while displaying the third user interface (e.g., third user interface 626). In these examples, the fifth user input can be detected while the focus of the third user interface is on a media item in a top row of the third user interface (e.g., one of media items 622 in third user interface 626 of FIG. 6H). In other examples, the fifth user input can be detected while displaying the first user interface. In these examples, the fifth user input can be detected while performing any one of blocks 508-514. In some examples, the fifth user input can be detected on a remote control of the media device. The fifth user input can be similar or identical to the third user input. For example, the fifth user input can include a continuous contact motion on a touch-sensitive surface in the second direction (e.g., a swipe up contact motion). In other examples, the fifth user input can be an activation of an affordance. The affordance can be associated with a virtual keyboard interface or a typed search interface. In response to detecting the fifth user input, one or more of blocks 560-564 can be performed.

Figure 6L:
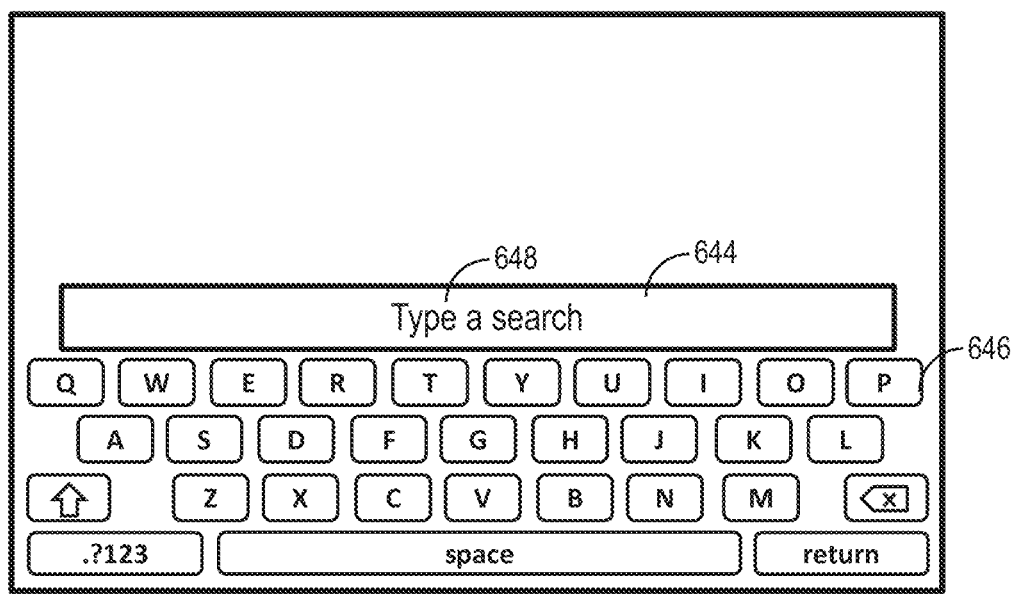

At block 560 of process 500, a search field configured to receive typed search inputs can be displayed. For example, as shown in FIG. 6L, search field 644 can be displayed on the displayed unit. In some examples, the search field can be configured to receive typed search queries. The typed search queries can be media-related search queries such as searches for media items. In some examples, the search field can be configured to perform media-related searches based on text string matches between text inputted via search field 644 and stored text associated with media items. Further, in some examples, the digital assistant may not be configured to receive input via search field 644. This can encourage users to interact with the digital assistant via a speech interface rather than a typed interface to promote a more personable interface between the media device and the user. It should be recognized that in some examples, a search field may already be displayed in the second user interface (e.g., second user interface 618) or the third user interface (e.g., third user interface 626). In these examples, it may not be necessary to perform block 566.

At block 562 of process 500, a virtual keyboard interface can be displayed on the display unit. For example, as shown in FIG. 6L, virtual keyboard interface 646 can be displayed. Virtual keyboard interface 646 can be configured such that user input received via virtual keyboard interface 646 causes text entry in the search field. In some examples, the virtual keyboard interface cannot be used to interact with the digital assistant.

At block 564 of process 500, a focus of the user interface can be switched to the search field. For example, with reference to FIG. 6L, search field 644 can be highlighted at block 568. Further, a text input cursor can be positioned in search field 644. In some examples, text prompting the user to input a typed search can be displayed in the search field. As shown in FIG. 6L, text 648 includes the prompt "Type a search."

Figure 5H:
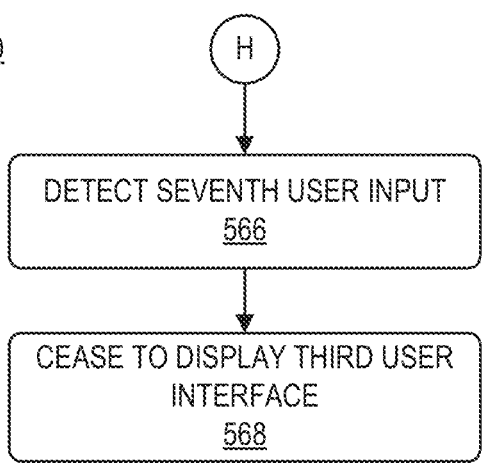

At block 566 of process 500 and with reference to FIG. 5H, a seventh user input can be detected. In some examples, the seventh user input can be detected while displaying the third user interface (e.g., third user interface 626). In some examples, the seventh user input can include pressing a button of a remote control of the electronic device. The button can be, for example, a menu button for navigating to the main menu user interface of the electronic device. It should be recognized that in other examples, the seventh user input can include other forms of user input. In response to detecting the seventh user input, block 568 can be performed.

At block 568 of process 500, the third user interface can cease to be displayed on the display unit. In particular, the seventh user input can cause the third user interface to be dismissed. In some examples, the seventh user input can cause a main menu user interface menu to be displayed in lieu of the third user interface. Alternatively, in examples where media content (e.g., media content 602) was displayed prior to displaying the third user interface (e.g., third user interface 626) and the playing of the media content on the electronic device was paused upon displaying the third user interface (e.g., paused in response to detecting the third user input), the playing of the media content on the electronic device can be resumed in response to detecting the seventh user input. Accordingly, the media content can be displayed in response to detecting the seventh user input.

Figure 5I:
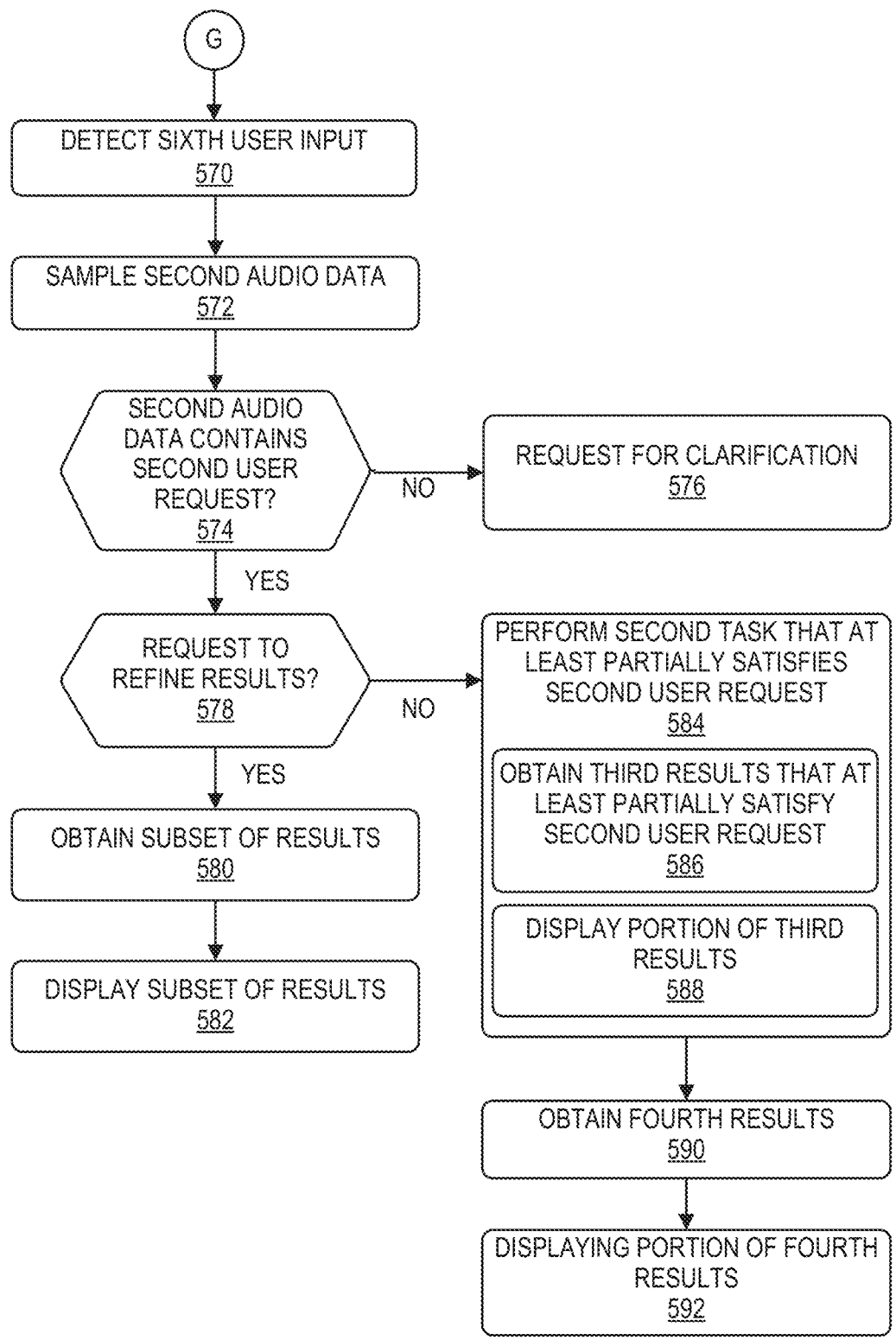
Figure 6M:
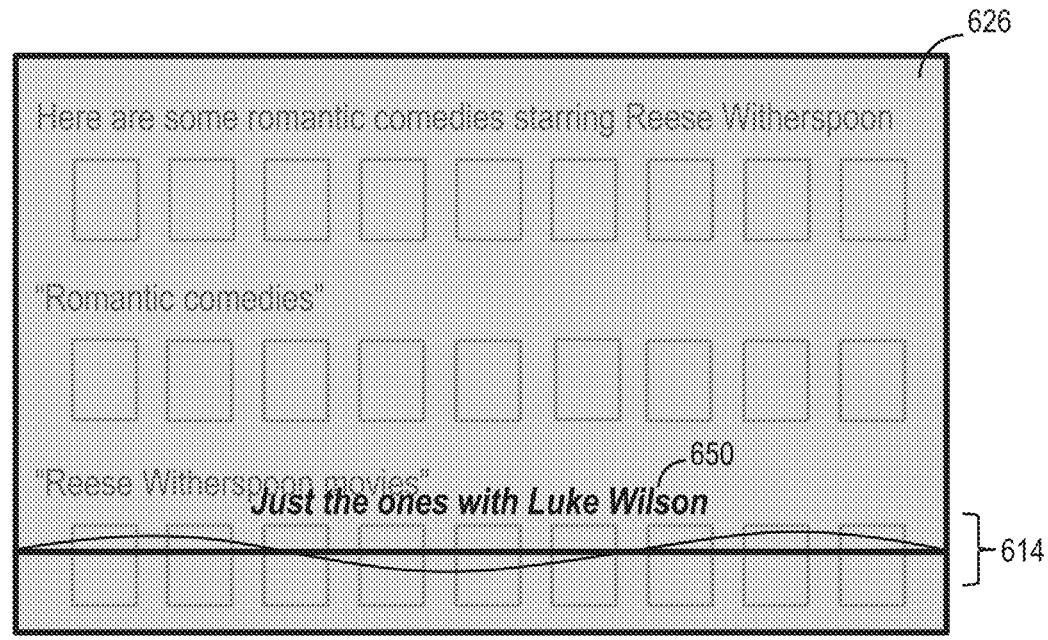

At block 570 of process 500 and with reference to FIG. 5I, a sixth user input can be detected. As depicted in FIG. 6M, the sixth user input can be detected while displaying third user interface 626. However, in other examples, the sixth user input can alternatively be detected while displaying the second user interface (e.g. second user interface 618). At the time the sixth user input is detected, the second user interface or the third user interface can include a portion of the results that at least partially satisfies the user request. The sixth user input can include an input for invoking the digital assistant of the electronic device. In particular, the sixth user input can be similar or identical to the user input of the second input type, described above with reference to block 516. For example, the sixth user input can include pressing a particular button on the remote control of the media device and holding down the button for greater than a predetermined duration (e.g., a long press). In response to detecting the sixth user input, one or more of blocks 572-592 can be performed.

At block 572 of process 500, second audio data can be sampled. Block 572 can be similar or identical to block 518, described above. In particular, the sampled second audio data can include a second user utterance from the user. The second user utterance can represent a second user request directed to the digital assistant. In some examples, the second user request can be a request to perform a second task. For example, with reference to FIG. 6M, the sampled second audio data can include the second user utterance, "Just the ones with Luke Wilson." In this example, the second user utterance can represent a second user request to refine the previous media search to include only media items with Luke Wilson as an actor. In this example, the second user utterance is in natural language form. Further, the second user request can be underspecified where the second user utterance does not expressly specify all the information required to define the user request. For example, the second user utterance does not expressly specify what "the ones" refers to. In other examples, the second user request can be a request to play a media item or to provide specific information (e.g., weather, stock, sports, etc.).

It should be recognized that, in some examples, blocks 520-526, described above, can be similarly performed with respect to the sixth user input. In particular, as shown in FIG. 6M, active visual indicator 614 can be displayed on the display unit upon detecting the sixth user input. Second text representation 650 of the second user utterance can be determined (e.g., using STT processing module 430) and displayed on the display unit. A second user intent corresponding to the second user utterance can be determined (e.g., using natural language processing module 432) based on the second text representation. In some examples, as depicted in FIG. 6M, the contents displayed on the display unit at the time the sixth user input is detected, can be faded or reduced in brightness in response to detecting the sixth user input. This can serve to highlight the active visual indicator 614 and the second text representation 650.

At block 574 of process 500, a determination can be made as to whether the sampled second audio data contains a second user request. Block 574 can be similar or identical to block 528, described above. In particular, the determination at block 574 can be made based on the second user intent determined from the second text representation of the second user utterance. In accordance with a determination that the second audio data does not contain a user request, block 576 can be performed. Alternatively, in accordance with a determination that the second audio data contains a second user request, one or more of blocks 578-592 can be performed.

At block 576 of process 500, a request for clarification of the user's intent can be displayed on the display unit. Block 576 can be similar or identical to block 530, described above.

At block 578 of process 500, a determination can be made as to whether the second user request is a request to refine the results of the user request. In some examples, the determination can be made from the second user intent corresponding to the second user utterance. In particular, the second user request can be determined to be a request to refine the results of the user request based on an expressed indication identified in the second user utterance to refine the results of the user request. For example, with reference to FIG. 6M, second text representation 650 can be parsed during natural language processing to determine whether the second user utterance includes a predetermined word or phrase corresponding to an explicit intent to refine the media search results. Examples of words or phrases that correspond to an explicit intent to refine the media search results can include "just," "only," "filter by," and the like. Thus, it can be determined based on the word "just" in second text representation 650 that the second user request is a request to refine the media search results associated with the user request, "Find romantic comedies starring Reese Witherspoon." It should be recognized that other techniques can be implemented to determine whether the second user request is a request to refine the results of the user request. In accordance with the determination that the second user request is a request to refine the results of the user request, one or more of blocks 580-582 can be performed.

At block 580 of process 500, a subset of the results that at least partially satisfy the user request can be obtained. In some examples, the subset of the results can be obtained by filtering the existing results in accordance with the additional parameters defined in the second user request. For example, the obtained results at block 534 (e.g., including media items 622) can be filtered such that media items with Luke Wilson as an actor are identified. In other examples, a new media search query that combines the requirements of the user request and the second user request can be performed. For example, the new media search query can be a search query for media items having the genre of romantic comedy and the actors of Reese Witherspoon and Luke Wilson. In this example, the new media search query can yield media items such as "Legally Blonde," and "Legally Blonde 2."

In examples where the sixth user input is detected while displaying the third user interface, additional results related to the user request and/or the second user request can be obtained. The additional results can include media items having one or more attributes or parameters described in the user request and/or the second user request. Further, the additional result may not include all the attributes or parameters described in the user request and the second user request. For example, with reference to the example depicted in FIGS. 6H and 6M, the additional results can include media items having at least one (but not all) of the following attributes or parameters: romantic comedy, Reese Witherspoon, and Luke Wilson. The additional results can be desirable to provide the user with a broader set of results and greater options to select from. Further, the additional results can be related results that are likely to interest the user.

Figure 6N:
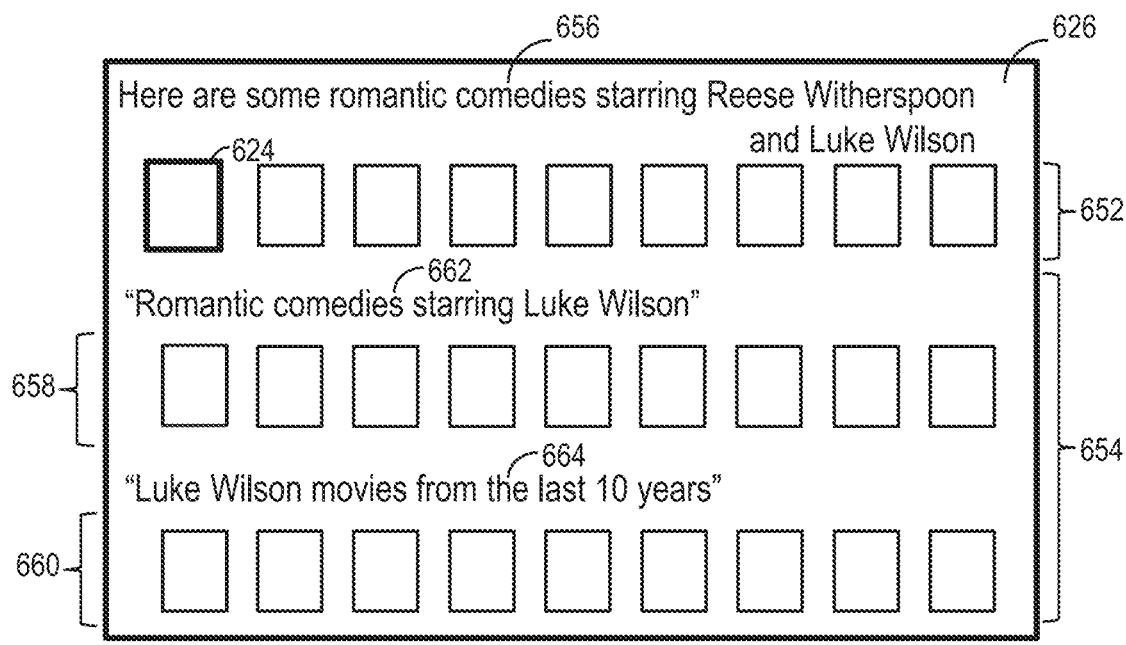
Figure 6P:
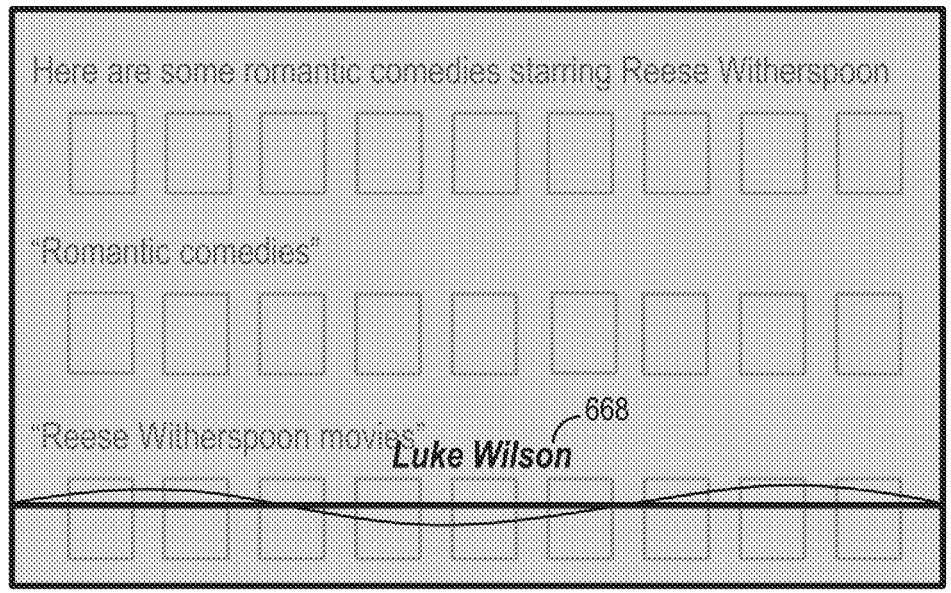

At block 582, the subset of the results can be displayed on the display unit. For example, as shown in FIG. 6N, the subset of the results can include media items 652, which can include movies such as "Legally Blonde," and "Legally Blonde 2." In this example, media items 652 are displayed in a top row of third user interface 626. Text header 656 can describe the attributes or parameters associated with the displayed media items 652. In particular, text header 656 can include a paraphrase of the user's intent associated with the second user utterance. In examples where the sixth user input is detected while displaying the second user interface (e.g., second user interface 618, shown in FIG. 6G), media items 652 can instead be displayed in the second user interface. In these examples, media items 652 can be displayed as a single row across the second user interface. It should be recognized that the manner in which media items 652 are displayed in the second user interface or the third user interface can vary.

In examples where the sixth user input is detected while displaying the third user interface, additional results related to the user request and/or the second user request can be displayed in the third user interface. For example, with reference to FIG. 6N, the additional results can include media items 654 having one or more parameters described in the user request and/or the second user request. Specifically, media items 654 can include media items 658 that are romantic comedies starring Luke Wilson and media items 660 that star Luke Wilson and were released in the last 10 years. Each set of media items (e.g., media items 658, 660) can be labeled with a text header (e.g., text header 662, 664). The text headers can describe the one or more parameters associated with the respective set of media items. The text headers may be in natural language form. Further, each text header can be an exemplary user utterance, which when provided by the user to the digital assistant, can cause the digital assistant to obtain a similar set of media items. For example, with reference to text header 662, the digital assistant can obtain and display media items (e.g., media items 658) that are romantic comedies starring Luke Wilson in response to receiving the user utterance "Romantic comedies starring Luke Wilson" from the user.

With reference back to block 578, it can be determined that the second user request is not a request to refine the results of the user request. Such a determination can be made based on an absence of any explicit indication in the second user utterance to refine the results of the user request. For example, when parsing the second text representation of the second user utterance during natural language processing, no predetermined word or phrase corresponding to an explicit intent to refine the media search results may be identified. This can be due to the second user request being a request that is unrelated to the previous user request (e.g., a new request). For example, the second user request can be "Find me horror movies," which is a request that is unrelated to the previous user request of "Find me romantic comedies starring Reese Witherspoon." Alternatively, the second user request can include ambiguous language, which can be interpreted as either a request to refine the results of the previous user request or a new request that is unrelated to the previous user request. For example, with reference to FIG. 6P, the second user utterance can be "Luke Wilson," which can be interpreted either as a request to refine the results of the previous user request (e.g., refine to only include media items with Luke Wilson as an actor) or a new request that is unrelated to the previous user request (e.g., a new media search for media items with Luke Wilson as an actor). In these examples, the second user request can be determined not to be a request to refine the results of the user request. In accordance with a determination that the second user request is a request to refine the results of the user request, one of more of blocks 584-592 can be performed.

At block 584 of process 500, a second task that at least partially satisfies the second user request can be performed. Block 584 can be similar to block 532, described above, except that the second task of block 584 may differ from the task of block 532. Block 584 can include one or more of blocks 586-588.

At block 586 of process 500, third results can be obtained that at least partially satisfy the second user request. Block 586 can be similar to block 534, described above. With reference to the example depicted in FIG. 6P, the second user utterance "Luke Wilson," can be interpreted as a request to perform a new media search query to identify media items with Luke Wilson as an actor. Thus, in this example, block 586 can include performing the requested media search to obtain media items with Luke Wilson as an actor. It should be recognized that in other examples, the user request can include requests for other types of information (e.g., weather, sports, stocks, etc.) and the respective types of information can be obtained at block 586.

At block 588 of process 500, a portion of the third results can be displayed on the display unit. For example, with reference to FIG. 6Q, the third results, which include media items 670 with Luke Wilson as an actor (e.g., movies such as "Playing It Cool," "The Skeleton Twins," and "You Kill Me"), can be displayed in third user interface 626. In this example, media items 670 can be displayed in a top row of third user interface 626. Text header 678 can describe the attributes associated with the displayed media items 670. In particular, text header 678 can include a paraphrase of the determined user's intent associated with the second user utterance. In examples where the sixth user input is detected while displaying the second user interface (e.g., second user interface 618, shown in FIG. 6G), media items 670 can be displayed in the second user interface. In these examples, media items 670 can be displayed in a single row across the second user interface. It should be recognized that in other examples, the organization or configuration of media items 670 in the second user interface or the third user interface can vary.

At block 590 of process 500, fourth results that at least partially satisfy the user request and/or the second user request can be obtained. In particular, the fourth results can include media items having one or more attributes or parameters defined in the user request and/or the second user request. With reference to the example depicted in FIGS. 6P and 6Q, the fourth results can include media items having one or more of the following attributes or parameters: romantic comedy, Reese Witherspoon, and Luke Wilson. For example, fourth results can include media items 676 having the genre of romantic comedy and starring Luke Wilson. Obtaining the fourth results can be desirable to provide the user with a broader set of results and thus greater options to select from. Further, the fourth results can be associated with alternative predicted user intents derived from the second user request and one or more previous user requests in order to increase the likelihood that the user's actual intent is satisfied. This can serve to increase the accuracy and relevance of results returned to the user, thereby improving user experience.

In some examples, at least a portion of the fourth results can include media items having all the parameters defined in the user request and the second user request. For example, fourth results can include media items 674 having the genre of romantic comedy and starring Reese Witherspoon and Luke Wilson. Media items 674 can be associated with the alternative intent of refining the results of the previous user request using the second user request. In cases where the user actually intended the second request to be a request to refine the obtain results, obtaining media items 674 can be desirable to increase the likelihood that the user's actual intent is satisfied.

In some examples, a portion of the fourth results can be based on a focus of the user interface at the time the sixth user input is detected. In particular, a focus of the user interface can be on one or more items of the third user interface when the sixth user input is detected. In this example, a portion of the fourth results can be contextually-related to the one or more items on which the user interface is focused. For example, with reference to FIG. 6K, cursor 624 can be positioned at media item 627, and thus the focus of third user interface 626 can be on media item 627. In this example, attributes or parameters associated with media item 627 can be utilized to obtain a portion of the fourth results. For example, the category of "Reese Witherspoon movies" associated with media item 627 can be utilized to obtain a portion of the fourth results, where the obtained portion can include media items starring both Reese Witherspoon and Luke Wilson. In another example, media item 627 can be an adventure movie and thus a portion of the fourth results can include media items that are adventure movies starring Luke Wilson.

Figure 6Q:
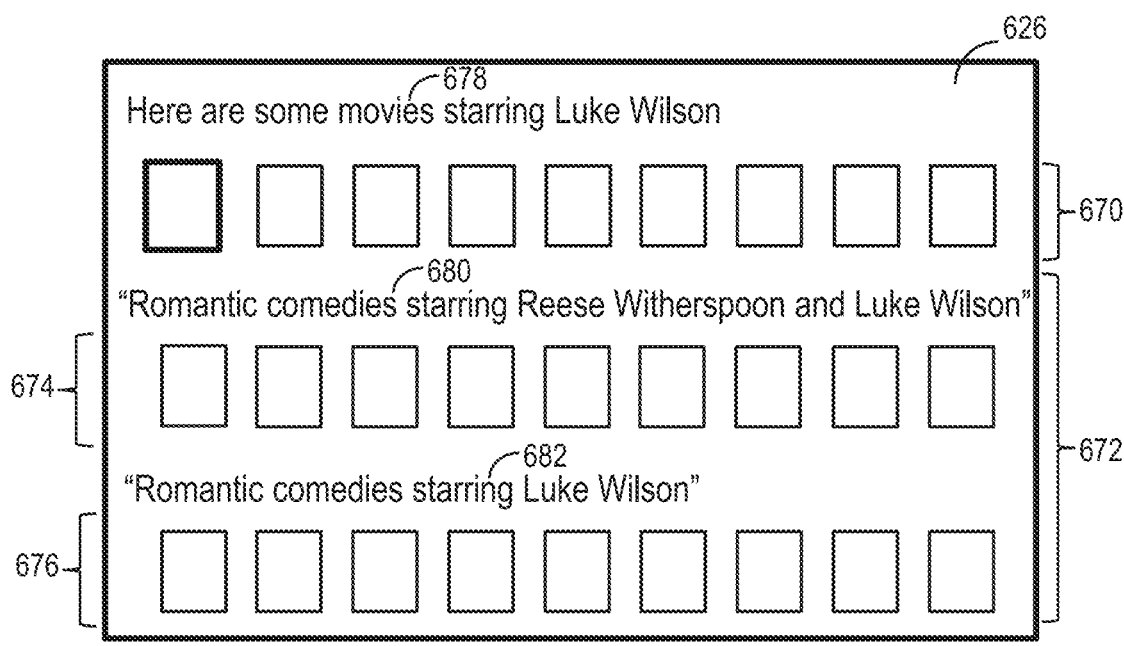

At block 592 of process 500, a portion of the fourth results can be displayed. In examples where the sixth user input is detected while displaying the third user interface, the portion of the fourth results can be displayed in the third user interface. For example, as shown in FIG. 6Q, the portion of the fourth results can include media items 672 that are displayed in rows subsequent to media items 670. Media items 672 can be associated with one or more of the attributes or parameters defined in the second user request and/or the user request (e.g., romantic comedy, Reese Witherspoon, and Luke Wilson). For example, media items 672 can include media items 676 that are romantic comedies starring Luke Wilson and media items 674 that are romantic comedies starring Reese Witherspoon and Luke Wilson. Each set of media items (e.g., media items 674, 676) can be labeled with a text header (e.g., text header 680, 682). The text headers can describe the one or more attributes or parameters associated with the respective set of media items. The text headers may be in natural language form. Further, each text header can be an exemplary user utterance, which when provided by the user to the digital assistant, can cause the digital assistant to obtain a similar set of media items with similar attributes.

As described above, the second user utterance of "Luke Wilson" can be associated with two likely user intents: a first user intent of performing a new media search or a second user intent of refining the results of the previous user request. Displayed media items 670 can satisfy the first user intent and displayed media items 674 can satisfy the second user intent. In this example, media items 670 and 674 are displayed in the top two rows. In this way, results for the two most likely user intents associated with the second user request (e.g., new search or a refinement of the previous search) can be displayed prominently (e.g., top two rows) in third user interface 626. This can be desirable to minimize scrolling or browsing by the user in the third user interface prior to find a desired media item to consume. It should be recognized that the manner of displaying media items 670 and 674 prominently in third user interface 626 to minimize scrolling and browsing can vary.

Figure 7A:
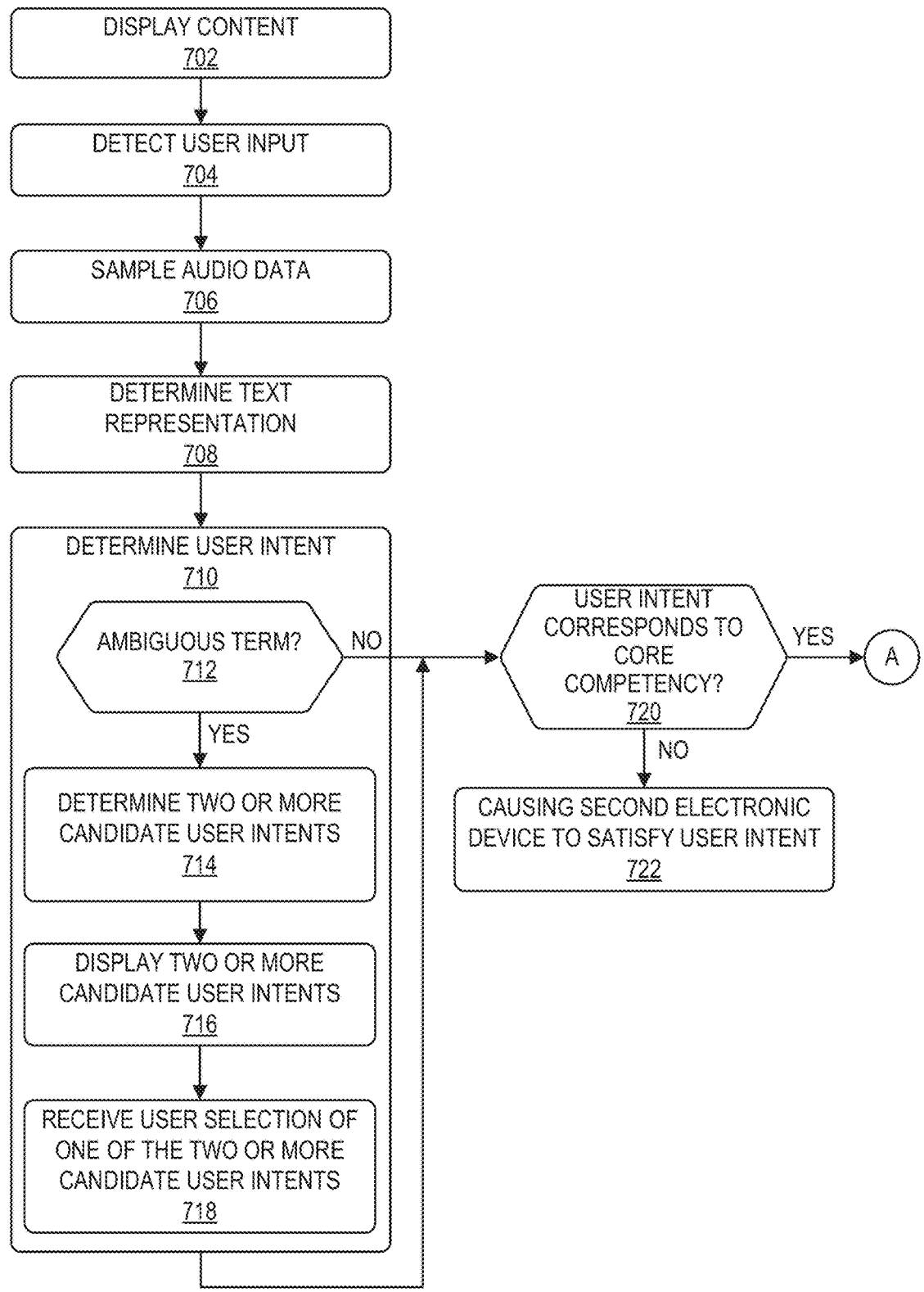
FIGS. 7A-C illustrate a process for operating a digital assistant of a media system according to various examples.
Figure 7B:
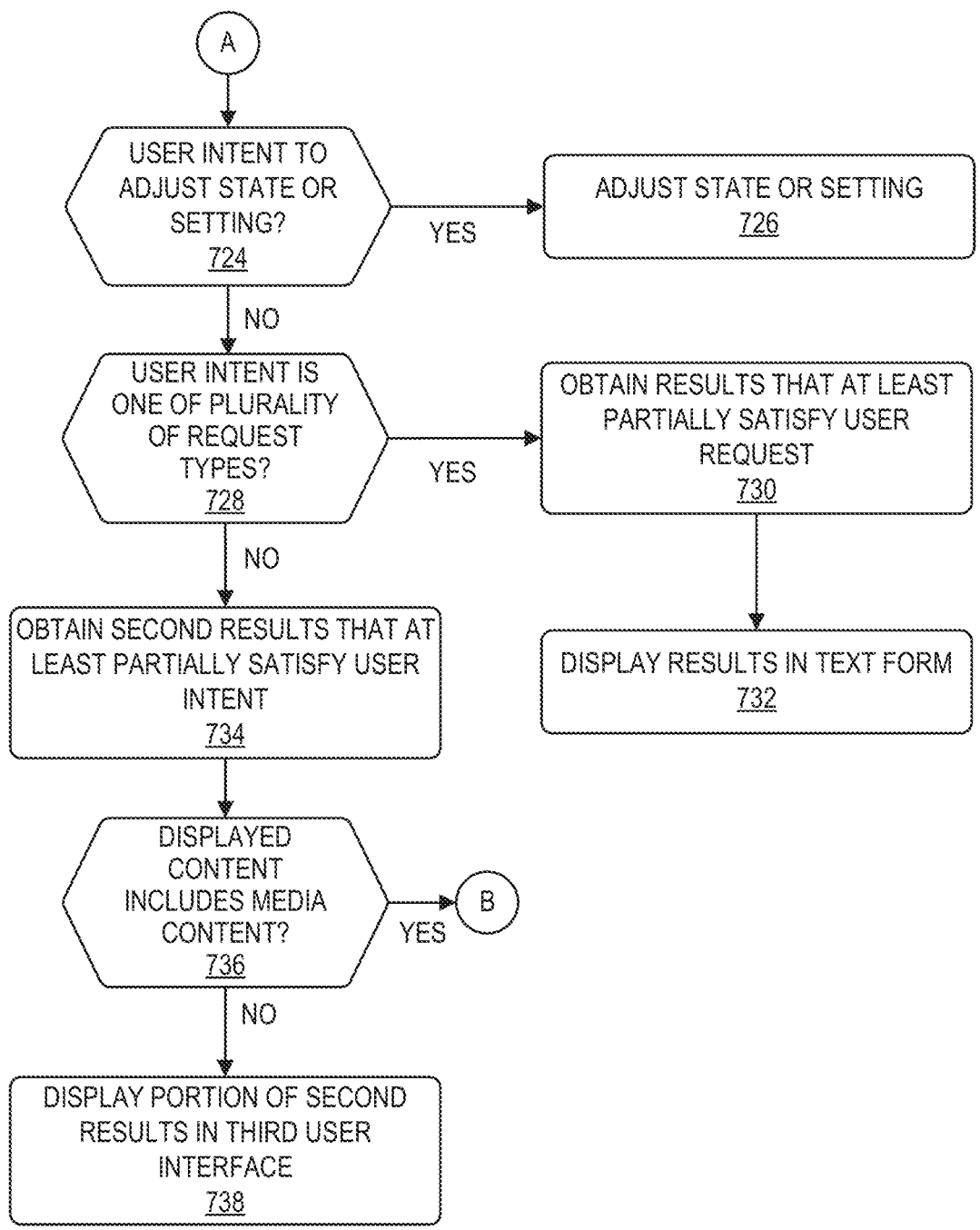
Figure 7C:
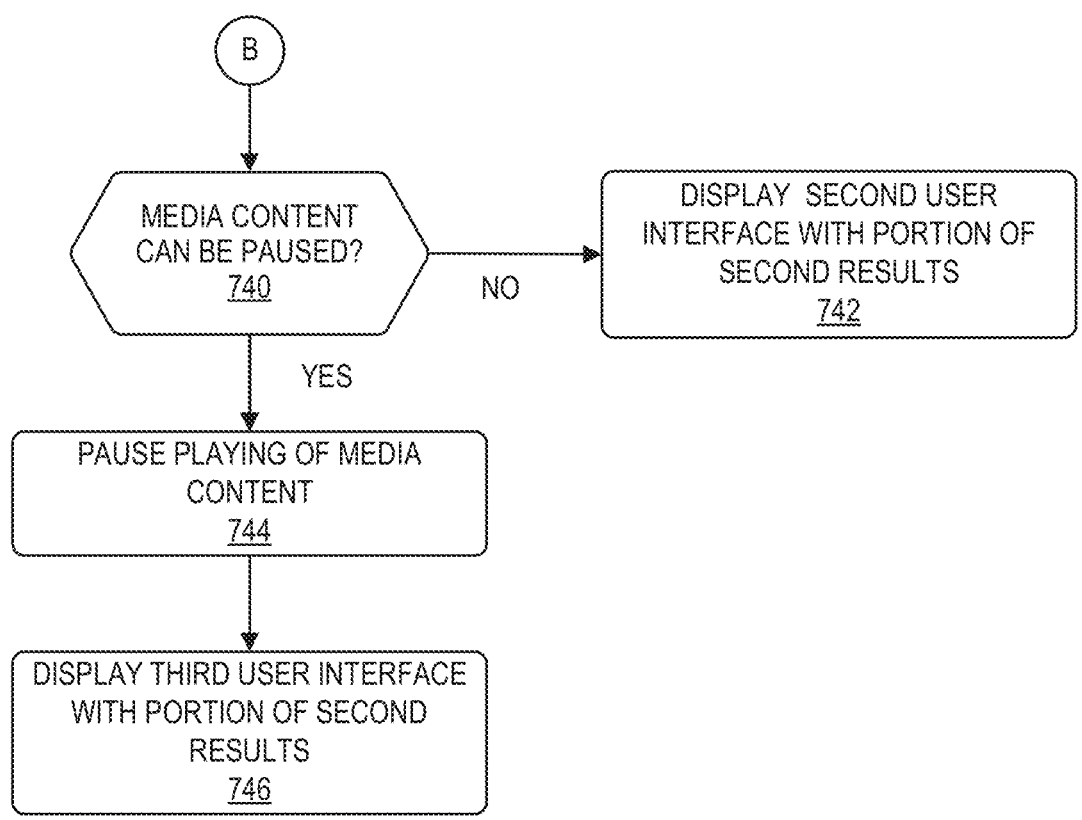

FIGS. 7A-C illustrate process 700 for operating a digital assistant of a media system according to various examples. Process 700 can be performed using one or more electronic devices implementing a digital assistant. For example, process 700 can be performed using one or more of system 100, media system 128, media device 104, user device 122, or digital assistant system 400, described above. FIGS. 8A-8N and 8P-8W depict screen shots displayed by a media device on a display unit at various stages of process 700, according to various examples. Process 700 is described below with simultaneous references to FIGS. 7A-C and 8A-8N and 8P-8W. It should be appreciated that some operations in process 700 can be combined, the order of some operations can be changed, and some operations can be omitted.

Figure 8A:
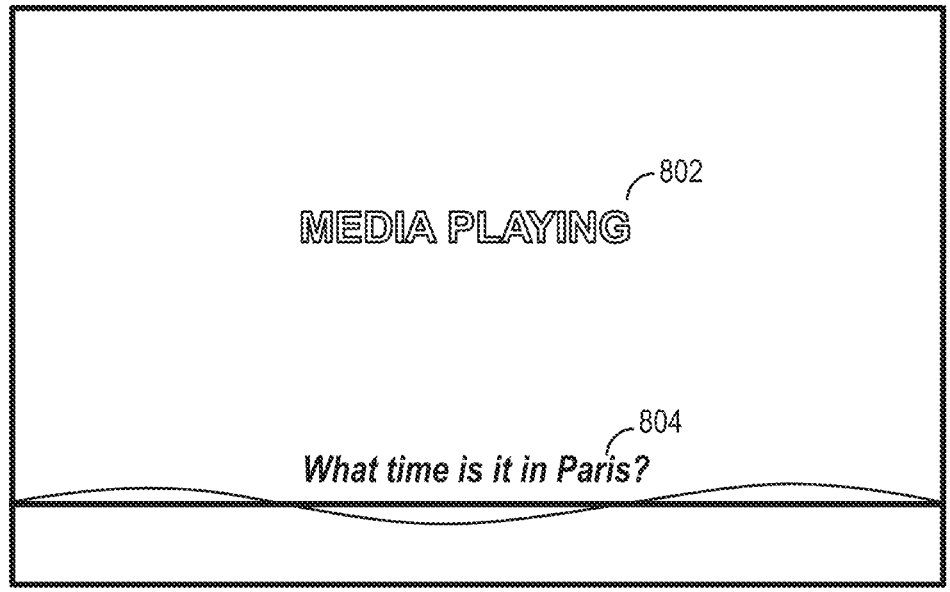
FIGS. 8A-8N and 8P-8W illustrate screen shots displayed by a media device on a display unit at various stages of the process shown in FIGS. 7A-C according to various examples.

At block 702 of process 700, content can be displayed on a display unit (e.g., display unit 126). Block 702 can be similar or identical to block 502, described above. With reference to FIG. 8A, the displayed content can include media content 802 (e.g., movies, videos, television shows, video games, etc.) that is being played on a media device (e.g., media device 104). In other examples, the displayed content can include other content, such as content associated with an application running on the media device or a user interface for interacting with a digital assistant of the media device. In particular, the displayed content can include a main menu user interface or a user interface with objects or results previously requested by a user.

At block 704 of process 700, a user input can be detected. Block 704 can be similar or identical to block 504, described above. The user input can be used to invoke a digital assistant of the media device. In some examples, the user input can be detected while the content of block 702 is being displayed. The user input can be detected on a remote control (e.g., remote control 124) of the media device. For example, the user input can correspond to the second input type described in block 516 of process 500. In particular, the user input of block 704 can include pressing a particular button on the remote control of the media device and holding down the button for greater than a predetermined duration (e.g., a long press). In response to detecting the user input, one or more of blocks 706-746 can be performed.

At block 706 of process 700, audio data can be sampled. Block 706 can be similar or identical to block 518, described above. The sampled audio data can include a user utterance. The user utterance can represent a user request directed to the digital assistant of the media device. For example, with reference to the example illustrated in FIG. 8A, the sampled audio data can include the user utterance of "What time is it in Paris?" The user utterance can be in the form of unstructured natural language. In some examples, the request represented by the user utterance can be underspecified where information required to perform the request is missing or not explicitly defined in the user utterance (e.g., "Play this"). In other examples, the user utterance may not be an explicit request, but rather an indirect question or statement from which the request is inferred (e.g., "What did he say?"). Further, as described in greater detail below in block 712, the user utterance can include one or more ambiguous terms.

At block 708 of process 700, a text representation of the user utterance in the sampled audio data can be determined. Block 708 can be similar or identical to block 522, described above. In particular, the text representation can be determined by performing STT processing on the user utterance in the sampled audio data. For example, with reference to FIG. 8A, text representation 804 "What time is it in Paris?" can be determined from the user utterance in the sampled audio data and displayed on the display unit. As shown, text representation 804 can be overlaid over media content 802 while media content 802 continues to play on the media device.

In some examples, the STT processing used to determine the text representation can be biased toward media-related text results. Additionally or alternatively, the text representation can be based on previous user utterances that were received by the media device prior to sampling the audio data. Further, in some examples, the text representation can be based on a time at which the previous user utterances were received prior to sampling the audio data. In examples where the text representation is obtained from a separate device (e.g., DA server 106), the media device can indicate to the separate device that the sampled audio data is associated with a media application and the indicating can bias the STT processing on the separate device toward media-related text results.

At block 710 of process 700, a user intent corresponding to the user utterance can be determined. Block 710 can be similar to block 526, described above. In particular, the text representation of block 708 can be processed using natural language processing (e.g., with natural language processing module 432) to derive the user intent. For example, with reference to FIG. 8A, it can be determined from text representation 804 "What time is it in Paris?", that the user intent is to request for the time in a location named "Paris." The natural language processing used to determine the user intent can be biased toward media-related user intents. In examples where the user intent is obtained from a separate device (e.g., DA server 106), the media device can indicate to the separate device that the sampled audio data is associated with a media application and the indicating can bias the natural language processing on the separate device toward media-related user intents.

In some examples, the user intent can be determined based on prosody information derived from the user utterance in the sampled audio data. In particular, prosody information (e.g., tonality, rhythm, volume, stress, intonation, speed, etc.) can be derived from the user utterance to determine the attitude, mood, emotion, or sentiment of the user. The user intent can then be determined from the attitude, mood, emotion, or sentiment of the user. For example, the sampled audio data can include the user utterance "What did he say?" In this example, it can be determined that the user is impatient or frustrated based on the high volume and stress detected in the user utterance. Based on the user utterance and the determined user sentiment, it can be determined that the user intent includes a request to increase the volume of the audio associated with the media content being played on the media device.

As shown in FIG. 7A, block 710 can include one or more of blocks 712-718. In particular, one or more of blocks 712-718 can be performed when two or more user intents are found to be highly probable and the natural language processing module is unable to narrow the two or more user intents down to a single user intent. For example, such a situation can arise when the user utterance contains an ambiguous term that cannot be disambiguated based on available contextual information.

At block 712 of process 700, a determination can be made as to whether the user utterance (or the text representation of the user utterance) includes an ambiguous term. The determination can be made during natural language processing (e.g., using natural language processing module 432) to determine the user intent. An ambiguous term can be a word or phrase that has more than one possible interpretation. For example, with reference to FIG. 8A, the term "Paris" in the user utterance "What time is it in Paris?" can be interpreted as the city of Paris in France or the city of Paris in Texas, USA. Thus, the term "Paris" in the user utterance can be determined to be an ambiguous term.

In some examples, contextual information can be retrieved (e.g., by the digital assistant) to disambiguate potentially ambiguous terms. If disambiguation is successful, it can be determined that the user utterance does not include an ambiguous term. For example, it can be determined that media content 802 is a movie with Paris, France as its setting (e.g., "Ratatouille") and thus the user is more likely referring to Paris, France than Paris, Tex. In this example, the term "Paris" can be successfully disambiguated to refer to Paris, France and thus it can be determined that the user utterance does not include an ambiguous term.

In another example, the user utterance can be "Play this." In this example, the user utterance does not explicitly define the particular media item to be played and thus the term "this," interpreted in isolation, can be an ambiguous term that could refer to any media item accessible to the media device. The term can be disambiguated using contextual information displayed by the media device on the display unit. For example, the digital assistant can determine whether a focus of a displayed user interface is on a media item. In accordance with a determination that a focus of the user interface is on a media item, the digital assistant can disambiguate the term "this" and determine that the term refers to the media item on which the displayed user interface is focused. Based on this determination, it can be determined at block 712 that the user utterance does not include an ambiguous term. The user intent can thus be determined to be a request to play the media item on which the displayed user interface is focused.

In examples where a term cannot be disambiguated, a determination can be made at block 712 that the user utterance contains an ambiguous term. In response to determining that the user utterance includes an ambiguous term, one or more of blocks 714-718 can be performed. At block 714 of process 700, two or more candidate user intents can be obtained based on the ambiguous term. The two or more candidate user intents can be the most likely candidate user intents determined from the user utterance that cannot be disambiguated. With reference to the example depicted in FIG. 8A, the two or more candidate user intents can include the first candidate user intent of requesting the time in Paris, France, and the second candidate user intent of requesting the time in Paris, Tex.

At block 716 of process 700, the two or more candidate user intents can be displayed on the display unit for user selection. For example, with reference to FIG. 8B, first candidate user intent 810 and second candidate user intent 808 can be displayed. Further, text prompt 806 can be provided to prompt the user to indicate the actual user intent corresponding to the user utterance by selecting between first candidate user intent 810 and second candidate user intent 808. Text prompt 806, first candidate user intent 810 and second candidate user intent 808 can be overlaid on media content 802.

Figure 8B:
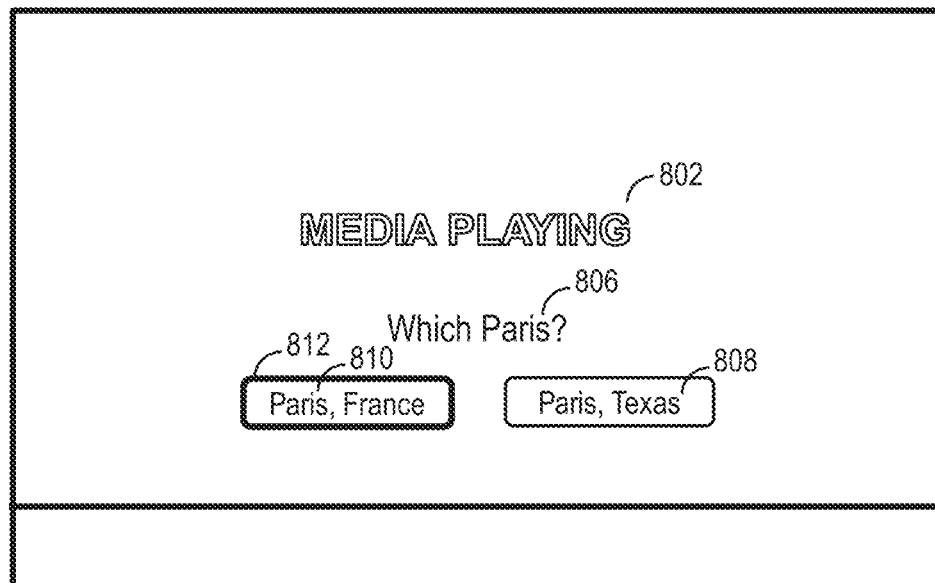
FIG. 8O is intentionally omitted to avoid any confusion between the capital letter O and the numeral 0 (zero).

At block 718 of process 700, a user selection of one of the two or more candidate user intents can be received. In some examples, the user selection can be received via selection of an affordance corresponding to one of the candidate user intents. In particular, as shown in FIG. 8B, each of the two or more candidate user intents (810, 808), can be displayed as a selectable affordance on the display unit. The media device can receive input from a user (e.g., via a remote control of the media device) to change the focus of the display to one of the affordances. A user selection of the candidate user intent corresponding to that affordance can then be received (e.g., via a remote control of the media device). For example, as shown in FIG. 8B, the media device can receive user input to move cursor 812 over the affordance corresponding to first candidate user intent 810 (e.g., Paris, France). A user selection of the first candidate user intent 810 can then be received.

Figure 8C:
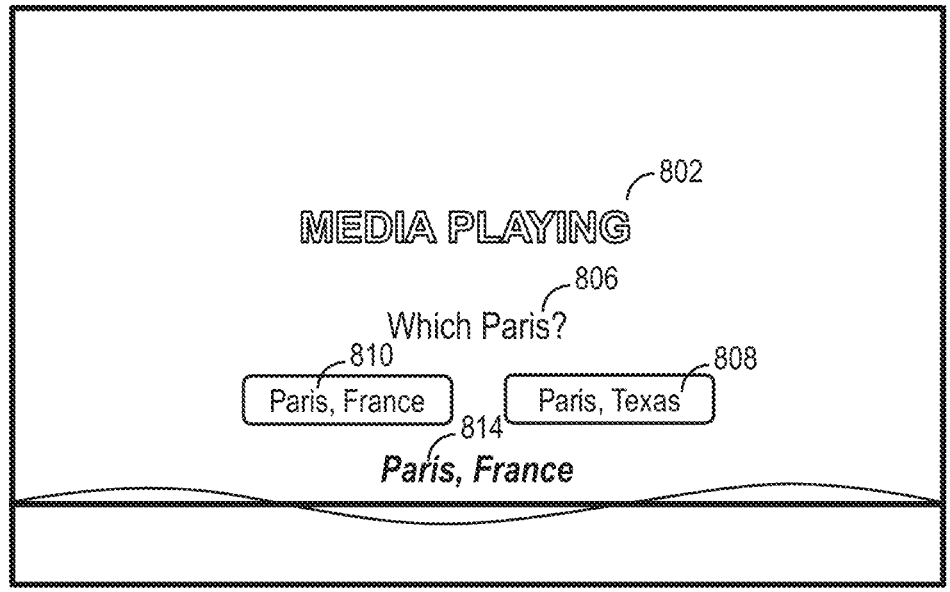
Figure 8D:
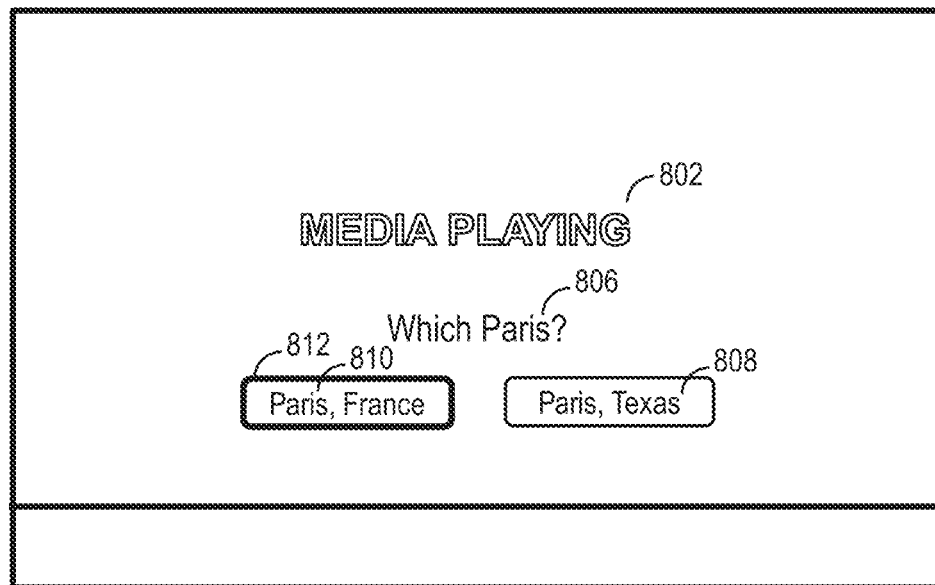

In other examples, the user selection can be received via voice interaction with the digital assistant. For example, while displaying the two or more candidate user intents, a second user input can be detected. The second user input can be similar or identical to the user input of block 704. In particular, the second user input can be an input to invoke the digital assistant (e.g., pressing a particular button on the remote control of the media device and holding down the button for greater than a predetermined duration). In response to detecting the second user input, second audio data can be sampled. The second audio data can include a second user utterance representing a user selection of one of the two or more interpretations. For example, with reference to FIG. 8C, the second audio data can include the second user utterance "Paris, France." As shown, text representation 814 of the second user utterance "Paris, France" can be displayed on the display unit. In this example, the second user utterance "Paris, France" can represent the user selection of first candidate user intent 810 (e.g., Paris, France). For example with reference to FIG. 8D, on the second user utterance "Paris, France," it can be determined that first candidate user intent 810 is the actual user intent corresponding to the user utterance "What is the time in Paris?" As such, it can be determined at block 710 that the user intent is to request the time in Paris, France, as exemplified in FIG. 8D. Upon determining the user intent based on the received user selection, one or more of blocks 720-746 can be performed.

In some examples, blocks 710-718 can be performed without outputting speech from the media device. In particular, text prompt 806 and candidate user intents 808, 810 can be displayed without outputting speech associated with the two or more candidate user intents 808, 810. Thus, input from the user can be received in the form of speech, but output from the digital assistant can be presented visually (and not in the form of audio) to the user on the display unit. This can be desirable to preserve the communal experience associated with consuming media content, which can improve user experience of the media device.

With reference back to block 712, in response to determining that the user utterance does not include an ambiguous term, one or more of blocks 720-746 can be performed. At block 720 of process 700, a determination can be made as to whether the user intent corresponds to one of a plurality of core competencies associated with the media device. For example, the media device can be associated with several predetermined core competencies, such as, for example, searching for media items, playing media items, and providing information related to media items, weather, stocks, and sports. If the user intent involves performing a task related to one of the several predetermined core competencies, the user intent can be determined to correspond to one of the several predetermined core competencies. For example, if the user intent is a request for media items starring Reese Witherspoon, the user intent can be determined to correspond to one of the several predetermined core competencies. In response to determining that the user intent corresponds to one of a plurality of core competencies associated with the electronic device, one or more of blocks 724-746 can be performed.

Conversely, if the user intent involves performing a task outside of the several predetermined core competencies, the user intent can be determined not to correspond to one of the several predetermined core competencies. For example, if the user intent is a request for map directions, the user intent can be determined not to correspond to one of the several predetermined core competencies. In response to determining that the user intent does not correspond to one of a plurality of core competencies associated with the electronic device, block 722 can be performed.

At block 722 of process 700, a second electronic device (e.g., device 122) can be caused to at least partially satisfy the user intent. In particular, the second electronic device can be caused to perform a task in furtherance of satisfying the user intent. In one example, it can be determined that the media device is not configured to satisfy the user intent of requesting for map directions and thus the user intent can be transmitted to the second electronic device to satisfy the user intent. In this example, the second user device can perform the task of displaying the requested map directions. In other examples, information other than the user intent can be transmitted to the second electronic device to cause the second electronic device to perform a task in furtherance of satisfying the user intent. For example, the digital assistant of the media device can determine the task flow or structured query for satisfying the user intent (e.g., using natural language processing module 432 or task flow processing module 436) and the task flow or structured query can be transmitted to the second electronic device. The second electronic device can then execute the task flow or structured query in furtherance of satisfying the user intent.

As will become apparent in the description provided below, the level of intrusiveness associated with satisfying the user intent can be based on the nature of the user intent. In some cases, a task associated with satisfying the user intent can be performed without displaying any additional response or output on the display (e.g., block 726). In other cases, only a text response (e.g., with no corresponding visual or audio output) is provided to satisfy the user intent (e.g., block 732). In yet other cases, a user interface with relevant results can be displayed to satisfy the user intent (e.g., blocks 738, 742, or 746). The user interface can occupy a majority or less than a majority of the display unit. Accordingly, process 700 can intelligently adjust the level of intrusiveness of the output depending on the nature of the user intent. This enables convenient access to the services of the digital assistant while reducing undesirable disruption during consumption of media content, which improves overall user experience.

At block 724 of process 700, a determination can be made as to whether the user intent comprises a request to adjust a state or a setting of an application on the media device. In response to determining that the user intent comprises a request to adjusting a state or a setting of an application on the media device, block 726 can be performed. At block 726 of process 700, the state or the setting of the application can be adjusted to satisfy the user intent.

In some examples, the state or setting can be associated with the displayed media content being played on the media device. For example, a request to adjust a state or a setting of an application can include a request to control the playing of media content by the media device. In particular, it can include a request to pause, resume, restart, stop, rewind, or fast-forward playing of the displayed media content on the media device. It can also include a request to skip forward or backward in the media content (e.g., by a specified duration) in order to play a desired portion of the media content. Further, a request to adjust a state or a setting of an application can include a request to turn on/off subtitles or closed captioning (e.g., in a specified language) associated with the displayed media content, increase/decrease the volume of the audio associated with the displayed media content, mute/unmute the audio associated with the displayed media content, or speed-up/slow-down the rate at which the displayed media content is played.

Figure 8E:
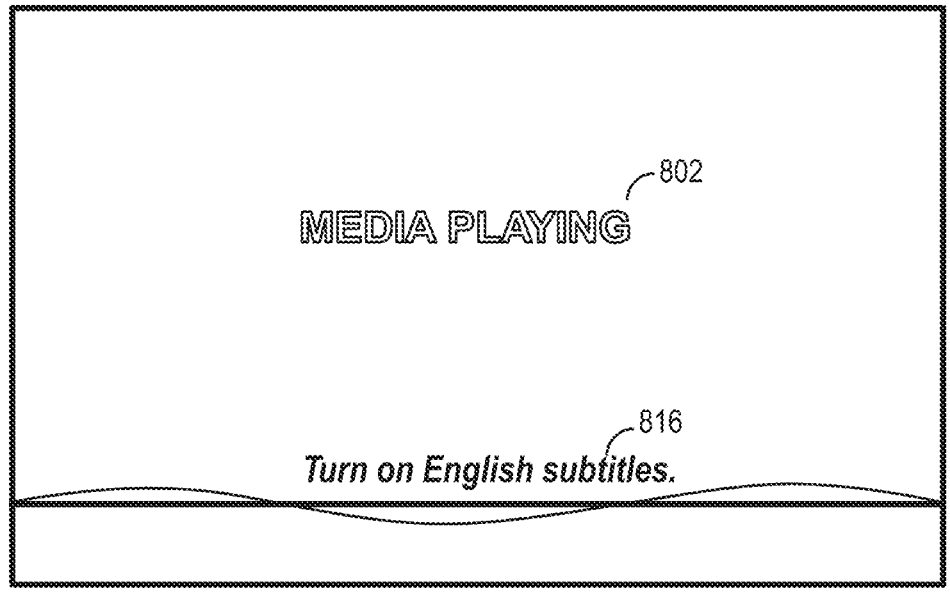
Figure 8F:
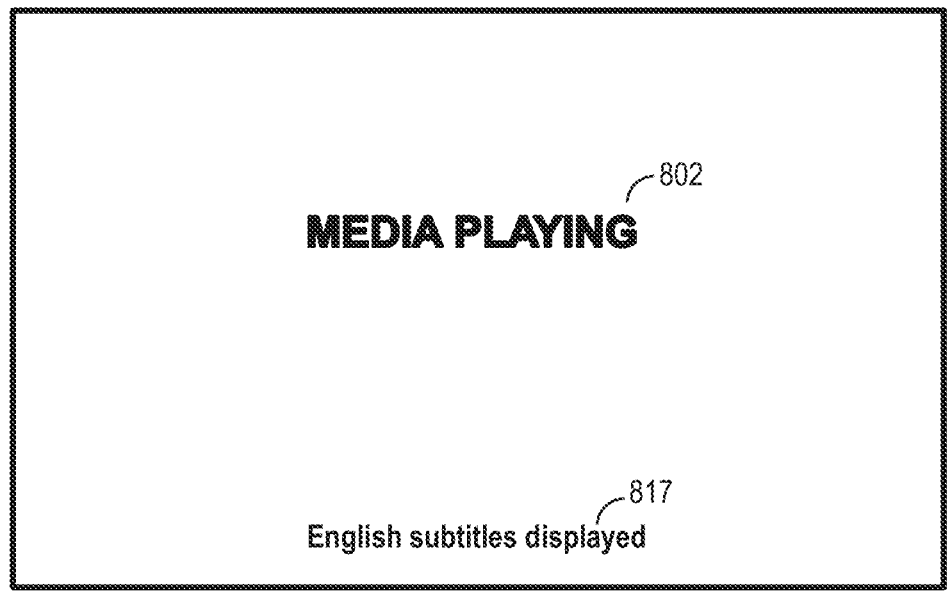

FIGS. 8E-F depict an illustrative example of a user intent that comprises a request to control the playing of media content by the media device. In this example, the digital assistant can be invoked (e.g., at block 704) while playing media content 802. Media content can be initially displayed without displaying subtitles. The sampled audio data (e.g., at block 706) can contain the user utterance "Turn on English subtitles." As shown in FIG. 8E, text representation 816 of the user utterance can be displayed on the display unit. Based on this user utterance, it can be determined at block 710 that the user intent comprises a request to turn on the display of English subtitles for media content 802. Further, at block 724, it can be determined that this user intent is a request to adjust a state or a setting of an application of the electronic device. In response to this determination, English subtitles for the media content 802 can be turned on. As represented by label 817 in FIG. 8F, display of English subtitles associated with media content 802 can be initiated to satisfy the user intent.

Figure 8G:
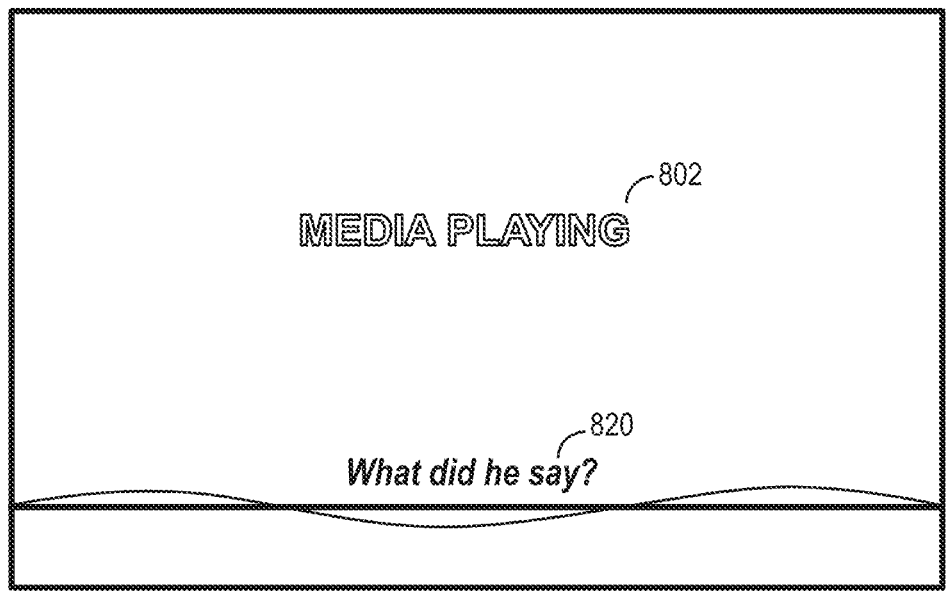
Figure 8H:
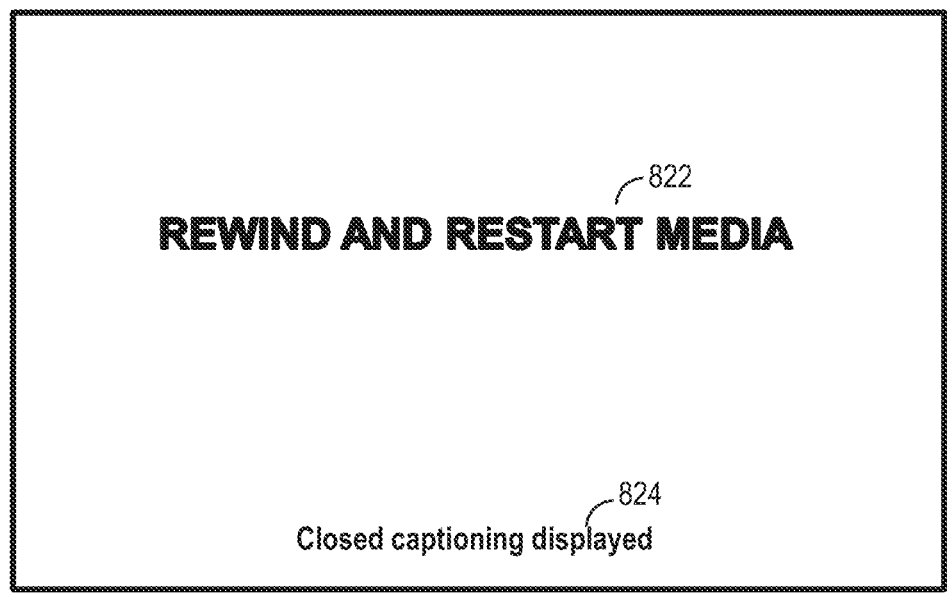

In another illustrative example depicted in FIGS. 8G-H, the user utterance in the sampled audio data can be a natural language expression indicating that a user did not hear a portion of audio associated with the media content. In particular, as depicted by text representation 820 in FIG. 8G, the user utterance can be "What did he say?" In this example, it can be determined (e.g., at block 710) that the user intent comprises a request to replay a portion of the media content corresponding to the portion of the audio that the user did not hear. It can also be determined that the user intent comprises a request to turn on closed captioning to assist with difficulties hearing the audio associated with the media content. Further, based on prosody information in the user utterance, it can be determined that the user is frustrated or impatient and thus, it can be determined based on the user sentiment that the user intent comprises a request to increase the volume of the audio associated with the media content. At block 724, it can be determined that these user intents are requests to adjust a state or a setting of an application of the electronic device. In response to this determination, the media content can be rewound by a predetermined duration (e.g., 15 seconds) to a previous portion of the media content and playback of the media content can be restarted from this previous portion (e.g., as represented by label 822 in FIG. 8H). Additionally, prior to restarting playback of the media content from the previous portion, the closed captioning can be turned on (e.g., as represented by label 824 in FIG. 8H).

Further, the volume of the audio associated with the media content can be increased prior to restarting play of the media content from the previous portion.

It should be appreciated that closed captioning or subtitles associated with media content can be obtained from the service provider (e.g., cable provider or media subscription service). However, in examples where closed captioning or subtitles are not available from the service provider, the media device can generate closed captioning or subtitles to assist with difficulties hearing the audio associated with the media content. For example, prior to receiving the user utterance in the sampled audio data and while the media content is playing, speech in the audio associated with the media content can be continuously converted to text (e.g., using STT processing module 730) and stored in association with the media content. In response to a user request to replay a previous portion of the media content that the user did not hear, text corresponding to the previous portion being replayed can be retrieved and displayed while replaying the previous portion of the media content.

In some examples, the state or setting associated with the displayed media content can be adjusted without displaying additional user interfaces for performing the adjustment or without providing any text or graphics representing a confirmation that the state or setting is being adjusted. For example, in the depicted examples of FIGS. 8E-H the subtitles (or closed captioning) can be simply turned on without explicitly displaying text such as "subtitles turned on" or without displaying a user interface for controlling the display of subtitles. Further, the state or setting can be adjusted without outputting any audio associated with satisfying the user intent. For example, in FIGS. 8E-H the subtitles (or closed captioning) can be turned on without outputting audio (e.g., speech or a non-verbal audio signal) confirming that the subtitles have been turned on. Thus, the requested action can be simply performed without additional audio or visual disruption to the media content. In this way, process 700 can minimize disruption to the user's consumption of media content while providing convenient access to the services of the digital assistant, thereby improving user experience.

Figure 8I:
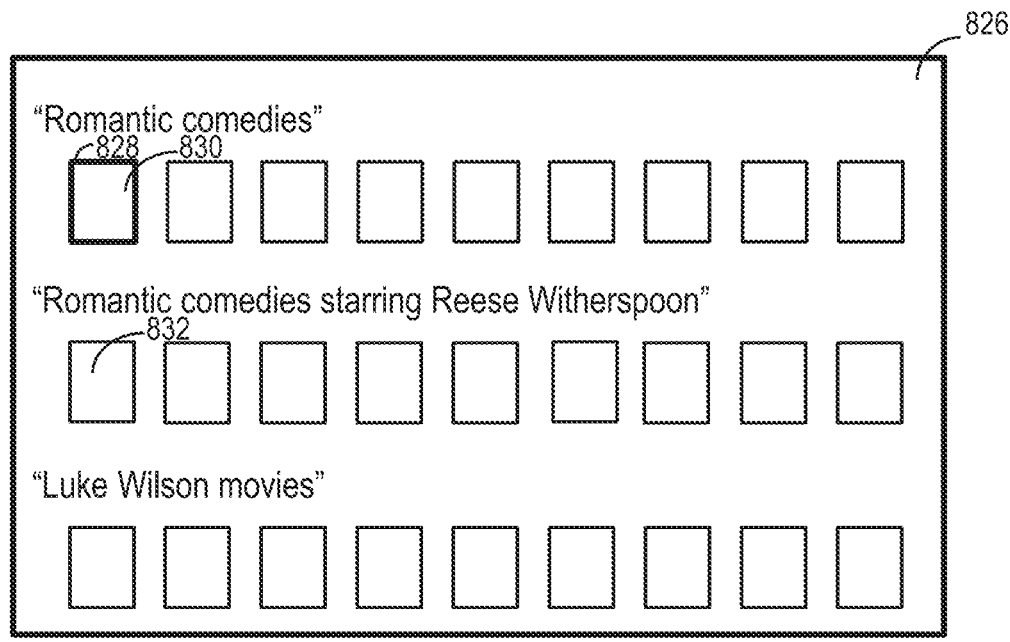
Figure 8J:
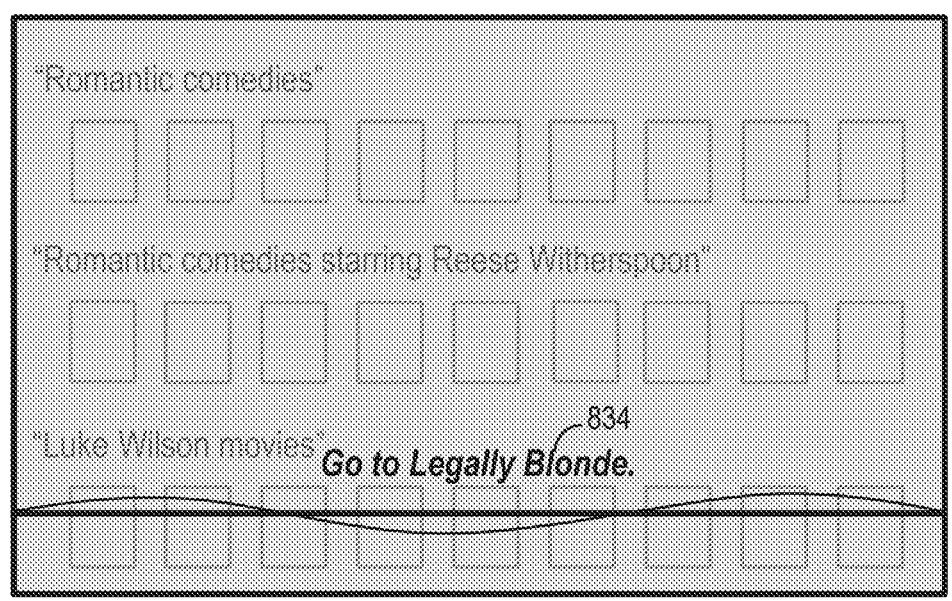
Figure 8K:
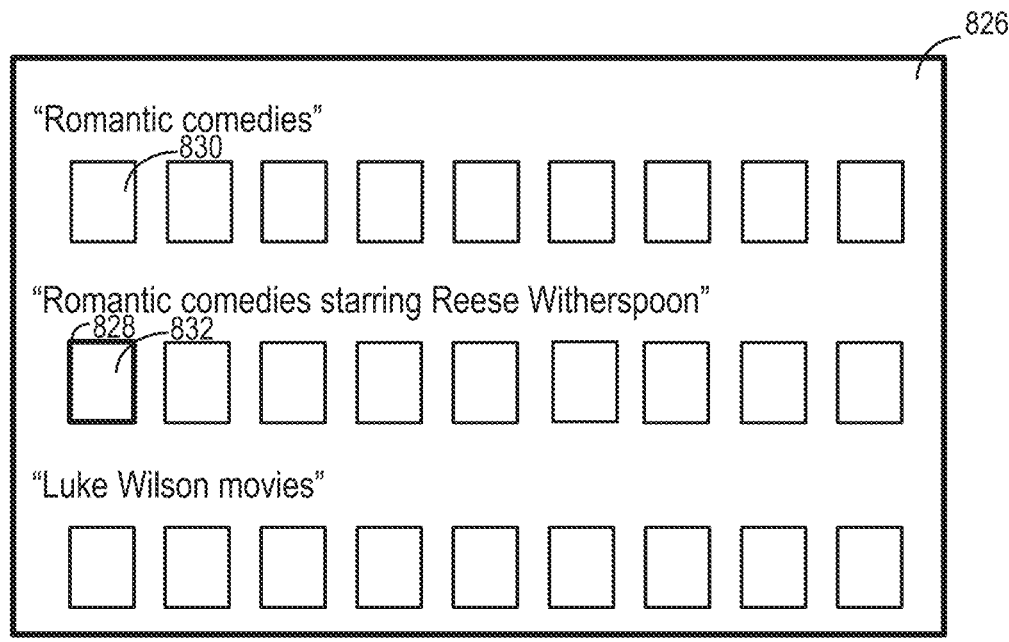

In other examples, a request to adjust a state or a setting of an application on the media device can include a request to navigate through a user interface (e.g., second user interface 818, third user interface 826, or a main menu user interface) of the media device. In one example, a request to navigate through a user interface can include a request to switch a focus of the user interface from a first object (e.g., a first media item) to a second object in the user interface (e.g., a second media item). FIGS. 8I-K depict an illustrative example of one such request. As shown in FIG. 8I, the displayed content can include third user interface 826 with a plurality of media items organized into various categories (e.g., "Romantic comedies," "Romantic comedies starring Reese Witherspoon," and "Luke Wilson movies"). As indicated by the position of cursor 828, a focus of third user interface 826 can be on first media item 830 that is under the category of "Romantic comedies." Second media item 832 can be titled "Legally Blonde" and can be positioned under the category of "Romantic comedies starring Reese Witherspoon." As depicted by text representation 834 in FIG. 8J, the user utterance in the sampled audio data (e.g., at block 706) can be, "Go to Legally Blonde." Based on this user utterance, it can be determined (e.g., at block 710) that the user intent is a request to switch the focus of third user interface 826 from first media item 830 to second media item 832 that is titled "Legally Blonde." In response to determining (e.g., at block 724) that this user intent is a request to adjust a state or a setting of an application of the electronic device, the focus of third user interface 826 can be switched from first media item 830 to second media item 832. For example, as shown in FIG. 8K, the position of cursor 828 can be changed from first media item 830 to second media item 832.

In another example, a request to navigate through a user interface can include a request to change the focus of the user interface to a particular category of results displayed in the user interface. For example, FIG. 8I includes media items associated with the categories of "Romantic comedies," "Romantic comedies starring Reese Witherspoon," and "Luke Wilson movies." Rather than "Go to Legally Blonde," the user utterance in the sampled audio data can instead be "Jump to Romantic Comedies Starring Reese Witherspoon." Based on this user utterance, it can be determined (e.g., at block 710) that "Romantic Comedies Starring Reese Witherspoon" defines a category of media items displayed in third user interface 826 and thus the user intent can be determined to be a request to change the focus of the user interface to one or more media items associated with that category. In response to determining (e.g., at block 724) that this user intent is a request to adjust a state or a setting of an application of the electronic device, the focus of third user interface 826 can be shifted to one or more media items associated with the category. For example, as shown in FIG. 8K, the position of cursor 828 can be shifted to second media item 832 associated with "Romantic comedies starring Reese Witherspoon."

Figure 8L:
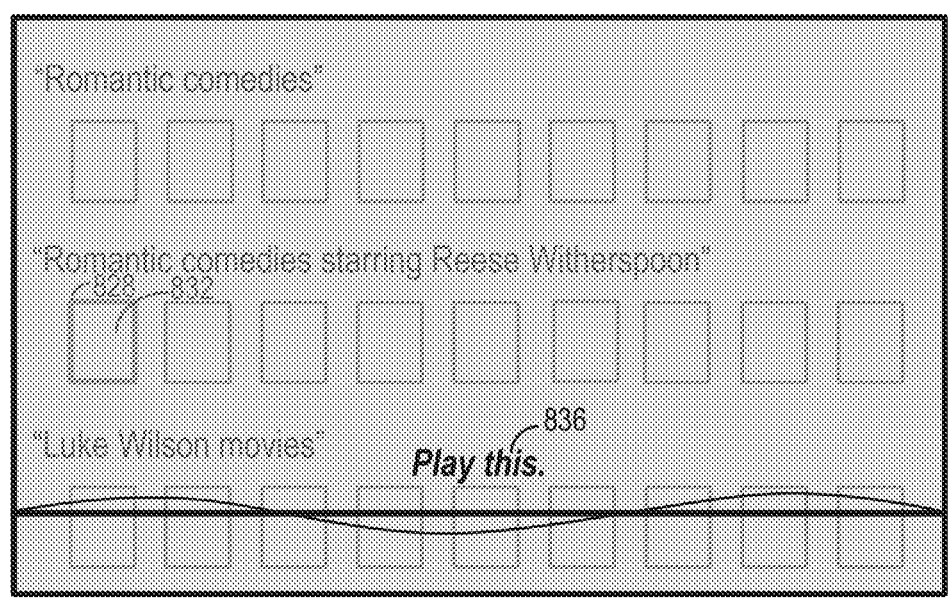

In yet other examples, a request to navigate through a user interface of the media device can include a request to select an object in the user interface. The selection of the object can cause an action associated with the object to be performed. For example, as shown in FIG. 8K, the position of cursor 828 is on second media item 832 titled "Legally Blonde." As depicted in FIG. 8L, the digital assistant can be invoked (e.g., at block 704) and the user utterance in the sampled audio data (e.g., at block 706) can be, "Play this" (e.g., displayed as text representation 836). Based on this user utterance, it can be determined (e.g., at block 710) that the user intent is a request to play a particular media item. In this example, the user utterance does not explicitly define or identify the particular media item to be played. In particular, the word "this" is ambiguous. However, the digital assistant can obtain contextual information to disambiguate the user intent. For example, it can be determined that the focus of third user interface 826 is on second media item 832 at the time the audio data is sampled. Based on this determination, second media item 832 can be identified as the media item to be played. In response to determining (e.g., at block 724) that the user intent of playing second media item 832 is a request to adjust a state or a setting of an application of the electronic device, an action in furtherance of playing second media item 832 can be performed. For example, preview information regarding second media item 832 can be displayed on the display unit. The preview information can include, for example, a brief summary of the plot, a list of the cast, the release data, user ratings, and the like. Additionally or alternatively, second media item 832 can be played on the media device and media content associated with second media item 832 can be displayed on the display unit (e.g., represented by text 838 "Legally Blonde Playing" in FIG. 8M. It should be recognized that in other examples, the media item to be selected can be explicitly identified. For example, rather than "Play this," the user utterance can specifically state "Play Legally Blonde," and a similar action in furtherance of playing second media item 832 can be performed.

In yet other examples, a request to navigate through a user interface of the media device can include a request to view a specific user interface or application of the media device. For instance, the user utterance in the sampled audio data can be, "Go to Actor page," where the user intent comprises a request to display the user interface associated with browsing for media items according to a particular actor. In another example, the user utterance in the sampled audio data can be, "Take me to the home page," where the user intent comprises a request to display the main menu user interface of the media device. In yet another example, a request to navigate through a user interface of the media device can include a request to launch the application on the electronic device. For instance, the user utterance in the sampled audio data can be "Go to the iTunes™ Store," where the user intent comprises a request to launch the iTunes™ Store application. It should be recognized that other requests to adjust a state or a setting of an application on the media device can be contemplated.

With reference back to block 724, it can be determined that the user intent does not comprise a request to adjust a state or a setting of an application on the electronic device. For example, the user intent can instead be a request to present information related to one or more media items. In response to such a determination, one or more of blocks 728-746 can be performed. At block 728 of process 700, a determination can be made as to whether the user intent is one of a plurality of predetermined request types. In some examples, the plurality of predetermined request types can be requests associated with a text-only response. More specifically, the plurality of predetermined request types can be requests for information which are predetermined to require a text-only response. This is in contrast to requests that are predetermined to require a response comprising media objects (e.g., images, animated objects, videos, etc.). In some examples, the plurality of predetermined request types can include requests for the current time at a particular location (e.g., "What's the time in Paris?"), requests to present a joke (e.g., "Tell me a good joke."), or requests for information regarding media content currently being played on the electronic device (e.g., "When was this movie released?"). In response to determining that the user intent is one of a plurality of predetermined request types, one or more of blocks 730-732 can be performed.

At block 730 of process 700, results that at least partially satisfy the user intent can be obtained. For example, the results can be obtained from external services (e.g., external services 120) by executing a task flow. At block 732 of process 700, the results obtained at block 730 can be displayed on the display unit in text form. Further, the results can be displayed in text form without displaying any corresponding graphics or media-related items corresponding to the results.

Figure 8M:
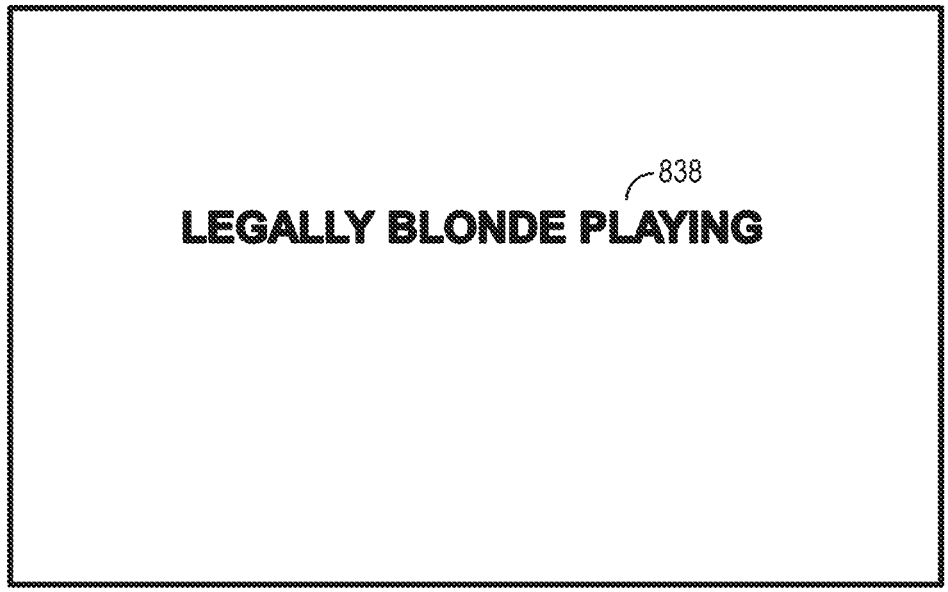
Figure 8N:
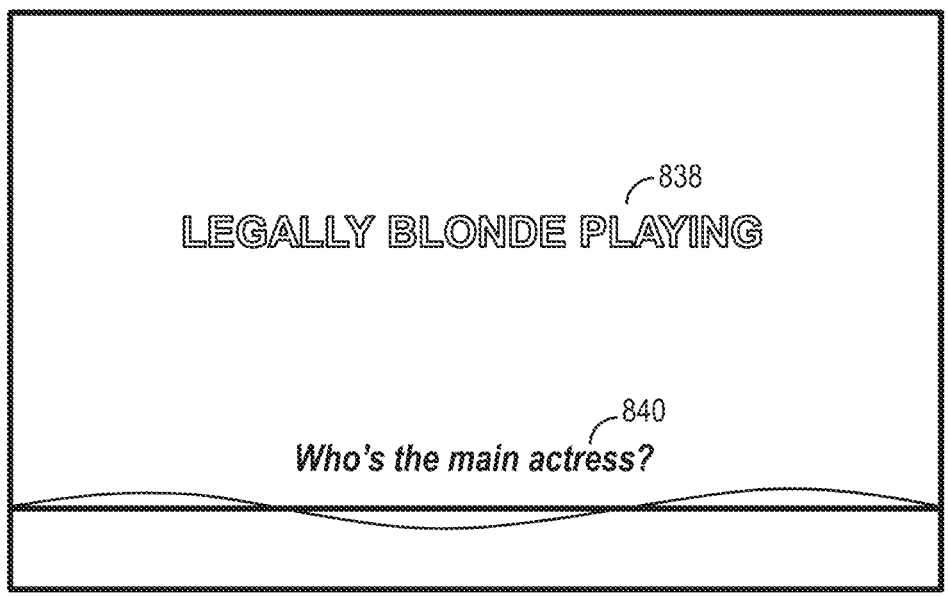
Figure 8P:
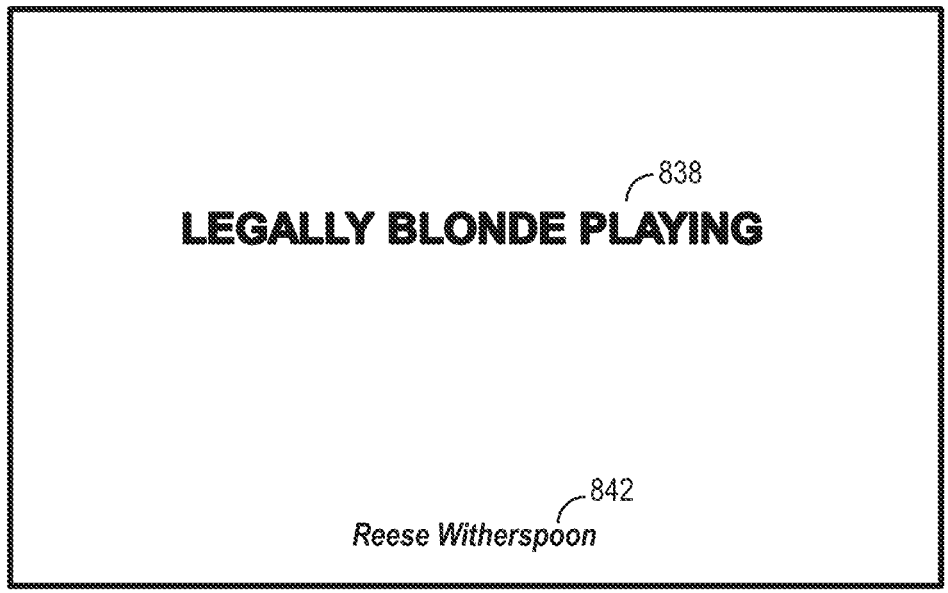

FIGS. 8M, 8N, and 8P depict an illustrative example of blocks 728-732. As shown in FIG. 8M, the movie "Legally Blonde" can be initially playing on the media device and displayed on the display unit. While playing "Legally Blonde," the digital assistant can be invoked (e.g., at block 704) and the user utterance in the sampled audio data can be "Who's the main actress?" For example, as shown in FIG. 8N, text representation 840 of the user utterance can be displayed on the display unit. Based on this user utterance, it can be determined (e.g., at block 710) that the user intent comprises a request to identify the main actress of a particular media item. Because the user utterance does not specify any particular media item, the user intent can be ambiguous. However, based on the movie "Legally Blonde" being displayed at the time the audio data was sampled, it can be determined that the media item associated with the user intent is "Legally Blonde." In this example, it can be determined (e.g., at block 728) that the user intent is one of a plurality of predetermined request types. In particular, it can be determined that a text-only response can be provided to satisfy the user intent of identifying the main actress in "Legally Blonde." In response to determining that the user intent is one of a plurality of predetermined request types, a search can be performed (e.g., at block 730) in a media-related database to obtain "Reese Witherspoon" as the main actress in the movie "Legally Blonde." As shown in FIG. 8P, text-only result 842 "Reese Witherspoon" can be displayed on the display unit to satisfy the user intent. Text-only result 842 can be overlaid on the displayed media content of "Legally Blonde." Further, the media content of "Legally Blonde" can continue to play while text-only result 842 is displayed. By displaying text-only result 842 (e.g., without displaying graphic results or additional user interfaces to satisfy the user intent), the user intent can be satisfied in an unobtrusive manner and user consumption of media content can be minimally disrupted. At the same time, the user is provided access to the services of the digital assistant. This can be desirable for improved user experience.

With reference back to block 728, it can be determined that the user intent is not one of a plurality of predetermined request type. In particular, the user intent can be a request type that is predetermined to require more than text results to satisfy. For example, the user intent can be a request to perform a media search query and display media items corresponding to the media search query. In other examples, the user intent can be a request for information other than media items. For example, the user intent can be a request for information associated with sports teams (e.g., "How did the L.A. Lakers do in their last game?"), athletes (e.g., "How tall is LeBron James?"), stocks (e.g., "Where did the Dow Jones™ close at yesterday?"), or the weather (e.g., "What's the weather forecast in Paris, France for the next week?"). In response to determining that the user intent is not one of a plurality of predetermined request type, one or more of blocks 734-746 can be performed.

At block 734 of process 700, second results that at least partially satisfy the user intent can be obtained. Block 734 can be similar or identical to block 534, described above. In one example, the user intent can include a request to perform a media search query. In this example, the media search query can be performed at block 734 to obtain second results. Specifically, the second results can comprise media items corresponding to the media search query.

In some examples, the user intent may not be a media search query. For example, the user intent can be a request to provide the weather forecast in Paris, France (e.g., "What's the weather forecast in Paris, France?"). In this example, second results obtained at block 734 can include the 7-day weather forecast in Paris, France. The second results can include non-media data that at least partially satisfies the user intent. In particular, the 7-day weather forecast in Paris, France can include text data (e.g., dates, temperatures, and brief description of the weather condition) and graphical images (e.g., sunny, cloudy, windy, or rainy images). Further, in some examples, the scope of the user intent can be expanded at block 710 to include a request for media items that at least partially satisfy the user intent. In these examples, the second results obtained at block 734 can further include one or more media items having media content that at least partially satisfies the user intent. For example, a media search query can be performed at block 734 for the weather forecast in Paris, France during the relevant time period and one or more media items related to the weather forecast in Paris, France can be obtained. The one or more media items can include, for example, video clips from the weather channel presenting the weather forecast in Paris, France. In these examples, the non-media data and/or the one or more media items can be displayed in a user interface on the displayed unit (e.g., at blocks 738, 742, or 746, described below).

At block 736 of process 700, a determination can be made as to whether the displayed content includes media content playing on the electronic device. In some examples, it can be determined that the displayed content does not comprise media content playing on the electronic device. For example, the displayed content can instead include a user interface, such as a main menu user interface or a third user interface (e.g., third user interface 826). The third user interface can occupy at least a majority of the display area of the display unit. Further, the third user interface can include previous results related to a previous user request that was received prior to detecting the user input at block 704. In accordance with the determination that the displayed content does not comprise media content, block 738 can be performed.

At block 738 of process 700, a portion of the second results can be displayed in the third user interface on the display unit. In examples where the displayed content already includes the third user interface at the time the user input at block 704 is received, display of the previous results related to the previous user request can be replaced with display of a portion of the second results in the third user interface. In examples where the displayed content does not include the third user interface at the time the user input at block 704 is received (e.g., displayed content includes main menu user interface), the third user interface can be displayed and the second results can be included in the displayed third user interface.

In some examples, a determination can be made as to whether the second results include results of a predetermined type. The predetermined type of results can be associated with a display area that is less than a majority of the display area of the display unit. The predetermined type of results can include, for example, results related to stocks or weather. It should be recognized that in other examples, the predetermined type of results can vary. In response to determining that the second results include results of a predetermined type, a portion of the second results can be displayed in a second user interface on the display unit. The second user interface can occupy less than a majority of the display area of the display unit. In these examples, the portion of the second results can be displayed in the second user interface even though it is determined at block 736 that the displayed content does not comprise media content.

Figure 8Q:
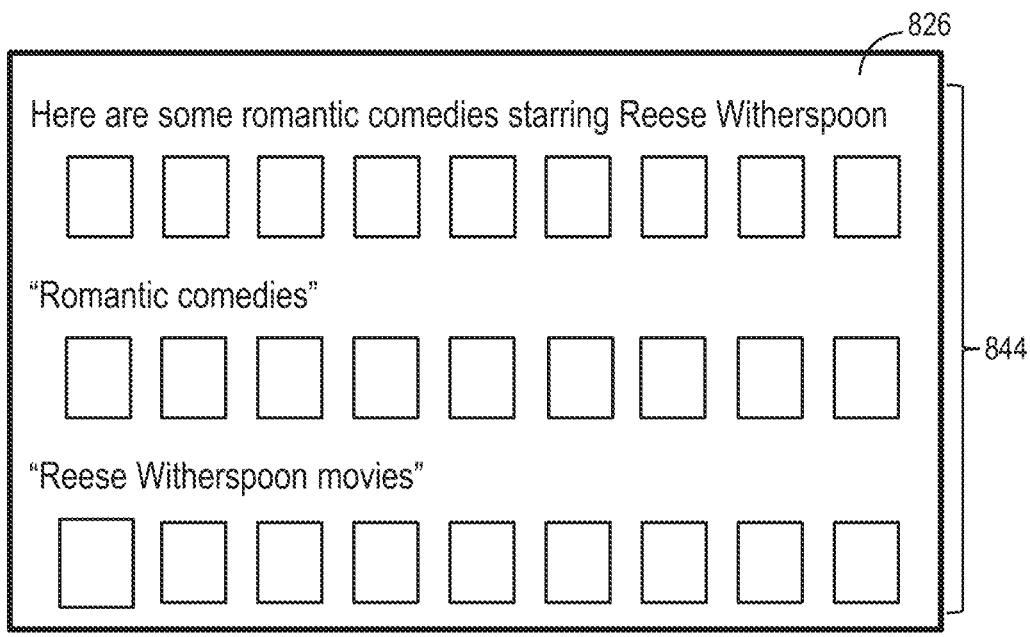
Figure 8R:
Figure 8S:
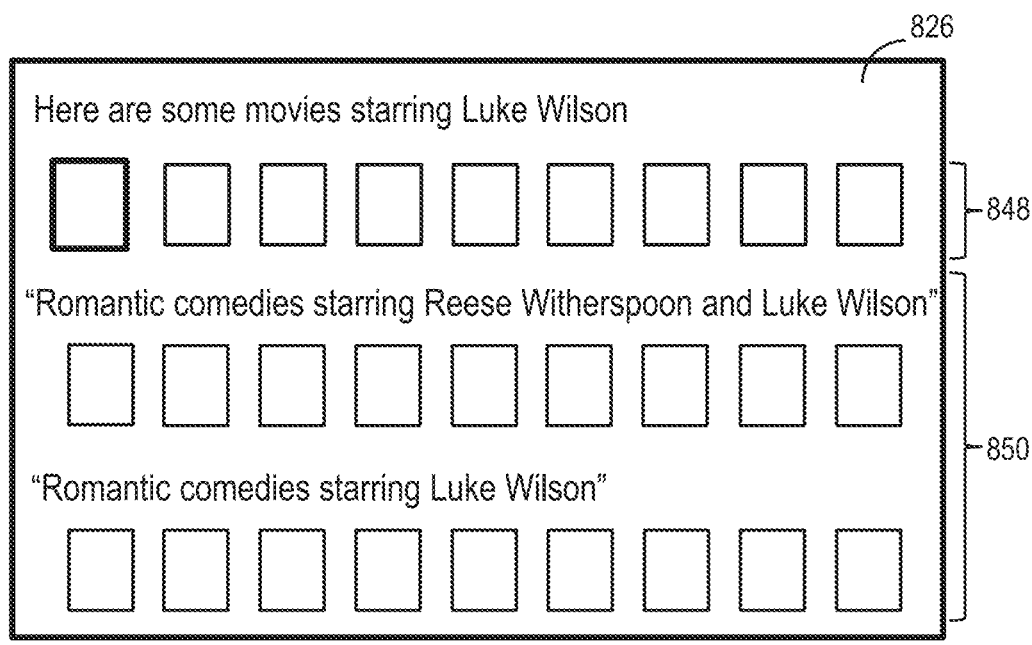

FIGS. 8Q-S depict an illustrative example of blocks 734-738. In this example, as shown in FIG. 8Q, the displayed content can initially include third user interface 826. Third user interface 826 can include previous results from a previous user request. In particular, third user interface 826 includes media items 844 from a previously requested media search query. As shown in FIG. 8R, the digital assistant can be invoked (e.g., at block 704) while third user interface 826 is displayed. The user utterance in the sampled audio data can include "Show me movies starring Luke Wilson." Text representation 846 of the user utterance can be displayed on the display unit. In this example, the user intent can be determined (e.g., at block 710) to be a request to perform a media search query for movies starring Luke Wilson. The media search query can be performed (e.g., at block 734) to obtain second results. In particular, the second results can include media items 848 that correspond to movies starring Luke Wilson. Further, additional results (e.g., media items 850) related to the user intent or to previous user intents can be obtained. These additional results can be obtained in a similar manner as the second results described in block 544.

In the present example of FIGS. 8Q-S, the displayed content includes only third user interface 826 and thus it can be determined (e.g., at block 736) that the displayed content does not comprise media content playing on the electronic device. In response to this determination, the second results can be displayed in third user interface 826. In particular, as shown in FIG. 8S, the display of media items 844 in third user interface 826 can be replaced by the display of media items 848 in third user interface 826. Further, media items 850 can be displayed in third user interface 826.

As illustrated in this example, second results can be presented in the third user interface only after determining that media content is not being displayed on the display unit. This allows for a broader range of results to be displayed in the larger area to increase the probability that the user's actual intent is satisfied. At the same time, the user's consumption of media content is not disrupted by ensuring that no media content is being displayed on the display unit prior to presenting the second results in the third user interface.

With reference back to block 736, the displayed content can include media content that is playing on the media device. In these examples, a determination can be made that the displayed content comprises media content playing on the media device. In accordance with this determination, one or more of blocks 740-746 can be performed.

At block 740 of process 700, a determination can be made as to whether the media content being played can be paused. Examples of media content that can be paused can include on-demand media items, such as on-demand movies and television shows. Examples of media content that cannot be paused can include media programs of broadcast or streaming services and live media programs (e.g., sports events, concerts, etc.). Thus, on-demand media items may not include broadcast or live programs. In accordance with a determination at block 740 that the media content being played cannot be paused, block 742 can be performed. At block 742 of process 700, a second user interface with a portion of the second results can be displayed on the display unit. Block 742 can be similar to block 536, described above. The second user interface can be displayed while the media content is displayed. The display area occupied by the second user interface on the display unit can be smaller than a display area occupied by the media content on the display unit. In accordance with a determination that the media content being played can be paused, one or more of blocks 744-746 can be performed. At block 744 of process 700, the media content being played can be paused on the media device. At block 746 of process 700, a third user interface with a portion of the second results can be displayed. The third user interface can be displayed while the media content is paused.

Figure 8T:
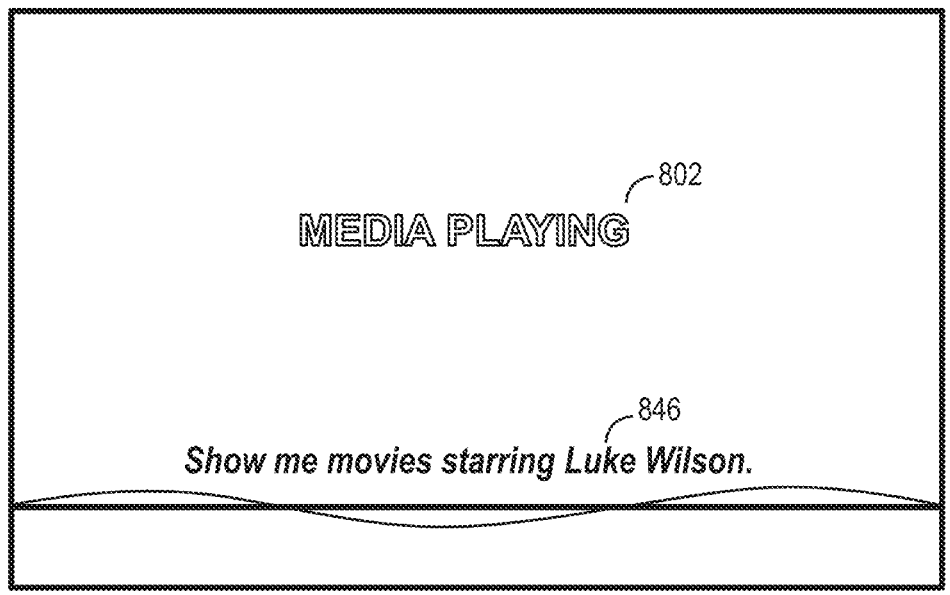
Figure 8U:
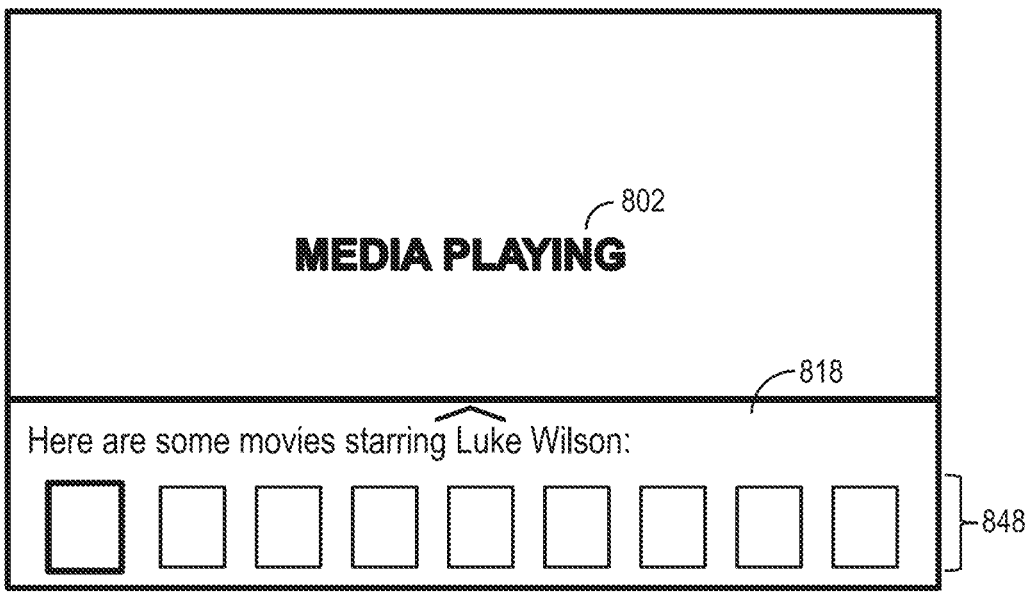

FIGS. 8T-W depict illustrative examples of blocks 740-746. As shown in FIG. 8T, media content 802 playing on the media device can be displayed on the display unit. While displaying media content 802, the digital assistant can be activated (e.g., at block 704). The user utterance in the sampled audio data can be "Show me movies starring Luke Wilson." Text representation 846 of the user utterance can be displayed on the display unit. As described above, the user intent can be determined (e.g., at block 710) to be a request to obtain media items of movies starring Luke Wilson. A corresponding media search query can be executed (e.g., at block 734) to obtain second results. The second results can include media items 848 of movies starring Luke Wilson. In examples where it is determined (e.g., at block 744) that media content 802 cannot be paused, media items 848 can be displayed in second user interface 818 while media content 802 continues to be displayed on the display unit (e.g., FIG. 8U). Displaying media items 848 in second user interface 818 can be desirable to enable media content 802 to be continually available for user consumption while media items 848 are displayed to satisfy the user intent. This prevents the user from missing any portion of media content 802, which cannot be paused or replayed. Alternatively, in examples where it is determined (e.g., at block 744) that media content 802 can be paused, the playing of media content 802 on the media device can be paused and media items 848 can be displayed in third user interface 826 on the display unit (e.g., FIG. 8S). Displaying third user interface 826 can be desirable to enable a broader range of media items associated with various alternative user intents (e.g., media items 850) to be displayed with the requested media items (e.g., media items 848), thereby increasing the likelihood that the user's actual intent is satisfied. At the same time, media content 802 is paused so that the user doesn't miss any portion of media content 802. By varying the user interface used to display media items 848 based on whether media content 802 can be paused, the user intent associated with the user utterance can be comprehensively fulfilled while reducing disruption to the user's consumption of media content 802. This can increase overall user experience.

Figure 8V:
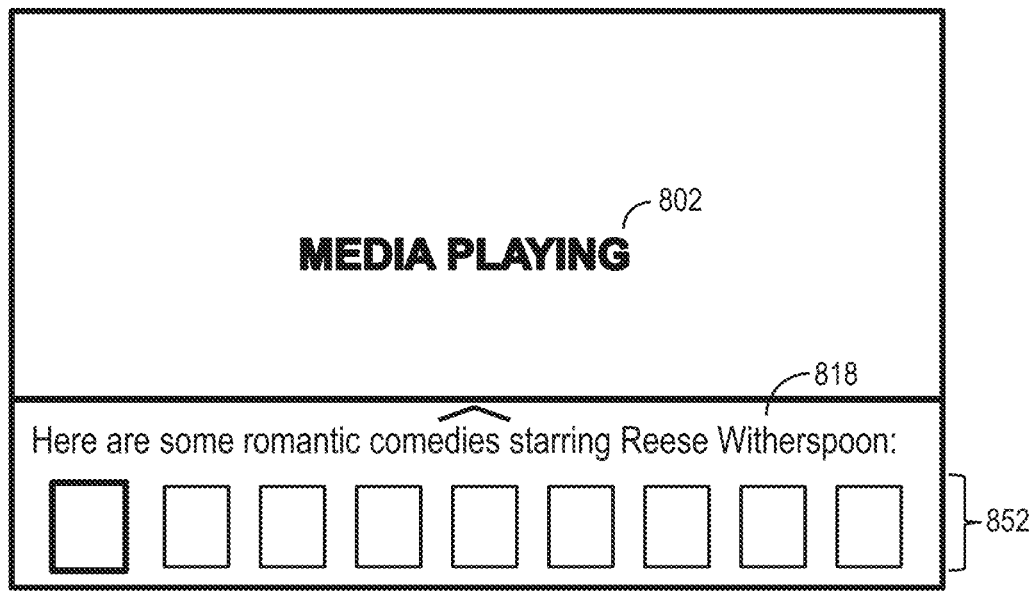
Figure 8W:

In some examples, as shown in FIG. 8V, the displayed content can include second user interface 818 in addition to media content 802 playing on the media device. In these examples, second user interface 818 can include media items 852 related to a previous user request (e.g., a request for romantic comedies starring Reese Witherspoon). While displaying media content 802 and second user interface 818, the digital assistant can be invoked (e.g., at block 704). As shown in FIG. 8W, the sampled audio data can include the user utterance "Show me movies starring Luke Wilson." Text representation 846 of the user utterance can be displayed on the display unit. Based on this user utterance, it can be determined (e.g., at block 710) that the user intent is a request to obtain media items of movies starring Luke Wilson. A corresponding media search query can be executed (e.g., at block 734) to obtain second results (e.g., media items 848). In these examples, the display of media items 852 in second user interface 818 can be replaced with the display of media items 848 (e.g., FIG. 8U).

Figure 9:
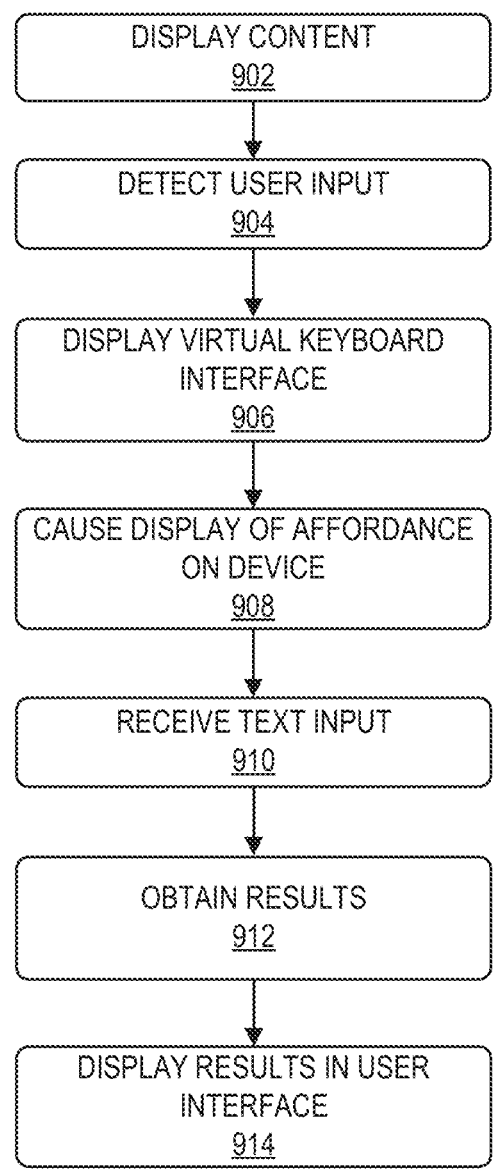
FIG. 9 illustrates a process for operating a digital assistant of a media system according to various examples.

FIG. 9 illustrates process 900 for interacting with a digital assistant of a media system according to various examples. Process 900 can be performed using one or more electronic devices implementing a digital assistant. For example, process 900 can be performed using one or more of system 100, media system 128, media device 104, user device 122, or digital assistant system 400, described above. It should be appreciated that some operations in process 900 can be combined, the order of some operations can be changed, and some operations can be omitted.

At block 902 of process 900, content can be displayed on a display unit. Block 902 can be similar or identical to block 502, described above. In some examples, the displayed content can include media content (e.g., movies, videos, television shows, video games, etc.). Additionally or alternatively, the displayed content can include a user interface. For example, the displayed content can include a first user interface with one or more exemplary natural language requests (e.g., as shown in FIGS. 6D-E). In other examples, displayed content can include a third user interface (e.g., third user interface 626) with results from a previous user request (e.g., previously requested media items). The third user interface can occupy at least a majority of a display area of the display unit.

At block 904 of process 900, while displaying the content of block 902, a user input can be detected. The user input can be similar or identical to the fifth user input described at block 558. In particular, the user input can be detected on a remote control of the media device. For example, the user input can include a predetermined motion pattern on a touch-sensitive surface of the remote control device. In some examples, user input can be detected via a second electronic device (e.g., device 122) that is different from the media device. The second electronic device can be configured to wirelessly control the media device. In response to detecting the user input, one or more of blocks 906-914 can be performed.

At block 906 of process 900, a virtual keyboard interface (e.g., virtual keyboard interface 646) can be displayed on the display unit. Block 906 can be similar or identical to block 562, described above. The virtual keyboard interface can be overlaid on at least a portion of the first user interface or the third user interface. Further, a search field (e.g., search field 644) can be displayed on the display unit. The virtual keyboard interface can be configured such that user input received via the virtual keyboard interface causes text entry in the search field.

At block 908 of process 900, a selectable affordance can be caused to be displayed on a second electronic device (e.g., on touchscreen 346 of device 122). The second electronic device can be a different device than the remote control of the media device. A selection of the affordance can enable text input to be received by the media device via a keyboard of the second electronic device. For example, selection of the affordance can cause a virtual keyboard interface (e.g., similar to virtual keyboard interface 646) to be displayed on the second electronic device. Input to the virtual keyboard interface of the second electronic device can cause corresponding text to be entered in the search field (e.g., search field 644).

At block 910 of process 900, text input can be received via a keyboard (e.g., a virtual keyboard interface) of the second electronic device. In particular, a user can input text via the keyboard of the second electronic device and the text input can be transmitted to and received by the media device. The text input can represent a user request. For example, the text input can be "Jurassic Park," which can represent a request to perform a search for media items associated with the search string "Jurassic Park."

At block 912 of process 900, results that at least partially satisfy the user request can be obtained. For example, a media search can be performed using the text input and corresponding media items can be obtained. In the specific example where the text input is "Jurassic Park," media items having the title "Jurassic Park," or having a common actor or director as the movie "Jurassic Park" can be obtained. In another example where the text input is "Reese Witherspoon," media items in which Reese Witherspoon is an actress can be obtained.

At block 914 of process 900, a user interface can be displayed on the display unit. The user interface can include at least a portion of the results. For example, the user interface can include media items obtained as a result of media searches performed at block 912.

Although certain blocks of processes 500, 700, and 900 are described above as being performed by a device or system (e.g., media device 104, user device 122, or digital assistant system 400), it should be recognized that in some examples, more than one device can be used to perform a block. For example, in blocks where a determination is made, a first device (e.g., media device 104) can obtain the determination from a second device (e.g., server system 108). Similarly, in blocks where content, objects, text, or user interfaces are displayed, a first device (e.g., media device 104) can cause the content, objects, text, or user interfaces to be displayed on a second device (e.g., display unit 126).

5. Electronic Devices

Figure 10:
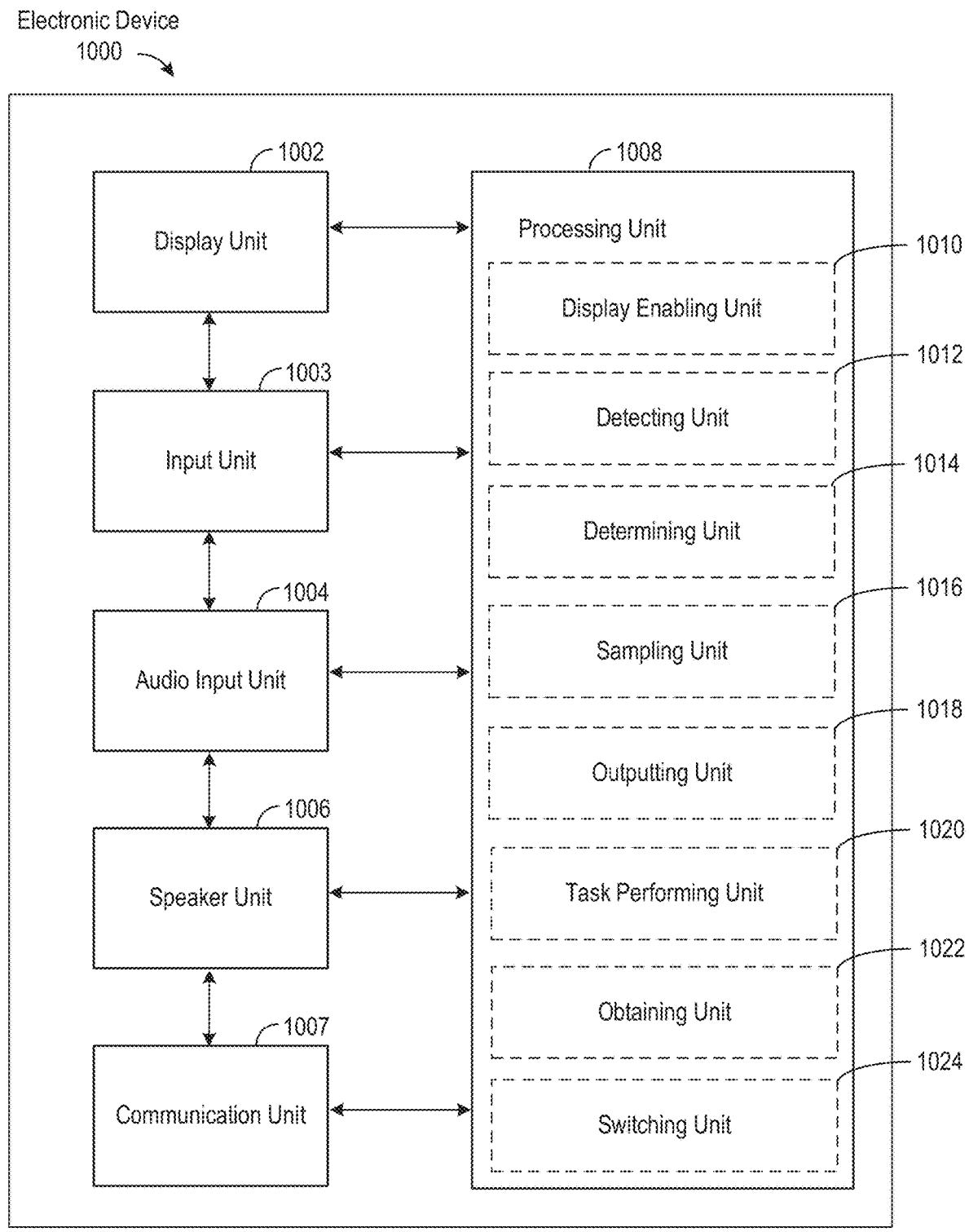
FIG. 10 illustrates a functional block diagram of an electronic device configured to operate a digital assistant of a media system according to various examples.

In accordance with some examples, FIG. 10 shows a functional block diagram of an electronic device 1000 configured in accordance with the principles of various described examples to, for example, provide voice control of media playback and real-time updating of virtual assistant knowledge. The functional blocks of the device can be implemented by hardware, software, or a combination of hardware and software to carry out the principles of the various described examples. It is understood by persons of skill in the art that the functional blocks described in FIG. 10 can be combined or separated into sub-blocks to implement the principles of the various described examples. Therefore, the description herein optionally supports any possible combination or separation or further definition of the functional blocks described herein.

As shown in FIG. 10, electronic device 1000 can include input unit 1003 configured to receive user input, such as tactile input, gesture input, (e.g., remote control 124, or the like), audio input unit 1004 configured to receive audio data (e.g., microphone 272, or the like), speaker unit 106 configured to output audio (e.g., speakers 268, or the like), and communication unit 1007 (e.g., communication subsystem 224, or the like) configured to send and receive information from external devices via a network. In some examples, electronic device 1000 can optionally include a display unit 1002 configured to display media, interfaces, and other content (e.g., display unit 126, or the like). Electronic device 1000 can further include processing unit 1008 coupled to input unit 1003, audio input unit 1004, speaker unit 1006, communication unit 1007, and optionally display unit 1002. In some examples, processing unit 1008 can include display enabling unit 1010, detecting unit 1012, determining unit 1014, sampling unit 1016, outputting unit 1018, performing unit 1020, obtaining unit 1022, and switching unit 1024.

In accordance with some embodiments, processing unit 1008 is configured to display (e.g., with display enabling unit 1010) content on a display unit (e.g., display unit 1002 or a separate display unit). Processing unit 1008 is further configured to detect (e.g., with detecting unit 1012) a user input. Processing unit 1008 is further configured to determine (e.g., with determining unit 1014) whether the user input corresponds to a first input type. Processing unit 1008 is further configured to, in accordance with a determination that the user input corresponds to a first input type, displayed (e.g., display enabling unit 1010) on the display unit, a plurality of exemplary natural language requests. The plurality of exemplary natural language requests are contextually-related to the displayed content, where receiving a user utterance corresponding to one of the plurality of exemplary natural language requests causes the digital assistant to perform a respective action.

In some examples, the user input is detected on a remote control of the electronic device. In some examples, first input type comprises pressing a button of the remote control and releasing the button within a predetermined duration. In some examples, the plurality of exemplary natural language requests are displayed on the display unit via a first user interface, and the first user interface is overlaid on the displayed content. In some examples, the displayed content comprises media content, and the media content continues to play while displaying the plurality of exemplary natural language requests.

In some examples, processing unit 1008 is further configured to, in accordance with a determination that the user input corresponds to a first input type, display (e.g., with display enabling unit 1010) on the display unit a visual indicator indicating that the digital assistant is not processing audio input.

In some examples, upon determining that the user input corresponds to a first input type, the plurality of exemplary natural language requests are displayed on the display unit after a predetermined amount of time. In some examples, each of the plurality of exemplary natural language requests is displayed separately in a predetermined sequence and at different times.

In some examples, processing unit 1008 is further configured to display (e.g., with display enabling unit 1010) a plurality of lists of exemplary natural language requests, where each list is displayed at a different time and on a rotating basis.

In some examples, processing unit 1008 is further configured to, in accordance with a determination that the user input does not correspond to a first input type, determine (e.g., with determining unit 1014) whether the user input corresponds to a second input type. Processing unit 1008 is further configured to, in accordance with a determination that the user input corresponds to a second input type, sample (e.g., with sampling unit 1016 and audio input unit 1004) audio data. Processing unit 1008 is further configured to determined (e.g., with determining unit 1014) whether the audio data contains a user request. Processing unit 1008 is further configured to, in accordance with a determination that the audio data contains a user request, perform (e.g., with performing unit 1020) a task that at least partially satisfies the user request.

In some examples, the second input type comprises pressing a button of a remote control of the electronic device and holding down the button for greater than a predetermined duration.

In some examples, processing unit 1008 is further configured to, in accordance with a determination that the audio data does not contain a user request, display (e.g., with display enabling unit 1010) on the display unit, a request for clarification of user intent.

In some examples, the displayed content comprises media content, and the media content continues to play on the electronic device while sampling the audio data and while performing the task.

In some examples, processing unit 1008 is further configured to output (e.g., with outputting unit 1018) audio (e.g., using speaker unit 1006) associated with the media content. Processing unit 1008 is further configured to, in accordance with a determination that the user input corresponds to a second input type, reduce (e.g., with outputting unit 1018) an amplitude of the audio.

In some examples, the task is performed without outputting speech related to the task from the electronic device. In some examples, the audio data is sampled while detecting the user input. In some examples, the audio data is sampled for a predetermined duration after detecting the user input.

In some examples, the audio data is sampled via a first microphone (e.g., audio input unit 1004) on a remote control of the electronic device. Processing unit 1008 is further configured to, while sampling the audio data, sample (e.g., with sampling unit 1016 and audio input unit 1004) background audio data via a second microphone (e.g., a second audio input unit of electronic device 1000) on the remote control. Processing unit 1008 is further configured to remove (e.g., with outputting unit 1018) background noise in the audio data using the background audio data.

In some examples, audio associated with the displayed content is outputted via an audio signal from the electronic device. Processing unit 1008 is further configured to remove (e.g., with outputting unit 1018) background noise in the audio data using the audio signal.

In some examples, processing unit 1008 is further configured to, in response to detecting the user input, display (e.g., with display enabling unit 1010) a visual cue on the display unit that prompts a user to provide a spoken request.

In some examples, processing unit 1008 is further configured to obtain (e.g., with obtaining unit 1022) results that at least partially satisfy the user request. Processing unit 1008 is further configured to display (e.g., with display enabling unit 1010) a second user interface on the display unit. The second user interface includes a portion of the results, where at least a portion of the content continues to be displayed while the second user interface is displayed, and where a display area of the second user interface on the display unit is smaller than a display area of the at least a portion of the content on the display unit. In some examples, the second user interface is overlaid on the displayed content.

In some examples, the portion of the results includes one or more media items. Processing unit 1008 is further configured to receive (e.g., with detecting unit 1012) a selection of a media item of the one or more media items via the second user interface. Processing unit 1008 is further configured to display (e.g., with display enabling unit 1010) media content associated with the selected media item on the display unit.

In some examples, processing unit 1008 is further configured to, while displaying the second user interface, detect (e.g., with detecting unit 1012) a second user input. Processing unit 1008 is further configured to, in response to detecting the second user input, cease (e.g., with display enabling unit 1010) to display the second user interface.

In some examples, the second user input is detected on a remote control of the electronic device. The second user input comprises a first predetermined motion pattern on a touch-sensitive surface of the remote control.

In some examples, processing unit 1008 is further configured to, while displaying the second user interface, detect (e.g, with detecting unit 1012) a third user input. Processing unit 1008 is further configured to, in response to detecting the third user input, replace (e.g., with display enabling unit 1010) display of the second user interface with display of a third user interface on the display unit. The third user interface includes at least the portion of the results and the third user interface occupies at least a majority of a display area of the display unit.

In some examples, the third user input is detected on a remote control of the electronic device, and the third user input comprises a second predetermined motion pattern on a touch-sensitive surface of the remote control.

In some examples, processing unit 1008 is further configured to, in response to detecting the third user input, obtain (e.g., with obtaining unit 1022) second results that are different from the results. The second results at least partially satisfy the user request and the third user interface includes at least a portion of the second results.

In some examples, the second results are based on a user request received prior to detecting the user input. In some examples, a focus of the second user interface is on an item of the portion of results while the third user input is detected, and the second results are contextually-related to the item.

In some examples, the displayed content comprises media content. Processing unit 1008 is further configured to, pause (e.g., with performing unit 1020) the playing of media content on the electronic device in response to detecting the third user input.

In some examples, the at least the portion of the results includes one or more media items. Processing unit 1008 is further configured to receive (e.g., with detecting unit 1012) a selection of a media item of the one or more media items via the third user interface. Processing unit 1008 is further configured to display (e.g., with display enabling unit 1010) media content associated with the media item on the display unit.

In some examples, processing unit 1008 is further configured to, while displaying the third user interface, detect (e.g., with detecting unit 1012) a fourth user input associated with a direction on the display unit. Processing unit 1008 is further configured to, in response to detecting the fourth user input switch (e.g., with switching unit 1024) a focus of the third user interface from a first item to a second item on the third user interface. The second item is positioned in the direction relative to the first item.

In some examples, processing unit 1008 is further configured to, while displaying the third user interface, detect (e.g., with detecting unit 1012) a fifth user input. Processing unit 1008 is further configured to, in response to detecting the fifth user input, display (e.g., with display enabling unit 1010) a search field. Processing unit 1008 is further configured to display (e.g., with display enabling unit 1010) a virtual keyboard interface on the display unit, where input received via the virtual keyboard interface causes text entry in the search field.

In some examples, processing unit 1008 is further configured to, while displaying the third user interface, detect (e.g., with detecting unit 1012) a sixth user input. Processing unit 1008 is further configured to, in response to detecting the sixth user input, sample (e.g., with sampling unit 1016 and audio input unit 1004) second audio data. The second audio data contains a second user request. Processing unit 1008 is further configured to determine (e.g., with determining unit 1014) whether the second user request is a request to refine the results of the user request. Processing unit 1008 is further configured to, in accordance with a determination that the second user request is a request to refine the results of the user request, display (e.g., with display enabling unit 1010) a subset of the results via the third user interface.

In some examples, the subset of the results is displayed at a top row of the third user interface. Processing unit 1008 is further configured to, in accordance with a determination that the second user request is not a request to refine the results of the user request, obtain (e.g., with obtaining unit 1022) third results that at least partially satisfy the second user request. Processing unit 1008 is further configured to display (e.g., with display enabling unit 101) a portion of the third results via the third user interface. In some examples, the portion of the third results is displayed at a top row of the third user interface.

In some examples, processing unit 1008 is further configured to obtain (e.g., with obtaining unit 1022) fourth results that at least partially satisfy the user request or the second user request. Processing unit 1008 is further configured to display (e.g., with display enabling unit 1010) a portion of the fourth results via the third user interface.

In some examples, the portion of the fourth results is displayed at rows subsequent to the top row of the third user interface.

In some examples, a focus of the third user interface is on one or more items of the third user interface while the sixth user input is detected, and the fourth results are contextually-related to the one or more items.

In some examples, processing unit 1008 is further configured to, while displaying the third user interface, detect (e.g., with detecting unit 1012) a seventh user input. Processing unit 1008 is further configured to, in response to detecting the seventh user input, cease (e.g., with display enabling unit 1010) to display the third user interface.

In some examples, the displayed content is media content and the playing of the media content on the electronic device is paused in response to detecting the third user input. Processing unit 1008 is further configured to resume (e.g., with performing unit 1020) the playing of media content on the electronic device in response to detecting the seventh user input. In some examples, the seventh user input comprises pressing a menu button of a remote control of the electronic device.

In accordance with some embodiments, processing unit 1008 is further configured to display (e.g., with display enabling unit 1010) content on a display unit. Processing unit 1008 is further configured to, while displaying the content, detect (e.g., with detecting unit 1012) a user input. Processing unit 1008 is further configured to, in response to detecting the user input, display (e.g., with display enabling unit 1010) a user interface on the display unit. The user interface includes a plurality of exemplary natural language requests that are contextually-related to the displayed content, where receiving a user utterance corresponding to one of the plurality of exemplary natural language requests causes the digital assistant to perform a respective action.

In some examples, the displayed content comprises media content. In some examples, the plurality of exemplary natural language requests includes natural language requests to modify one or more settings associated with the media content. In some examples, the media content continues to play while the user interface is displayed.

In some examples, processing unit 1008 is further configured to, output (e.g., with outputting unit 1018) audio associated with the media content. An amplitude of the audio is not reduced in response to detecting the user input. In some examples, the displayed content comprises a main menu user interface.

In some examples, the plurality of exemplary natural language requests includes exemplary natural language requests related to each of a plurality of core competencies of the digital assistant. In some examples, the displayed content comprises a second user interface with results associated with a previous user request. In some examples, the plurality of exemplary natural language requests includes natural language requests to refine the results. In some examples, the user interface includes textual instructions for invoking and interacting with the digital assistant. In some examples, the user interface includes a visual indicator indicating that the digital assistant is not receiving audio input. In some examples, the user interface is overlaid on the displayed content.

In some examples, processing unit 1008 is further configured to, in response to detecting the user input, reduce (e.g., with display enabling unit 1010) a brightness of the displayed content to highlight the user interface.

In some examples, the user input is detected on a remote control of the electronic device. In some examples, the user input comprises pressing a button of the remote control device and releasing the button within a predetermined duration after pressing the button. In some examples, the button is configured to invoke the digital assistant. In some examples, the user interface includes textual instructions for displaying a virtual keyboard interface.

In some examples, processing unit 1008 is further configured to, after displaying the user interface, detect (e.g., with detecting unit 1012) a second user input. Processing unit 1008 is further configured to, in response to detecting the second user input, display (e.g., with displaying unit 1002) a virtual keyboard interface on the display unit.

In some examples, processing unit 1008 is further configured to change (e.g., with display enabling unit 1010) a focus of the user interface to a search field on the user interface. In some examples, the search field is configured to receive text search queries via the virtual keyboard interface. In some examples, the virtual keyboard interface cannot be used to interact with the digital assistant. In some example, the second user input comprises a predetermined motion pattern on a touch-sensitive surface of a remote control device of the electronic device.

In some example, the plurality of exemplary natural language requests are display at a predetermined amount of time after detecting the user input. In some examples, processing unit 1008 is further configured to display (e.g., with display enabling unit 1010) each of the plurality of exemplary natural language requests one at a time in a predetermined sequence. In some examples, processing unit 1008 is further configured to replace (e.g., with display enabling unit 1010) display of a previously displayed exemplary natural language request of the plurality of exemplary natural language requests with a subsequent exemplary natural language request of the plurality of exemplary natural language requests.

In some examples, the content comprises a second user interface with one or more items. A focus of the second user interface is on an item of the one or more items when the user input is detected. The plurality of exemplary natural language requests are contextually-related to the item of the one or more items.

In accordance with some embodiments, processing unit 1008 is further configured to display (e.g., with display enabling unit 1010) content on a display unit. Processing unit 1008 is further configured to detect (e.g., with detecting unit 1012) a user input. Processing unit 1008 is further configured to, in response to detecting the user input, display (e.g., with display enabling unit 1010) one or more suggested examples of natural language utterances. The one or more suggested examples being contextually-related to the displayed content and when uttered by the user cause the digital assistant to perform a corresponding action.

In some examples, processing unit 1008 is further configured to detect (e.g., with detecting unit 1012) a second user input. Processing unit 1008 is further configured to, in response to detecting the second user input, sample (e.g., with sampling unit 1016) audio data. Processing unit 1008 is further configured to determine (e.g., with determining unit 1014) whether the sampled audio data contains one of the one or more suggested examples of natural language utterances. Processing unit 1008 is further configured to, in accordance with a determination that the sampled audio data contains one of the one or more suggested examples of natural language utterances, perform (e.g., with performing unit 1020) the corresponding action to the utterance.

In accordance with some embodiments, processing unit 1008 is further configured to display (e.g., with display enabling unit 1010) content on a display unit. Processing unit 1008 is further configured to, while displaying the content, detect (e.g., with detecting unit 1012) a user input. Processing unit 1008 is further configured to, in response to detecting the user input, sample (e.g., with sampling unit 1016) audio data. The audio data includes a user utterance representing a media search request. Processing unit 1008 is further configured to obtain (e.g., with obtaining unit 1022) a plurality of media items that satisfies the media search request. Processing unit 1008 is further configured to display (e.g., with display enabling unit 1010) on the display unit, at least a portion of the plurality of media items via a user interface.

In some examples, the content continues to be displayed on the display unit while the at least a portion of the plurality of media items is displayed. A display area occupied by the user interface is smaller than a display area occupied by the content.

In some examples, processing unit 1008 is further configured to determine (e.g., with determining unit 1014) whether a number of media items in the plurality of media items is less than or equal to a predetermined number. In accordance with a determination that a number of media items in the plurality of media items is less than or equal to a predetermined number, the at least a portion of the plurality of media items includes the plurality of media items.

In some examples, in accordance with a determination that a number of media items in the plurality of media items is greater than a predetermined number, a number of media items in the at least a portion of the plurality of media items equals to the predetermined number.

In some examples, each of the plurality of media items is associated with a relevancy score with respect to the media search request and the relevancy scores of the at least a portion of the plurality of media items are the highest among the plurality of media items.

In some examples, each of the at least a portion of the plurality of media items is associated with a popularity rating and the at least a portion of the plurality of media items are arranged in the user interface based on the popularity rating.

In some examples, processing unit 1008 is further configured to, while displaying the at least a portion of the plurality of media items, detect (e.g., with detecting unit 1012) a second user input. Processing unit 1008 is further configured to, in response to detecting the second user input, expand (e.g., with display enabling unit 1010) the user interface to occupy at least a majority of a display area of the display unit.

In some examples, processing unit 1008 is further configured to, in response to detecting the second user input, determine (e.g., with determining unit 1014) whether a number of media items in the plurality of media items is less than or equal to a predetermined number. Processing unit 1008 is further configured to, in accordance with a determination that a number of media items in the plurality of media items is less than or equal to a predetermined number, obtaining a second plurality of media items that at least partially satisfy the media search request, the second plurality of media items being different from the at least a portion of the media items. Processing unit 1008 is further configured to display (e.g., with display enabling unit 101), via the expanded user interface, the second plurality of media items on the display unit.

In some examples, processing unit 1008 is further configured to determine (e.g., with determining unit 1014) whether the media search request includes more than one search parameter. In accordance a the determination that the media search request includes more than one search parameter, the second plurality of media items are organized in the expanded user interface according to the more than one search parameters of the media search request.

In some examples, processing unit 1008 is further configured to, in accordance with a determination that a number of media items in the plurality of media items is greater than the predetermined number, display (e.g., with display enabling unit 1010) at least a second portion of the plurality of media items via the expanded user interface. The at least a second portion of the plurality of media items is different from the at least a portion of the plurality of media items.

In some examples, the at least a second portion of the plurality of media items includes two or more media types and the at least a second portion of the plurality of media items is organized in the expanded user interface according to each media type of the two or more media types.

In some examples, processing unit 1008 is further configured to detect (e.g., with detecting unit 1012) a third user input. Processing unit 1008 is further configured to, in response to detecting the third user input, cause (e.g., with display enabling unit 1010) the expanded user interface to scroll. Processing unit 1008 is further configured to determine (e.g., with determining unit 1014) whether the expanded user interface has scrolled beyond a predetermined position on the expanded user interface. Processing unit 1008 is further configured to, in response to determining that the expanded user interface has scrolled beyond a predetermined position on the expanded user interface, display (e.g., with display enabling unit 1010) at least a third portion of the plurality of media items on the expanded user interface. The at least a third portion of the plurality of media items are organized on the expanded user interface according to one or more media content providers associated with the third plurality of media items.

The operations described above with reference to FIGS. 5A-I are, optionally, implemented by components depicted in FIGS. 1-3 and 4A-B. For example, displaying operations 502, 508-514, 520, 524, 530, 536, 546, 556, 560, 562, 576, 582, 588, 592, detecting operations 504, 538, 542, 550, 558, 566, 570, determining operations 506, 516, 522, 526, 528, 574, 578, sampling operations 518, 572, performing operations 532, 584, obtaining operations 534, 544, 580, 586, 590, ceasing operations 540, 568, receiving unit 554, and switching operations 552, 564 may be implemented by one or more of operating system 252, GUI module 256, applications module 262, digital assistant module 426, and processor(s) 204, 404. It would be clear to a person having ordinary skill in the art how other processes can be implemented based on the components depicted in FIGS. 1-3 and 4A-B.

Figure 11:
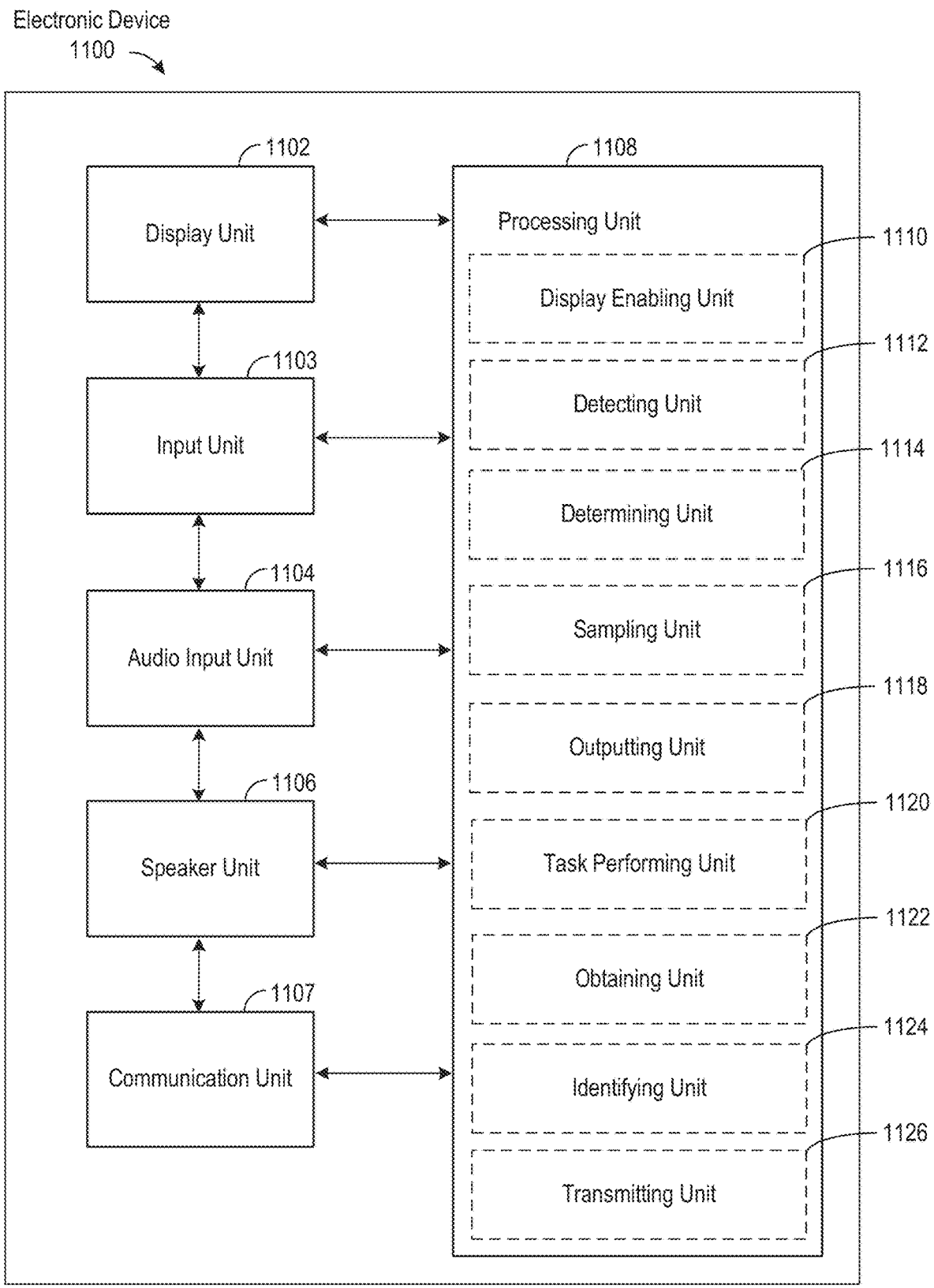
FIG. 11 illustrates a functional block diagram of an electronic device configured to operate a digital assistant of a media system according to various examples.

In accordance with some examples, FIG. 11 shows a functional block diagram of an electronic device 1100 configured in accordance with the principles of various described examples to, for example, provide voice control of media playback and real-time updating of virtual assistant knowledge. The functional blocks of the device can be implemented by hardware, software, or a combination of hardware and software to carry out the principles of the various described examples. It is understood by persons of skill in the art that the functional blocks described in FIG. 11 can be combined or separated into sub-blocks to implement the principles of the various described examples. Therefore, the description herein optionally supports any possible combination or separation or further definition of the functional blocks described herein.

As shown in FIG. 11, electronic device 1100 can include input unit 1103 configured to receive user input, such as tactile input, gesture input, (e.g., remote control 124, or the like), audio input unit 1104 configured to receive audio data (e.g., microphone 272, or the like), speaker unit 116 configured to output audio (e.g., speakers 268, or the like), and communication unit 1107 (e.g., communication subsystem 224, or the like) configured to send and receive information from external devices via a network. In some examples, electronic device 1100 can optionally include a display unit 1102 configured to display media, interfaces, and other content (e.g., display unit 126, or the like). Electronic device 1100 can further include processing unit 1108 coupled to input unit 1103, audio input unit 1104, speaker unit 1106, communication unit 1107, and optionally display unit 1102. In some examples, processing unit 1108 can include display enabling unit 1110, detecting unit 1112, determining unit 1114, sampling unit 1116, outputting unit 1118, performing unit 1120, obtaining unit 1122, identifying unit 1124, and transmitting unit 1126.

In accordance with some embodiments, processing unit 1108 is configured to display (e.g., with display enabling unit 1110) content on a display unit (e.g., display unit 1102 or a separate display unit). Processing unit 1108 is further configured to detect (e.g., with detecting unit 1112) a user input while displaying the content. Processing unit 1108 is further configured to, in response to detecting the user input, sample (e.g., with sampling unit 1016 and audio input unit 1104) audio data. The audio data includes a user utterance. Processing unit 1108 is further configured to obtain (e.g., with obtaining unit 1122) a determination of a user intent corresponding to the user utterance. Processing unit 1108 is further configured to obtain (e.g., with obtaining unit 1122) a determination of whether the user intent comprises a request to adjust a state or a setting of an application on the electronic device. Processing unit 1108 is further configured to, in response to obtaining a determination that the user intent comprises a request to adjust a state or a setting of an application on the electronic device, adjust (e.g., with task performing unit 1120) the state or the setting of the application to satisfy the user intent.

In some examples, the request to adjust a state or a setting of an application on the electronic device comprises a request to play a particular media item. Adjusting the state or the setting of the application to satisfy the user intent comprises playing the particular media item.

In some examples, the displayed content includes a user interface with a media item and the user utterance does not explicitly define the particular media item to be played. Processing unit 1108 is further configured to determine (e.g., with determining unit 1114) whether a focus of the user interface is on the media item. Processing unit 1108 is further configured to, in accordance with a determination that a focus of the user interface is on the media item, identify (e.g., with identifying unit 1124) the media item as the particular media item to be played.

In some examples, the request to adjust a state or a setting of an application on the electronic device includes a request to launch the application on the electronic device. In some examples, the displayed content comprises media content playing on the electronic device and the state or the setting relates to the media content being played on the electronic device. In some examples, the request to adjust a state or a setting of an application on the electronic device includes a request to fast-forward or rewind the media content playing on the electronic device. In some examples, the request to adjust a state or a setting of an application on the electronic device includes a request to jump forward or backward in the media content to play a particular portion of the media content. In some examples, the request to adjust a state or a setting of an application on the electronic device includes a request to pause the playing of the media content on the electronic device. In some examples, the request to adjust a state or a setting of an application on the electronic device includes a request to turn-on or turn-off subtitles of the media content.

In some examples, the displayed content includes a user interface with a first media item and a second media item.

In some examples, the request to adjust a state or a setting of an application on the electronic device includes a request to switch a focus of the user interface from the first media item to the second media item. Adjusting the state or the setting of the application to satisfy the user intent comprises switching a focus of the user interface from the first media item to the second media item.

In some examples, the displayed content includes media content playing on the media device. The user utterance is a natural language expression indicating that a user did not hear a portion of audio associated with the media content. The request to adjust a state or a setting of an application on the electronic device comprises a request to re-play a portion of the media content corresponding to the portion of the audio that the user did not hear. Processing unit 1108 is further configured to rewind (e.g., with task performing unit 1120) the media content by a predetermined amount to a previous portion of the media content and restart (e.g., with task performing unit 1120) the playing of the media content from the previous portion.

In some examples, processing unit 1108 is further configured to turn on (e.g., with task performing unit 1120) closed captioning prior to restarting play of the media content from the previous portion.

In some examples, the request to adjust a state or a setting of an application on the electronic device further comprises a request to increase a volume of the audio associated with the media content. Adjusting the state or the setting of the application further comprises increasing the volume of the audio associated with the media content prior to restarting play of the media content from the previous portion.

In some examples, speech in the audio associated with the media content is converted to text. Adjusting the state or the setting of the application further comprises displaying a portion of the text while restarting play of the media content from the previous portion.

In some examples, processing unit 1108 is further configured to obtain (e.g., with obtaining unit 1122) a determination of a user sentiment associated with the user utterances. The user intent is determined based on the determined user sentiment.

In some examples, processing unit 1108 is further configured to, in response to obtaining a determination that the user intent does not comprise a request to adjust a state or a setting of an application on the electronic device, obtain (e.g., with obtaining unit 1122) a determination of whether the user intent is one of a plurality of predetermined request types. Processing unit 1108 is further configured to, in response to obtaining a determination that the user intent is one of a plurality of predetermined request types, obtain (e.g., with obtaining unit 1122) results that at least partially satisfy the user intent and display (e.g., with display enabling unit 1110) on the display unit, the results in text form.

In some examples, the plurality of predetermined request types include requests for a current time at a particular location. In some examples, the plurality of predetermined request types include a request to present a joke. In some examples, the plurality of predetermined request types include a request for information regarding media content being played on the electronic device. In some examples, the results in text form are overlaid on the displayed content. In some examples, the displayed content comprises media content playing on the electronic device and the media content continues to play while the results in text form are displayed.

In some examples, processing unit 1108 is further configured to, in response to obtaining a determination that the user intent is not one of a plurality of predetermined request types, obtain (e.g., with obtaining unit 1122) second results that at least partially satisfy the user intent and determine (e.g., with determining unit 1114) whether the displayed content comprises media content playing on the electronic device. Processing unit 1108 is further configured to, in accordance with a determination that the displayed content comprises media content, determine (e.g., determining unit 1114) whether the media content can be paused. Processing unit 1108 is further configured to, in accordance with a determination that the media content cannot be paused, display (e.g., display enabling unit 1110) on the display unit a second user interface with a portion of the second results. A display area occupied by the second user interface on the display unit is smaller than a display area occupied by the media content on the display unit.

In some examples, the user intent comprises a request for a weather forecast of a particular location. the user intent comprises a request for information associated with a sports team or an athlete. In some examples, the user intent is not a media search query, and wherein the second results include one or more media items having media content that at least partially satisfies the user intent. In some examples, the second results further include non-media data that at least partially satisfies the user intent. In some examples, the user intent is a media search query and the second results comprise a plurality of media items corresponding to the media search query.

In some examples, processing unit 1108 is further configured to, in accordance with a determination that the displayed content does not comprise media content playing on the electronic device, display (e.g., with display enabling unit 1110) on the display unit a third user interface with a portion of the second results, wherein the third user interface occupies a majority of the display area of the display unit.

In some example, the display content comprises a main menu user interface.

In some examples, the displayed content comprises the third user interface with previous results related to a previous user request received prior to detecting the user input. In accordance with a determination that the displayed content does not comprise media content playing on the electronic device, display of the previous results in the third user interface is replaced with the display of the second results.

In some examples, processing unit 1108 is further configured to, in accordance with the determination that the displayed content comprises media content playing on the electronic device, determine (e.g., with determining unit 1114) whether the displayed content includes the second user interface with previous results from a previous user request. In accordance with a determination that the displayed content includes the second user interface with previous results from a previous user request, the previous results are replaced with the second results.

In some examples, processing unit 1108 is further configured to, in accordance with a determination that the media content can be paused, pause (e.g., with task performing unit 1120) the playing of the media content on the electronic device and display (e.g., with display enabling unit 1110) on the display unit the third user interface with a portion of the second results, wherein the third user interface occupies a majority of the display area of the display unit.

In some examples, processing unit 1108 is further configured to transmit (e.g., with transmitting unit 1126 and using communication unit 1107) the audio data to a server to perform natural language processing and indicate (e.g., with transmitting unit 1126) to the server that the audio data is associated with a media application. The indicating biases the natural language processing toward media-related user intents.

In some examples, processing unit 1108 is further configured to transmit (e.g., transmitting unit 1126) the audio data to a server to perform speech-to-text processing.

In some examples, processing unit 1108 is further configured to indicate (e.g., with transmitting unit 1126) to the server that the audio data is associated with a media application. The indicating biases the speech-to-text processing toward media-related text results.

In some examples, processing unit 1108 is further configured to obtain (e.g., with obtaining unit 1122) a text representation of the user utterance, where the text representation is based on previous user utterances received prior to sampling the audio data.

In some examples, the text representation is based on a time at which the previous user utterances were received prior to sampling the audio data.

In some examples, processing unit 1108 is further configured to obtain (e.g., with obtaining unit 1122) a determination that the user intent does not correspond to one of a plurality of core competencies associated with the electronic device. Processing unit 1108 is further configured to cause (e.g., with task performing unit 1120) a second electronic device to perform a task in furtherance of satisfying the user intent.

In some examples, processing unit 1108 is further configured to obtain (e.g., with obtaining unit 1122) a determination of whether the user utterance includes an ambiguous term. Processing unit 1108 is further configured to, in response to obtaining a determination that the user utterance includes an ambiguous term, obtain (e.g., with obtaining unit 1122) two or more candidate user intents based on the ambiguous term; and display (e.g., with display enabling unit 1110) on the display unit the two or more candidate user intents.

In some examples, processing unit 1108 is further configured to, while displaying the two or more candidate user intents, receive (e.g., with detecting unit 1112) a user selection of one of the two or more candidate user intents. The user intent is determined based on the user selection.

In some examples, processing unit 1108 is further configured to detect (e.g., with detecting unit) a second user input. Processing unit 1108 is further configured to, in response to detecting the second user input, sample (e.g., with sampling unit 1116) second audio data. The second audio data includes a second user utterance representing the user selection.

In some examples, the two or more interpretations are displayed without outputting speech associated with the two or more candidate user intents.

In accordance with some embodiments, processing unit 1108 is further configured to display (e.g., with display enabling unit 1110) content on a display unit (e.g., display unit 1102 or a separate display unit). Processing unit 1108 is further configured to detect (e.g., with detecting unit 1112) a user input while displaying the content. Processing unit 1108 is further configured to, in response to detecting the user input, display (e.g., with display enabling unit 1110) a virtual keyboard interface on the display unit. Processing unit 1108 is further configured to cause (e.g., with task performing unit 1120) a selectable affordance to appear on a display of a second electronic device. Selection of the affordance enables text input to be received by the electronic device (e.g., using communication unit 1107) via a keyboard of the second electronic device.

In some examples, processing unit 1108 is further configured to receive (e.g., with detecting unit 1112) text input via the keyboard of the second electronic device, where the text input represents a user request. Processing unit 1108 is further configured to obtain (e.g., with obtaining unit 1122) results that at least partially satisfy the user request and display (e.g., with display enabling unit 1110) a user interface on the display unit, where the user interface includes at least a portion of the results.

In some examples, the displayed content comprises a second user interface with a plurality of exemplary natural language requests. In some examples, the displayed content includes media content. In some examples, the displayed content comprises a third user interface with results from a previous user request, where the third user interface occupies at least a majority of a display area of the display unit. In some examples, the virtual keyboard interface is overlaid on at least a portion of the third user interface. In some examples, the user input is detected via a remote control of the electronic device, and the remote control and the second electronic device are different devices. In some examples, the user input comprises a predetermined motion pattern on a touch-sensitive surface of the remote control device. In some examples, the user input is detected via the second electronic device.

The operations described above with reference to FIGS. 7A-C and 9 are, optionally, implemented by components depicted in FIGS. 1-3 and 4A. The operations described above with reference to FIGS. 7A-C and 9 are, optionally, implemented by components depicted in FIGS. 1-3 and 4A-B. For example, displaying operations 702, 716, 732, 736, 738, 742, 746, 902, 906, 914, detecting operations 704, 718, 904, 910, determining operations 708, 710, 712, 714, 720, 724, 728, 736, 740, sampling operations 706, performing operations 722, 726, 744, 908, obtaining operations 730, 734, 912, and switching operations 552, 564 may be implemented by one or more of operating system 252, 352, GUI module 256, 356, applications module 262, 362, digital assistant module 426, and processor(s) 204, 304, 404. It would be clear to a person having ordinary skill in the art how other processes can be implemented based on the components depicted in FIGS. 1-3 and 4A-B.

In accordance with some implementations, a non-transitory computer-readable storage medium is provided, the non-transitory computer-readable storage medium storing one or more programs for execution by one or more processors of an electronic device, the one or more programs including instructions for performing any of the methods described herein.

In accordance with some implementations, an electronic device (e.g., a portable electronic device) is provided that comprises means for performing any of the methods described herein.

In accordance with some implementations, an electronic device (e.g., a portable electronic device) is provided that comprises a processing unit configured to perform any of the methods described herein.

In accordance with some implementations, an electronic device (e.g., a portable electronic device) is provided that comprises one or more processors and memory storing one or more programs for execution by the one or more processors, the one or more programs including instructions for performing any of the methods described herein.

Although the foregoing description uses terms "first," "second," etc. to describe various elements, these elements should not be limited by the terms. These terms are only used to distinguish one element from another. For example, a first user input could be termed a second user input, and, similarly, a second user input could be termed a first user input, without departing from the scope of the various described embodiments. The first user input and the second user input are both user inputs, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Further, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims In addition, in any of the various examples discussed herein, various aspects can be personalized for a particular user. User data including contacts, preferences, location, favorite media, and the like can be used to interpret voice commands and facilitate user interaction with the various devices discussed herein. The various processes discussed herein can also be modified in various other ways according to user preferences, contacts, text, usage history, profile data, demographics, or the like. In addition, such preferences and settings can be updated over time based on user interactions (e.g., frequently uttered commands, frequently selected applications, etc.). Gathering and use of user data that is available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data as private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select not to provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The invention claimed is:

1. A plurality of non-transitory computer-readable storage media including a first non-transitory computer-readable storage medium storing one or more first programs and a second non-transitory computer-readable storage medium storing one of more second programs, the one or more first programs comprising first instructions, which when executed by one or more processors of a first electronic device, cause the first electronic device to:
   display content on a display unit;
   while displaying the content, detect a user input comprising a predetermined motion pattern on a second electronic device; and
   in response to detecting the user input comprising a predetermined motion pattern on a second electronic device:
   display a virtual keyboard interface on the display unit;
   wherein the one or more second programs comprise second instructions, which when executed by one or more processors of the second electronic device, cause the second electronic device to:
   in response to detecting the user input comprising the predetermined motion pattern on the second electronic device:
   display a selectable affordance on a display of the second electronic device, wherein selection of the selectable affordance enables text input to be received by the first electronic device via a keyboard of the second electronic device.

2. The plurality of computer-readable storage medium of claim 1, wherein the first instructions further cause the first electronic device to:
   receive text input via the keyboard of the second electronic device, the text input representing a user request;
   obtain results that at least partially satisfy the user request; and
   display a user interface on the display unit, the user interface including at least a portion of the results.

3. The plurality of computer-readable storage medium of claim 1, wherein the displayed content comprises a second user interface with a plurality of exemplary natural language requests.

4. The plurality of computer-readable storage medium of claim 3, wherein the displayed content includes media content.

5. The plurality of computer-readable storage medium of claim 1, wherein the displayed content comprises a third user interface with results from a previous user request, the third user interface occupying at least a majority of a display area of the display unit.

6. The plurality of computer-readable storage medium of claim 5, wherein the virtual keyboard interface is overlaid on at least a portion of the third user interface.

7. The plurality of computer-readable storage medium of claim 1, wherein the user input is detected via a remote control of the electronic device, and wherein the remote control and the second electronic device are different devices.

8. The plurality of computer-readable storage medium of claim 7, wherein the user input comprises a predetermined motion pattern on a touch-sensitive surface of the remote control device.

9. The plurality of computer-readable storage medium of claim 1, wherein the user input is detected via the second electronic device.

10. The plurality of computer-readable storage medium of claim 1, wherein the first instructions further cause the first electronic device to:
in response to detecting the user input, display a search field on the display unit;
receive text input from the second electronic device; and
display the text input in the displayed search field.

11. A system, comprising:
a first electronic device, comprising:
one or more first processors; a first memory; and one or more first programs, wherein the one or more first programs are stored in the first memory and configured to be executed by the one or more first processors, the one or more first programs including first instructions for:
displaying content on a display unit;
while displaying the content, detecting a user input comprising a predetermined motion pattern on a second electronic device; and
in response to detecting the user input comprising a predetermined motion pattern on a second electronic device:
displaying a virtual keyboard interface on the display unit; and
the second electronic device, comprising:
one or more second processors; a second memory; and one or more second programs, wherein the one or more second programs are stored in the second memory and configured to be executed by the one or more second processors, the one or more second programs including second instructions for:
in response to detecting the user input comprising the predetermined motion pattern on the second electronic device:
displaying a selectable affordance on a display of the second electronic device, wherein selection of the affordance enables text input to be received by the first electronic device via a keyboard of the second electronic device.

12. The system of claim 11, wherein the first instructions further cause the first electronic device to:
receive text input via the keyboard of the second electronic device, the text input representing a user request;
obtain results that at least partially satisfy the user request; and
display a user interface on the display unit, the user interface including at least a portion of the results.

13. The system of claim 11, wherein the displayed content comprises a second user interface with a plurality of exemplary natural language requests.

14. The system of claim 13, wherein the displayed content includes media content.

15. The system of claim 11, wherein the displayed content comprises a third user interface with results from a previous user request, the third user interface occupying at least a majority of a display area of the display unit.

16. The system of claim 15, wherein the virtual keyboard interface is overlaid on at least a portion of the third user interface.

17. The system of claim 11, wherein the user input is detected via a remote control of the electronic device, and wherein the remote control and the second electronic device are different devices.

18. The system of claim 17, wherein the user input comprises a predetermined motion pattern on a touch-sensitive surface of the remote control device.

19. The system of claim 11, wherein the user input is detected via the second electronic device.

20. The system of claim 11, wherein the first instructions further cause the first electronic device to:
in response to detecting the user input, display a search field on the display unit;
receive text input from the second electronic device; and
display the text input in the displayed search field.

21. A method, comprising:
at a first electronic device with one or more first processors and a first memory:
displaying content on a display unit;
while displaying the content, detecting a user input comprising a predetermined motion pattern on a second electronic device; and
in response to detecting the user input comprising a predetermined motion pattern on a second electronic device:
displaying a virtual keyboard interface on the display unit; and
at a second electronic device with one or more second processors and a second memory:
in response to detecting the user input comprising the predetermined motion pattern on the second electronic device:
displaying a selectable affordance on a display of the second electronic device, wherein selection of the affordance enables text input to be received by the first electronic device via a keyboard of the second electronic device.

22. The method of claim 21, further comprising:
receiving text input via the keyboard of the second electronic device, the text input representing a user request;
obtaining results that at least partially satisfy the user request; and
displaying a user interface on the display unit, the user interface including at least a portion of the results.

23. The method of claim 12, wherein the displayed content comprises a second user interface with a plurality of exemplary natural language requests.

24. The method of claim 23, wherein the displayed content includes media content.

25. The method of claim 21, wherein the displayed content comprises a third user interface with results from a previous user request, the third user interface occupying at least a majority of a display area of the display unit.

26. The method of claim 25, wherein the virtual keyboard interface is overlaid on at least a portion of the third user interface.

27. The method of claim 21, wherein the user input is detected via a remote control of the electronic device, and wherein the remote control and the second electronic device are different devices.

28. The method of claim 27, wherein the user input comprises a predetermined motion pattern on a touch-sensitive surface of the remote control device.

29. The method of claim 21, wherein the user input is detected via the second electronic device.

30. The method of claim 21, comprising:
in response to detecting the user input, displaying a search field on the display unit;
receiving text input from the second electronic device; and
displaying the text input in the displayed search field.

\* \* \* \* \*

UNITED STATES PATENT AND TRADEMARK OFFICE
CERTIFICATE OF CORRECTION

PATENT NO. : 10,956,006 B2
APPLICATION NO. : 16/394965
DATED : March 23, 2021
INVENTOR(S) : Lia T. Napolitano et al.

It is certified that error appears in the above-identified patent and that said Letters Patent is hereby corrected as shown below:

In the Claims

In Column 76, Line 59, Claim 23, delete "claim 12," and insert -- claim 21, --, therefor.

Signed and Sealed this
Twentieth Day of December, 2022

Katherine Kelly Vidal
Director of the United States Patent and Trademark Office